United States Patent
Obayashi et al.

(10) Patent No.: US 9,184,633 B2
(45) Date of Patent: Nov. 10, 2015

(54) NON-CONTACT POWER SUPPLY CONTROL DEVICE, NON-CONTACT POWER SUPPLY SYSTEM, AND NON-CONTACT POWER CHARGE SYSTEM

(75) Inventors: Kazuyoshi Obayashi, Chita-gun (JP); Keisuke Tani, Anjo (JP)

(73) Assignee: DENSO CORPORATION, Kariya (JP)

( * ) Notice: Subject to any disclaimer, the term of this patent is extended or adjusted under 35 U.S.C. 154(b) by 880 days.

(21) Appl. No.: 13/359,170

(22) Filed: Jan. 26, 2012

(65) Prior Publication Data

US 2012/0200151 A1 Aug. 9, 2012

(30) Foreign Application Priority Data

Feb. 3, 2011 (JP) .................... 2011-22058
Feb. 3, 2011 (JP) .................... 2011-22059
Jan. 18, 2012 (JP) ................ 2012-008254

(51) Int. Cl.
*H01F 27/42* (2006.01)
*H01F 37/00* (2006.01)
(Continued)

(52) U.S. Cl.
CPC ............ *H02J 17/00* (2013.01); *B60L 11/123* (2013.01); *B60L 11/14* (2013.01); *B60L 11/182* (2013.01); *B60L 11/1825* (2013.01); *B60L 11/1831* (2013.01); *B60L 11/1833* (2013.01); *B60L 11/1835* (2013.01); *B60L 11/1846* (2013.01); *B60L 2210/12* (2013.01); *B60L 2210/14* (2013.01); *B60L 2210/30* (2013.01); *B60L 2210/40* (2013.01); *B60L 2230/00* (2013.01); *B60L 2240/12* (2013.01); *B60L 2250/10* (2013.01); *B60L 2250/16* (2013.01); *Y02T 10/6217* (2013.01); *Y02T 10/7005* (2013.01);
(Continued)

(58) Field of Classification Search
CPC ... H02J 17/00; B60L 2230/00; B60L 2230/14
USPC ............................... 307/9.1, 11, 104
See application file for complete search history.

(56) References Cited

U.S. PATENT DOCUMENTS

2009/0322280 A1 12/2009 Kamijo et al.
2010/0073177 A1* 3/2010 Azancot et al. ............... 340/657
(Continued)

FOREIGN PATENT DOCUMENTS

JP    A-06-311659    11/1994
JP    A-11-296755    10/1999
(Continued)

OTHER PUBLICATIONS

Nov. 27, 2012 Office Action issued in Japanese Application No. 2011-022059 (with translation).
(Continued)

*Primary Examiner* — Carlos Amaya
(74) *Attorney, Agent, or Firm* — Oliff PLC

(57) ABSTRACT

A non-contact power supply control device controls power supply to transmit power in a non-contact manner from a ground-side power supply section provided outside a vehicle traveling using stored power to a vehicle-side power receiving section provided to the vehicle. A detection unit detects a living body at the periphery of the ground-side power supply section. A control unit restricts the power supply in a case where the detection unit detects the living body at the periphery of the ground-side power supply section during the power supply operation to the vehicle-side power receiving section.

11 Claims, 23 Drawing Sheets

(51) Int. Cl.
*H01F 38/00* (2006.01)
*H02J 17/00* (2006.01)
*B60L 11/12* (2006.01)
*B60L 11/14* (2006.01)
*B60L 11/18* (2006.01)

(52) U.S. Cl.
CPC .......... *Y02T 10/7077* (2013.01); *Y02T 10/7225* (2013.01); *Y02T 10/7233* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2010/0117596 | A1 | 5/2010 | Cook et al. |
| 2010/0194206 | A1 | 8/2010 | Burdo et al. |
| 2010/0277121 | A1* | 11/2010 | Hall et al. ............... 320/108 |
| 2011/0148351 | A1 | 6/2011 | Ichikawa |
| 2012/0001493 | A1 | 1/2012 | Kudo et al. |

FOREIGN PATENT DOCUMENTS

| | | |
|---|---|---|
| JP | A-2001-128391 | 5/2001 |
| JP | A-2001-275280 | 10/2001 |
| JP | A-2006-021667 | 1/2006 |
| JP | A-2006-345588 | 12/2006 |
| JP | A-2007-043773 | 2/2007 |
| JP | A-2008-49055 | 3/2008 |
| JP | A-2008-87733 | 4/2008 |
| JP | A-2009-101927 | 5/2009 |
| JP | A-2010-011588 | 1/2010 |
| JP | A-2010-051202 | 3/2010 |
| JP | A-2010-70048 | 4/2010 |
| JP | A-2010-93957 | 4/2010 |
| JP | A-2010-093957 | 4/2010 |
| JP | A-2010-98896 | 4/2010 |
| JP | A-2010-119246 | 5/2010 |
| JP | A-2010-178499 | 8/2010 |
| JP | A-2010-252498 | 11/2010 |
| JP | A-2010-284006 | 12/2010 |
| JP | A-2011-259585 | 12/2011 |
| JP | A-2012-005226 | 1/2012 |
| WO | WO 2010/006078 A1 | 1/2010 |
| WO | WO 2010/055381 AI | 5/2010 |

OTHER PUBLICATIONS

Nov. 20, 2012 Office Action issued in Japanese Application No. 2011-022058 (with translation).

Aug. 20, 2013 Office Action issued in Japanese Patent Application No. 2012-008254 (with translation).

Feb. 12, 2013 Office Action issued in Japanese Application No. 2011-022059 (with translation).

\* cited by examiner

FRONT OF VEHICLE ←

NON-CONTACT POWER SUPPLY CONTROL DEVICE, NON-CONTACT POWER SUPPLY SYSTEM, AND NON-CONTACT POWER CHARGE SYSTEM

CROSS REFERENCE TO RELATED APPLICATIONS

This application is based on reference Japanese Patent Applications No. 2011-22058, filed Feb. 3, 2011, Japanese Patent Application No. 2011-22059, filed Feb. 3, 2011, and Japanese Patent Application No. 2012-008254, filed Jan. 18, 2012, the disclosure of which is incorporated herein by reference.

TECHNICAL FIELD

The present disclosure relates to a non-contact power supply control device that supplies power to a battery of a vehicle from an external power supply in a non-contact manner, and a non-contact power supply system provided with the control device. In addition, the present disclosure relates to a non-contact power charge system that charges power to a battery of a vehicle from an external power supply in a non-contact manner.

BACKGROUND

In recent years, an electrically driven vehicle such as an electric vehicle and a hybrid car has attracted attention as an environmentally friendly vehicle. The electrically driven vehicle is equipped with a battery that is capable of charging driving power from an external power supply. As a method of supplying power for charging, a plug-in type power supply method in which a power-supply-side power source outlet and a charging inlet of a vehicle are connected to each other with a cable, and a non-contact type power supply method not using the cable has been disclosed.

As a technology related to the non-contact type power supply method in the related art, for example, a non-contact power supply system disclosed in JPA-2010-93957 may be exemplified. In this technology in the related art, a power transmission is performed with an electromagnetic field interposed between a primary coil and a secondary coil. In the non-contact power supply system disclosed in JP-A-2010-93957, power from an external facility equipped with an AC power supply is converted into high-frequency power by, a high-frequency power driver and then is supplied to the primary coil. In the secondary coil provided at the bottom of a vehicle, a current flows due to an electromagnetic coupling, and thereby power is supplied to the secondary coil from the opposite primary coil.

In the related art, as described above, since power is transmitted with an electromagnetic field interposed between the primary coil disposed in the vicinity of the ground and the secondary coil disposed at the bottom of the vehicle, during a power supply operation, there is a concern in that when a person is in the vicinity of the primary coil or the secondary coil, the human body may be affected by the electromagnetic field.

Specifically, in the related art, when doors of a vehicle are locked, a charging starting request signal is transmitted to an external apparatus of the vehicle, and then a charging operation is started. When the charging operation is started at this timing, there is a possibility that a person may be in the vicinity of the vehicle, and the human body may be affected by the electromagnetic field.

In recent years, an electrically driven vehicle such as an electric vehicle and a hybrid car has attracted attention as an environmentally friendly vehicle. The electrically driven vehicle is equipped with a battery that is capable of charging driving power from an external power supply. As a method of supplying power for charging, a plug-in type power supply method in which a power-supply-side power source outlet and a charging inlet of a vehicle are connected to each other with a charging cable, and a non-contact type power supply method not using a power supply cable has been disclosed.

As a technology related to the non-contact type power supply method in the related art, for example, a non-contact power charge system disclosed in JPA-2008-87733 may be exemplified. This technology in the related art performs a power transmission via a magnetic field. In the non-contact power charge system disclosed in JP-A-2008-87733, power from an external facility equipped with an AC power supply is converted into high-frequency power by a high-frequency power driver and is supplied to the primary coil, and the primary coil transmits high-frequency power to a vehicle in which the secondary coil is mounted by electromagnetic induction.

In the technology in the related art, as described above, since power is transmitted with an electromagnetic field interposed between the primary coil disposed in the vicinity of the ground and the secondary coil disposed at the bottom of the vehicle, during a charging operation, when a person is in the vicinity of the primary coil or the secondary coil, or a small animal is on a box covering a primary self-resonance coil, the human body or animal may be affected by the electromagnetic field.

The electrically driven vehicle such as the electric vehicle and the hybrid car is equipped with a battery that is capable of charging driving power from an external power supply. As a method of supplying power for charging, a plug-in type power supply device in which a power-supply-side power source outlet and a charging inlet of a vehicle are connected to each other with a cable, and a non-contact type power supply device not using the cable has been disclosed.

As the non-contact type power supply device, a type using electromagnetic induction may be exemplified. In the type using electromagnetic induction, in order to provide a countermeasure against a metallic foreign body generating heat due to a high-frequency magnetic field and reaching a high temperature, and thereby stability of a product possibly not being secured, a device that automatically stops the power supply in a case where the power supply device reaches a high temperature is provided. In addition, a transmission efficiency is detected during the power supply, and whether or not a foreign body such as an object or a person approaches is detected during the power supply based on the transmission efficiency (for example, JP-A-2010-119246).

In addition, when the non-contact power supply is used for charging a vehicle during parking, a positional deviation between a power transmitting section and a power receiving section is different each time because a deviation in a parking position is present. Therefore, in JP-A-2006-345588, transmission efficiency between power transmission and power reception is used, and a relative position is adjusted to improve the transmission efficiency.

In JP-A-2010-119246, it is difficult to discriminate between an efficiency deterioration due to a foreign body and an efficiency deterioration due to a positional deviation. Therefore, the efficiency deterioration due to the positional deviation may be erroneously determined as the efficiency deterioration due to the foreign body, and the power supply may be stopped.

In consideration of this, a technology in which the power transmission is performed while changing a frequency in minuscule power, an efficient frequency characteristic is detected, the efficiency deterioration due to the foreign body and the efficiency deterioration due to the positional deviation of the coils are discriminated based on the detection result, and the coil position is adjusted using a coil position adjusting section may be considered. In addition, JP-A-2006-345588 discloses means for making the primary coil move in order for the efficiency of the power supply coil to be a maximum, and for making the efficiency deterioration due to the positional deviation a minimum. However, this means needing a circuit that changes a frequency of supplying power or a mechanism that allows a coil to physically move. Therefore, a manufacturing cost increases, but also it is difficult to detect whether or not the foreign body is present in a case where the foreign body intrudes between the coils during power supply.

SUMMARY

It is an object of the present disclosure to provide a non-contact power supply control device that is capable of reducing an effect of an electromagnetic field on a human body, an animal, or the like and preventing a charging time for a vehicle from being lengthened at the time of performing a non-contact power supply to the vehicle, and a non-contact power supply system provided with the non-contact power supply control device. In addition, another object of the present disclosure is to provide a non-contact power charge system that is capable of reducing an effect from an electromagnetic field on a human body, an animal, or the like at the time of performing a non-contact charging for a vehicle. In addition, still another object of the present disclosure is to provide a non-contact power supply device that is capable of detecting a foreign body and of controlling a power supply state in response to whether or not the foreign body is present.

According to an aspect of the present disclosure, there is a provided a non-contact power supply control device that controls power supply to transmit power in a non-contact manner from a ground-side power supply section provided outside a vehicle traveling using stored power to a vehicle-side power receiving section provided to the vehicle. The non-contact power supply control device includes a determination unit that determines whether or not presence of a living body is detected at the periphery of the ground-side power supply section. The non-contact power supply control device further includes a control unit that restricts power supplied to the vehicle-side power receiving section when the determination unit determines that the presence of the living body is detected at the periphery of the ground-side power supply section during the power supply operation to the vehicle-side power receiving section, compared to a power supply operation when it is determined that the presence of the living body is not detected.

According to another aspect of the present disclosure, there is provided a non-contact power charge system that performs a power transmission in a non-contact manner between a vehicle-side power receiving section provided to a vehicle and a ground-side power transmitting section provided to a ground-side charging facility at the outside of the vehicle, and that charges power from the ground-side charging facility to a power storage device of the vehicle. The non-contact power charge system includes a removal unit that removes an object to be removed, which includes a human body and an animal, from a ground-side pad that covers the ground-side power transmitting section and is exposed on the ground and the periphery of the ground-side pad at the time of performing the non-contact charging or at a stand-by stage before performing the charging.

According to still another aspect of the present disclosure, there is provided a non-contact power charge system that performs a power transmission in a non-contact manner between a vehicle-side power receiving section provided to a vehicle and a ground-side power transmitting section provided to a ground-side charging facility at the outside of the vehicle, and that charges power from the ground-side charging facility to a power storage device of the vehicle. The non-contact power charge system includes a detection unit that detects an object to be removed, which includes a human body and an animal, on a ground-side pad that covers the ground-side power transmitting section and is exposed on the ground and at the periphery of the ground-side pad. The non-contact power charge system further includes a control unit that stops the non-contact charging in a case where the object to be removed is detected by the detection unit at the time of performing the non-contact charging or at a stand-by stage before performing the charging.

According to a still another aspect of the present disclosure, there is provided a non-contact power supply device that performs a power transmission in a non-contact manner from a power transmitting section to a power receiving section. The non-contact power supply device includes an efficiency detecting unit that detects a transmission efficiency of power transmitted from the power transmitting section to the power receiving section. The non-contact power supply device further includes a position detecting unit that detects a relative position between the power transmitting section and the power receiving section. The non-contact power supply device further includes a reference value calculating unit that calculates a reference value of the transmission efficiency at the relative position using the relative position detected by the position detecting unit. The non-contact power supply control device further includes a control unit that controls the power transmission from the power transmitting section to the power receiving section. The control unit controls the power transmitting section so as to stop the power transmission in a case where the transmission efficiency detected by the efficiency detecting unit during the power transmission is less than the reference value that is obtained by the reference value calculating unit.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
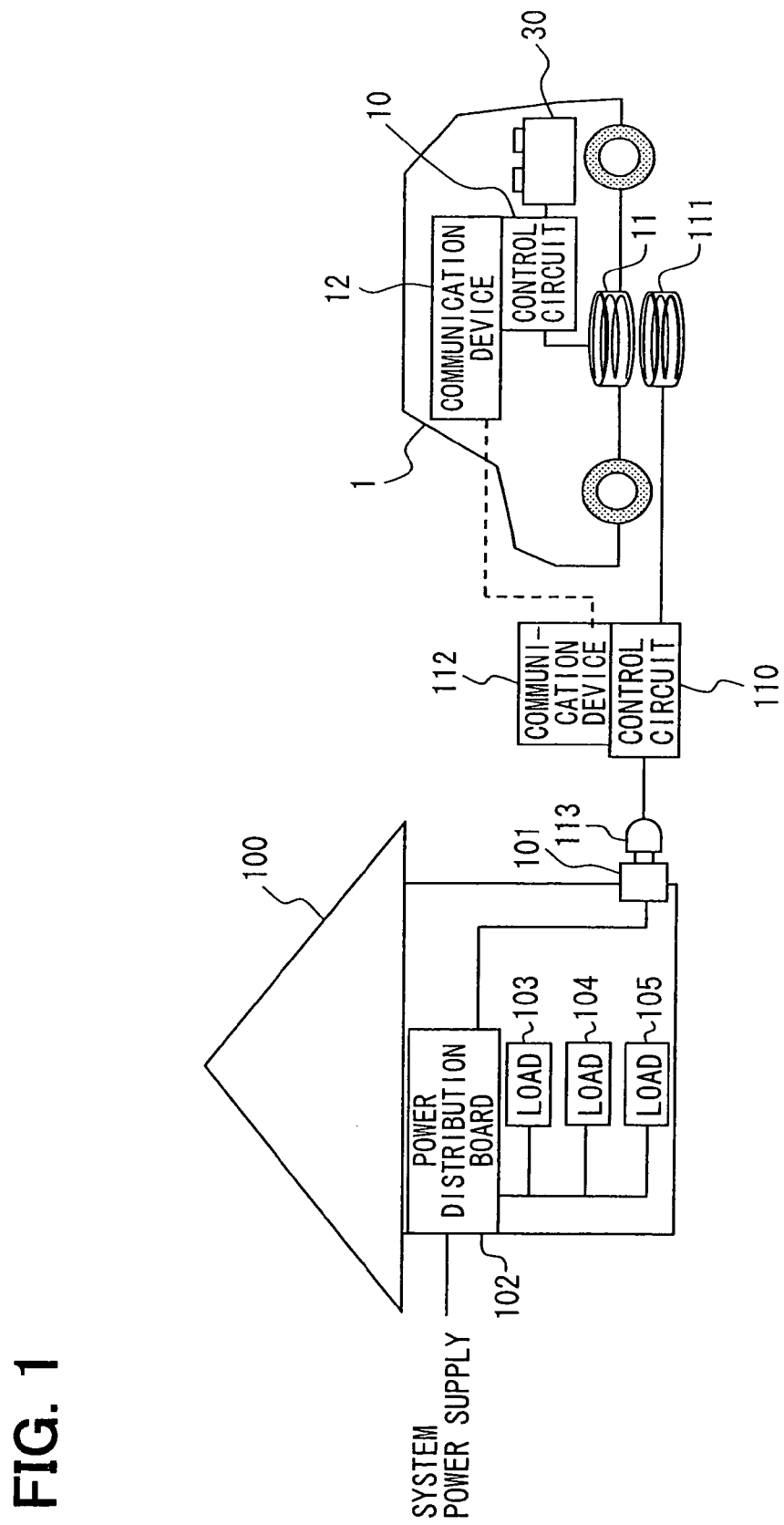
FIG. 1 is a configuration diagram of a non-contact power supply system according to a first embodiment.

Hereinafter, a plurality of embodiments will be described with reference to the attached drawings. In each embodiment, like reference numerals will be given to portions corresponding to those described in a preceding embodiment, and redundant description thereof may be omitted. In each embodiment, in a case where only a part of configurations are described, another embodiment that was described previously may be applied to other portions of the configurations. A combination between portions whose specific combination possibility is explicitly described in each embodiment is possible. In addition, even though not being explicitly described, embodiments may be partially combined as long as a problem related to the combination does not occur particularly.

First Embodiment

Figure 2:
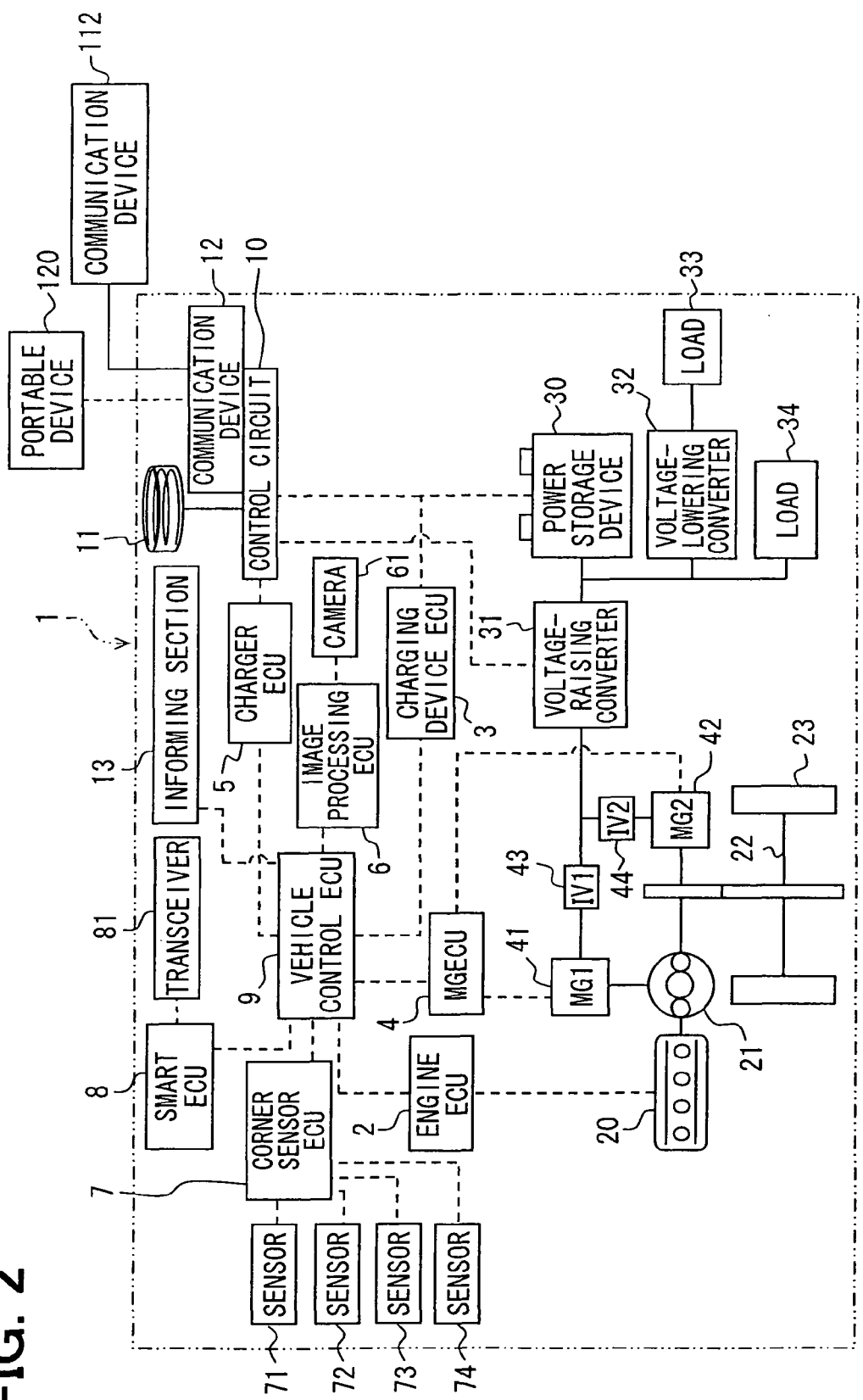
FIG. 2 is a configuration diagram of the non-contact power supply system of a vehicle 1.

A non-contact power supply control device is applicable, for example, in the case of charging an in-vehicle battery of an electric vehicle (EV), a plug-in hybrid vehicle (PHV), or the like. FIG. 1 shows a configuration diagram of a non-contact power supply system according to the first embodiment. FIG. 2 shows a configuration diagram illustrating a configuration related to the non-contact power supply system in a vehicle 1. In this first embodiment, in regard to the non-contact power supply control device, an example in which a vehicle control ECU 9 provided to the vehicle 1 cooperates with another ECU and executes a function as an integral ECU.

As shown in FIG. 1, the system according to the first embodiment includes a facility-side power supply device included in a ground-side power supply facility, a vehicle-side charging device mounted on the vehicle 1, a ground-side power supply section 111, and a vehicle-side power receiving section 11. The facility-side power supply device, which is included in the ground-side power supply facility, is electrically connected to a system power supply that is mainly supplied via a power distribution board 102 of a house 100 or the like and performs a power transmission. The ground-side power supply section 111 includes a power transmitting coil that transmits power in a non-contact manner. The vehicle-side power receiving section 11 includes a power receiving coil that receives power from the ground-side power supply section 111 in a non-contact manner.

The power supply device includes a control circuit 110 including a rectification circuit, a high-frequency inverter, or the like, and a communication device 112, or the like, and operates at the time of supplying power to the vehicle-side power receiving section 11. The vehicle-side charging device includes a control circuit 10 of the vehicle 1, a power storage device 30, a charger ECU 5, a communication device 12, or the like. The ground-side power supply section 111 is provided or buried in a parking space demarcated in a parking facility and is configured to generate a magnetic field by a predetermined electrical conduction. The ground-side power supply section 111 detects an entry of a vehicle into the parking space and performs a power transmission and reception in a non-contact manner with the vehicle-side power receiving section 11 provided on the vehicle side. The non-contact power supply system is a non-contact power transmission and reception system that performs the power transmission and reception between a power storage device 30 including a secondary battery and the system power supply located at the outside of the vehicle in an electromagnetically coupled state, for example, by electromagnetic induction or magnetic resonance.

As shown in FIG. 2, the first embodiment is an example in which the non-contact power supply control device is applied to a parallel-series hybrid car. An inner-side portion indicated by a two-dotted line in FIG. 1 includes configuration elements provided to the vehicle 1, in which a vehicle control ECU 9 or the charger ECU 5 controls the charging to the power storage device 30 via the control circuit 10, a power storage device ECU 3, or the like. In addition, power from the system power supply (commercial power supply) or the like is supplied to a house 100 side socket 101 that is connected to a plug 113 connected to a power supply device.

In addition, one end-side plug of a power supply cable having plugs at both ends may be connected to the socket 101, and the other end-side plug may be connected a power receiving inlet provided to the vehicle 1. In this manner, the vehicle 1 is a vehicle that is capable of performing a contact type power supply by a wire in addition to the non-contact type power supply.

The power storage device 30 includes a plurality of secondary batteries, and is a high-voltage battery in which a terminal voltage is set to a predetermined high voltage. The power storage device 30 is connected to respective motor generators 41 and 42 via a voltage-raising converter 31, and respective inverters 43 and 44 and is controlled by the power storage device ECU 3. The power storage device 30 supplies power to motors at the time of startup, at the time of acceleration, or the like, and stores power obtained by a regenerative power generation at the time of deceleration.

A voltage-raising converter 31, a voltage-lowering converter 32, loads 33 and 34 including various auxiliaries (a compressor that drives coolant of an air-conditioning refrigeration cycle, or the like), and the control circuit 10 are connected to the power storage device 30. The voltage-raising converter 31 raises a voltage of the power storage device 30 to a predetermined voltage (for example, DC288V is raised to a maximum of 650V). This raised voltage is used to drive a first motor generator 41 and a second motor generator 42, and compatibility between a high output and a low power loss is promoted. The voltage-lowering converter 32 lowers the voltage of the power storage device 30 to a predetermined voltage (for example, DC288V is lowered to 12 V), and applies the lowered voltage to the load 33 such as an auxiliary battery, a navigation device, or the like.

The first inverter 43 and the second inverter 44 convert a high-voltage direct current that is subjected to the voltage-raising by the voltage-raising converter 31 to an alternating current so as to supply the alternating current to the first motor generator 41 and the second motor generator 42. In addition, the respective inverters 43 and 44 also execute a function of converting the alternating current generated by the respective motor generators 41 and 42 to a direct current.

The vehicle control ECU 9 may communicate with an engine ECU 2, a motor generator ECU 4, the power storage device ECU 3, the charger ECU 5, an image processing ECU 6, a corner sensor ECU 7, a smart ECU 8, or the like.

Figure 3:
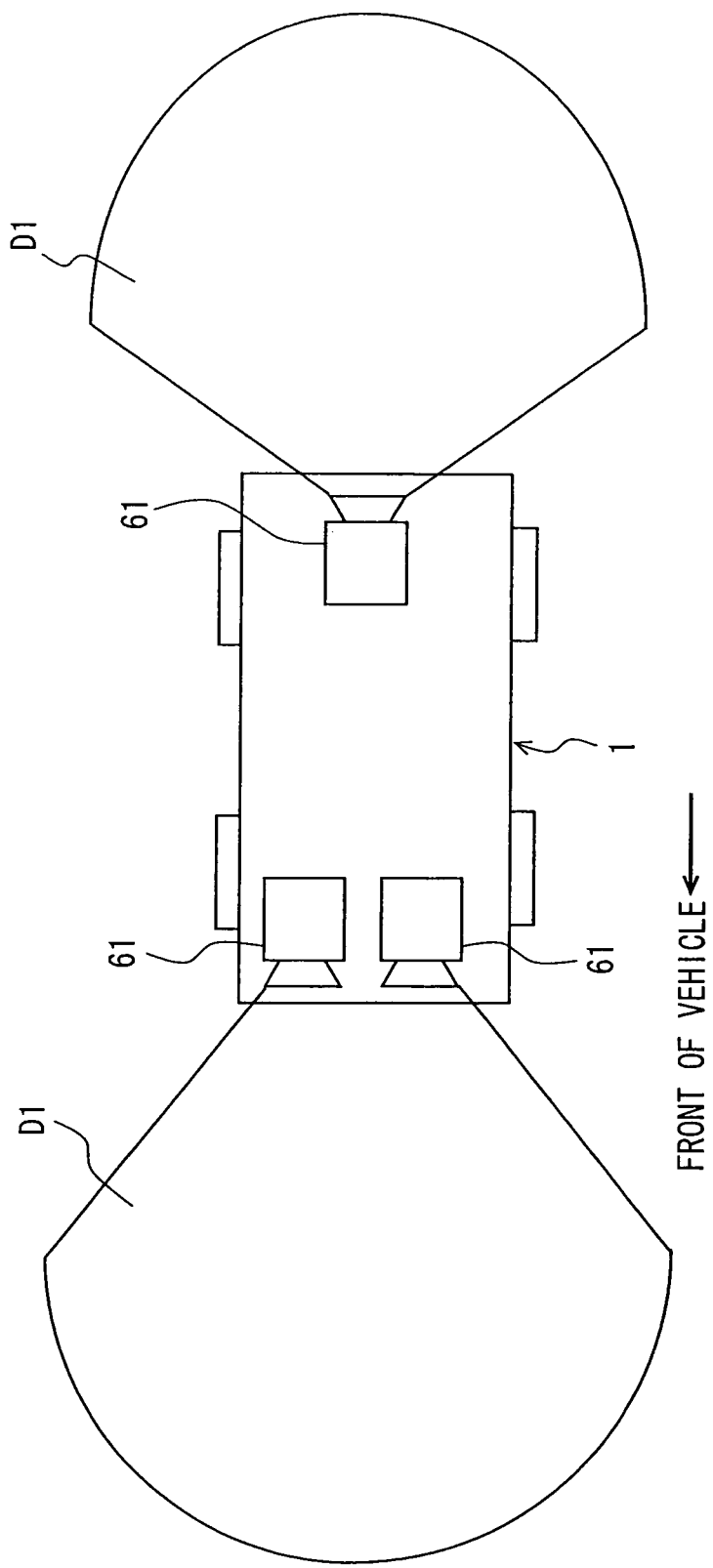
FIG. 3 is a plan view of a vehicle, which illustrates a photographing range of an in-vehicle camera that is used for a first living body detection.

Data from a camera 61 such as a CCD camera that images an image at the periphery of the vehicle 1, or the like is input to the image processing ECU 6. An operation of the camera 61 is controlled by the image processing ECU 6. An image imaged by the in-vehicle camera 61 is transmitted to a CCD that is an imaging device converting light and shade of light to strength and weakness of a current. The CCD converts the image to an electric signal and inputs the electric signal to the image processing ECU 6. The image processing ECU 6 performs an image analysis by analyzing the input electric signal, and determines whether or not the living body is present on the basis of the analysis result. FIG. 3 shows a plan view of a vehicle, which illustrates a photographing range of the in-vehicle camera 61 that is used as a first living body detecting unit, each camera 61 having a forward or backward photographing range D1 of the vehicle 1 as shown in the drawing. In addition, as the camera 61, a rear view camera, a front view camera, a side view camera, and the like, which are mounted on the vehicle 1, may be used.

According to the first living body detecting unit, a direct and effective living body detection by the imaging may be realized through the living body detection using the in-vehicle camera 61. In addition, a non-contact power supply system in which a reduction of an increase in the number of components is promoted may be provided with respect to the vehicle 1 in which the camera 61 is mounted.

Figure 7:
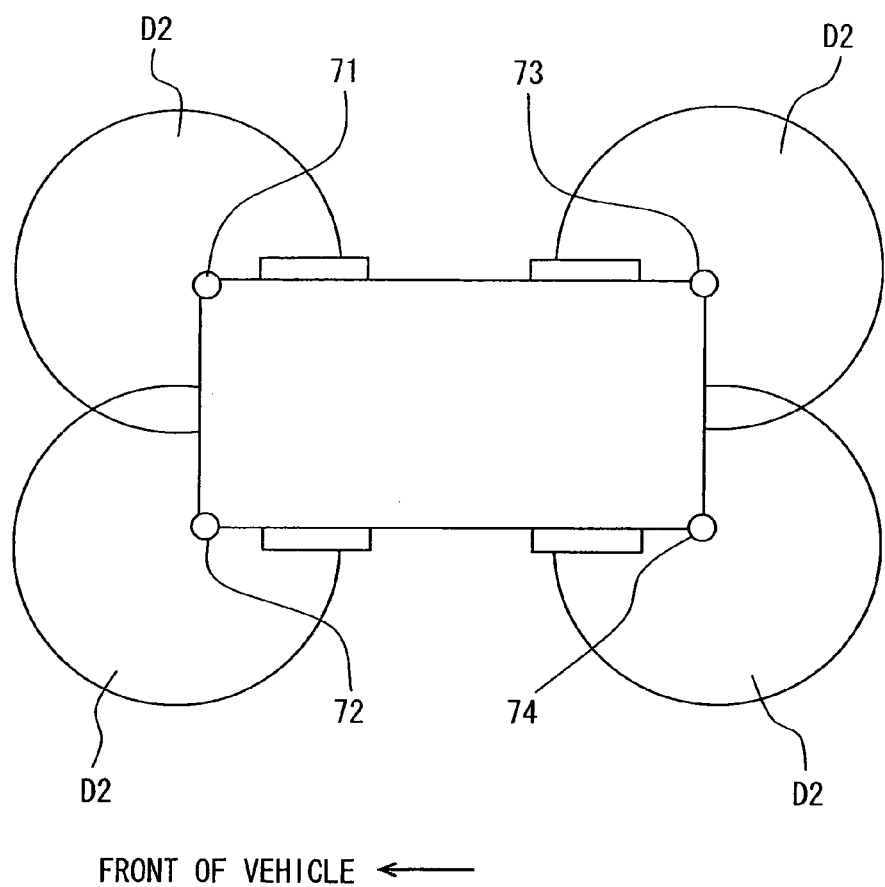
FIG. 7 is a vehicle plan view illustrating a detection range of a corner sensor used for a second living body detection.

The corner sensor ECU 7 determines whether or not the living body is present at the periphery of the vehicle 1 by using an electric signal of reflected waves that are input from sensors 71, 72, 73, and 74 that are embedded at several places such as a bumper of the vehicle 1. FIG. 7 shows a vehicle plan view illustrating a detection range of a corner sensor used as a second living body detecting unit. As shown in the drawing, each of sensors 71 to 74 has each detection range D2 at the periphery of the vehicle 1. Each of the sensors 71 to 74 is a unit including a transmission section that transmits a predetermined light beam or sonic waves toward the periphery of the vehicle 1, and a reception section that receives reflected waves thereof, and may be configured by, for example, an ultrasonic sensor that is capable of transmitting and receiving ultrasonic waves. An operation of each of the sensors 71 to 74 is controlled by the corner sensor ECU 7.

That is, in a case where a living body enters a predetermined detection range D2, each of the sensors 71 to 74 receives reflected waves from the living body. The corner sensor ECU 7 determines whether or not the living body is present on the basis of a difference between an electric signal corresponding to reflected waves that are received before the living body enters and an electric signal corresponding to reflected waves from the living body.

According to the second living body detecting unit, the living body detection corresponding to the detection range of each of the sensors 71 to 74 may be realized through the living body detection using the sensors 71 to 74 provided to the vehicle 1. In addition, a non-contact power supply system in which a reduction of an increase in the number of components is promoted may be provided with respect to the vehicle 1 in which the sensor is mounted.

Figure 9:
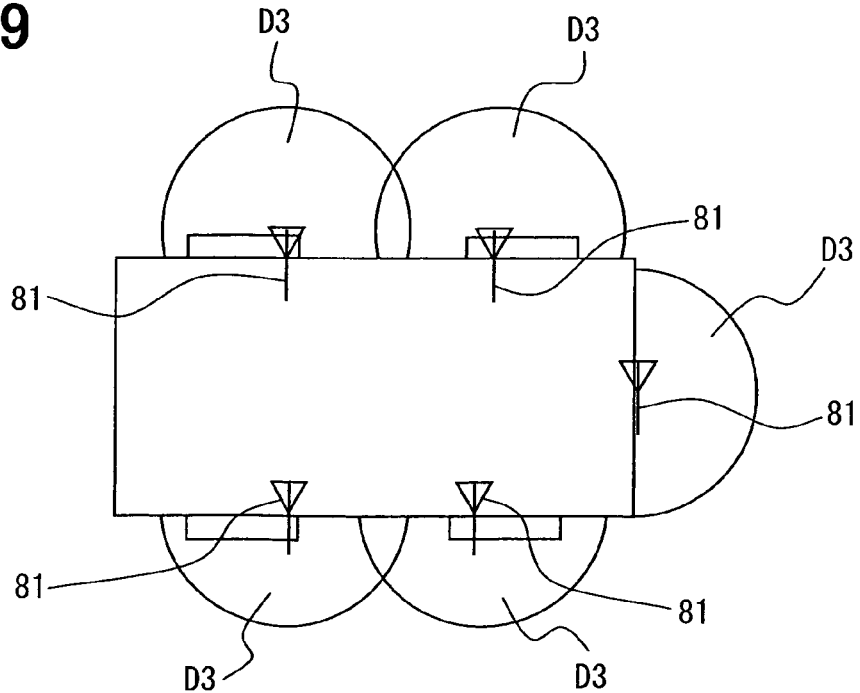
FIG. 9 is a vehicle plan view illustrating a detection range of a vehicle-side transceiver of a smart entry system that is used for a third living body detection.

The smart ECU 8 determined whether or not a living body is present at the periphery of the vehicle 1 by using a predetermined electric signal that is input from a transceiver 81 embedded at several places such as a door section of the vehicle 1, or the like. FIG. 9 shows a vehicle plan view illustrating a detection range of a vehicle-side transceiver of a smart entry system that is used as a third living body detecting unit. As shown in the drawing, each transceiver 81 has a detection range D3 at the periphery of the vehicle 1. A predetermined electric signal received by the transceiver 81 is an electric signal corresponding to an inherent management number (also referred to as an ID number) of a smart entry key that is inherently set to the vehicle 1.

That is, in a case where a user of the vehicle 1 carries the smart entry key with the inherent management number, when the user enters a predetermined detection range D3, the transceiver 81 receives an electric signal corresponding to the inherent management number. The smart ECU 8 determines whether or not the inherent management number received by the transceiver 81 is the inherent management number that is inherently set to the vehicle 1. When the inherent management numbers match each other, it is considered that key matching has been made, and therefore it is determined that a person carrying the smart entry key is present at the periphery of the vehicle 1. In this manner, the smart ECU 8 determines whether or not the living body is present.

According to the third living body detecting unit, before a person carrying the smart entry key comes into contact with a door or the like and performs unlocking or locking operation of the door, it may be detected that the person is present at the periphery of the vehicle and it may be detected that the person is close to the vehicle 1. Therefore, the third living body detecting unit may allow a power supply operation accompanied with power restriction to be performed in a state in which the living body is distant from the vehicle 1 to some extent. In addition, a living body detection corresponding to a receiver-side detection range is possible through a living body detection using, for example, a smart entry key (portable transmitter) provided to the vehicle. A non-contact power supply system in which a reduction of an increase in the number of components is promoted may be provided with respect to the vehicle 1 in which a door opening and closing instruction unit using such a portable transmitter is adopted.

In a case where a portable device 120 such as a cellular phone having a position detection function as a fourth living body detecting unit approaches the vehicle 1, the vehicle control ECU 9 compares terminal position information of the portable device 120 and position information of the vehicle 1, which are obtained by the function. The vehicle control ECU 9 determines whether or not the terminal position is present within a predetermined range at the periphery of the vehicle 1 through the comparison of the position information. In a case where it is determined that the terminal position that is acquired is within the predetermined range at the periphery of the vehicle 1, the vehicle control ECU 9 determines that a person carrying the portable device 120 having the position detection function is present at the periphery of the vehicle 1. In this manner, the vehicle control ECU 9 determines whether or not a living body is present.

In addition, as the position detection function of the vehicle 1 and the position detection function of the portable device 120, for example, a global positioning system may be used. The global positioning system and the vehicle control ECU 9 make up the vehicle position detecting unit and the terminal position detecting unit of the portable device 120.

According to the fourth living body detecting unit, it is detected that a person carrying the portable device 120 is present at the periphery of the vehicle through the living body detection using the position detection function provided to the portable device 120 such as the cellular phone and the position detection function of detecting the position of the vehicle 1, and thereby it may be detected that a person approaches the vehicle 1. Therefore, a power supply operation accompanied with power restriction may be performed in a state in which the living body is distant from the vehicle 1 to some extent.

The vehicle control ECU 9 calculates an engine output and torque of a motor in response to an operation state by signals from various sensors, outputs these to respective ECUs, and controls driving power of driving wheels 23. The engine ECU 2 controls an electronic throttle according to an engine output request made by the vehicle control ECU 9 and controls power of the engine 20. The motor generator ECU 4 controls the first motor generator 41, the second motor generator 42, the first inverter 43, the second inverter 44, and the voltage-raising converter 31 by a signal transmitted from the vehicle control ECU 9.

The control circuit 10 includes a rectification circuit and an inverter, and converts an AC power that may be obtained from an external system power supply or the like via the ground-side power supply section 111 and then supplies the converted power to the power supply device 30. The charger ECU 5 is a unit that determines whether or not a power supply request is made to the vehicle-side power receiving section 11. In addition, the charger ECU 5 is an electronic control device that controls charging and discharging of the power storage device 30.

As the power supply request, a request for charging to the power storage device 30 on the basis of an operation of a user or the like during stopping, or a request for driving auxiliaries may be exemplified. In the case of the non-contact power supply, the power supply request is satisfied when the charger ECU 5 determines that with respect to the ground-side power supply section 111, the vehicle-side power receiving section 11 is within a range in which the power supply may be performed. In the case of the contact power supply by a wire, the power supply request is satisfied when the charger ECU 5 determines that a power supply inlet on a power supply device side and a power reception inlet of the vehicle 1 are connected by a cable through a plug connection or the like, and other conditions necessary to perform the power supply are established.

The charger ECU 5 may communicate with various loads 33 and 34 or the like via the vehicle control ECU 9 and the control circuit 10. The charger ECU 5 communicates with the control circuit 110 on the power supply device side, or the like by the vehicle-side communication device 12 via the communication device 112 provided to the control circuit 110 on the ground-side power supply section 111 side. The vehicle-side communication device 12 may communicate with the communication device 112 on the power supply device side, or the portable device 120 such as a cellular phone. The vehicle control ECU 9 performs a charging control of the power storage device 30 by controlling the control circuit 10 via the charger ECU 5 or the like, and also performs a power supply process with respect to various loads 33 and 34 including a navigation device, an air conditioning device, a compressor, or the like.

The power distribution board 102 in a house has a function of allocating power of an external system power supply or the like to loads 103, 104, and 105 or the like of devices used on a house side. This allocation function is performed in a manner such that a control device for a house 100 controls the power distribution board 102. The power supply device may transmit and receive various kinds of information to and from the communication device 12 of the vehicle 1 located at the outside of the house via the communication device 112.

The vehicle 1 is provided with a power division mechanism 21 including a planetary gear mechanism. The power division mechanism 21 divides power of the first motor generator 41, the second motor generator 42, and the engine 20.

The first motor generator 41, the engine 20, and the second motor generator 42 are mechanically coupled to a sun gear, a carrier, and a ring gear of the power division mechanism 21, respectively. The driving wheels 23 are mechanically connected to the second motor generator 42 via an axle 22. The axle 22 is a shaft to transmit power output from the engine 20 and the second motor generator 42 to the driving wheels 23. In addition, the first motor generator 41 and the second motor generator 42 are connected to the first inverter 43 and the second inverter 44, respectively.

In regard to the above-described configuration, an operation state of each section of the vehicle 1 will be described. The vehicle 1 travels with only the second motor generator 42 that operates by power supply from the power storage device 30 until the power storage device 30 becomes a predetermined SOC (state of charge) or less. Then, in a case where an engine efficiency is not good such as at the time of startup, at a very low speed, and at the time of traveling on a gently sloping downhill, the vehicle 1 travels with only the second motor generator 42 that operates by power supply from the power storage device 30 while stopping the engine 20. At the time of normal traveling, the power of the engine 20 is divided into two paths, one side thereof drives the driving wheels 23 via the axle 22, and the other side thereof drives the first motor generator 41 for power generation. The first motor generator 41 is driven by the generated power, and thereby the driving power of the engine 20 is assisted. The vehicle control ECU 9 controls a division ratio of the power division mechanism 21 in a manner such that a maximum efficiency may be obtained. Furthermore, at the time of acceleration, power from the power storage device 30 is supplied, and the driving power by the second motor generator 42 is further added.

At the time of deceleration and at the time of braking, the driving wheels 23 drive the second motor generator 42 and allow the second motor generator 42 to operate as a generator and to perform a regenerative power generation. This regenerated power is stored in the power storage device 30. At the time of stopping, the engine 20 and the motor generators 41 and 42 are stopped except for at the time of cooling, at the time of engine warming up, and at the time of charging. At the time of traveling in a case where the charging to the power storage device 30 is necessary, the motor generators 41 and 42 are sufficiently driven compared to a normal traveling, and surplus power is charged to the power storage device 30.

Figure 4:
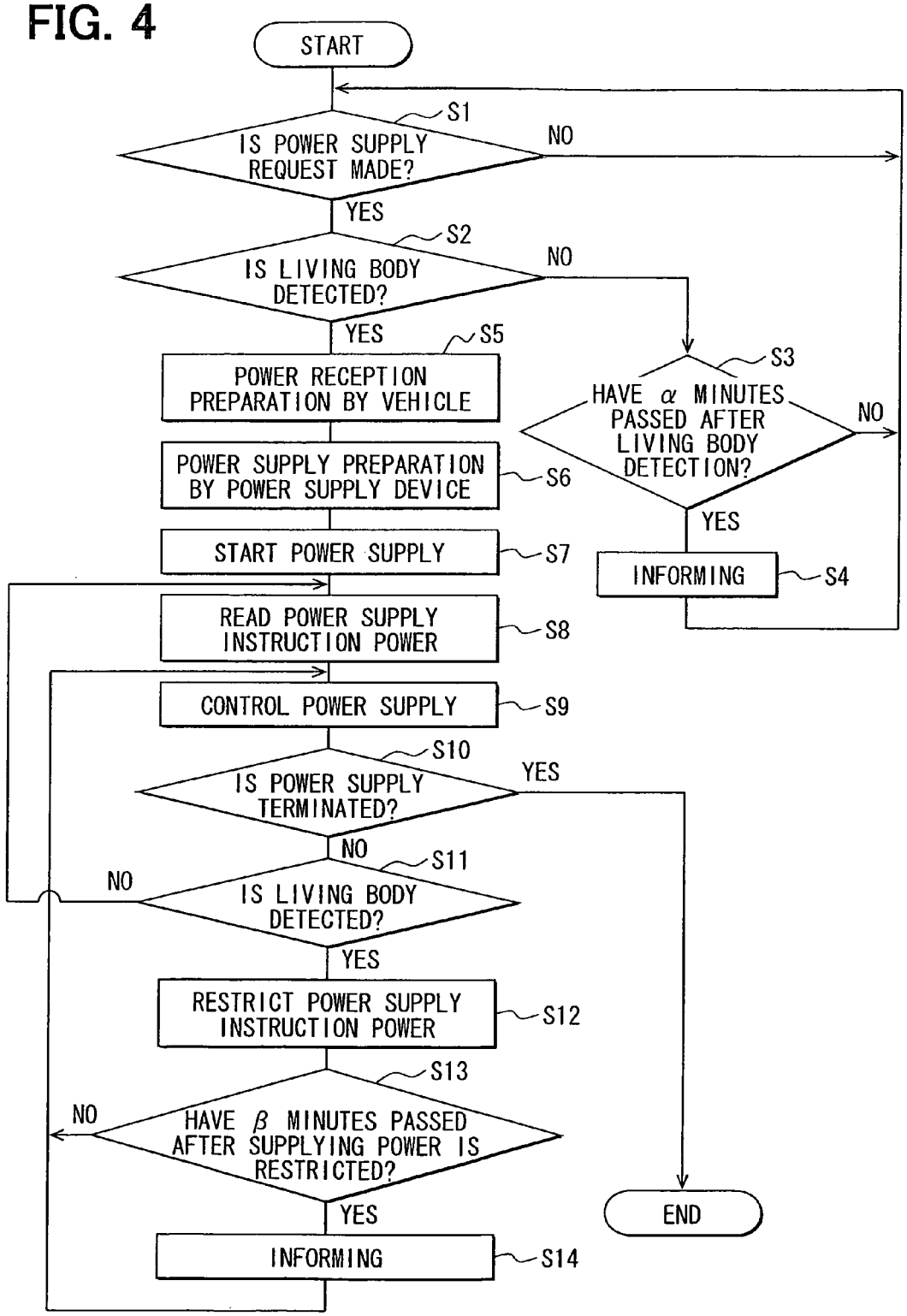
FIG. 4 is a main flowchart illustrating a procedure that is performed at the time of charging operation for a vehicle in the first embodiment.

Next, an operation related to a power supply performed by the non-contact power supply control device will be described with reference FIG. 4. FIG. 4 shows a main flowchart illustrating a procedure that is performed at the time of charging operation for a vehicle in the system according to the first embodiment.

As shown in FIG. 4, first, it is determined whether or not a power supply request for charging is made in step 1. The power supply request is satisfied when, for example, a request for charging to the power storage device 30 on the basis of an operation of a user or the like, or a request for driving auxiliaries is made.

When it is determined that the power supply request is satisfied, it is determined whether or not a living body is detected at the periphery of the vehicle 1 in step 2. This living body detection may be performed, for example, by any one of the above-described first living body detection to the fourth living body detection, or by combining two or more thereof.

When it is determined that the living body is detected in step 2, it does not transition to a power supply operation after step 5, and in step 3, it is determined whether or not α minutes, which are set, has been passed after the detection of the living body. The set time of α minutes is determined, for example, according to a difference between a current SOC of the power storage device 30 and a termination SOC that is a condition of terminating the charging. The smaller the difference between the SOCs, the longer the set time of α minutes becomes. In addition, the larger the difference between the SOCs, the shorter the set time of α minutes becomes. That is, in regard to the set time of α minutes, a default value is set to a predetermined time, for example, 15 minutes, but the set time is updated for each charging operation.

In addition, in step 3, when it is determined that α minutes have not passed, the process returns to step 1. In addition, in step 3, when it is determined that a minutes have passed, the vehicle control ECU 9 controls an informing section 13 so as to inform a passenger of the vehicle 1 or at the periphery of the vehicle 1 of a situation in which the power supply may not be started up. After the informing by the informing section 13, the process returns to step 1.

The informing section 13 informs the passenger of the vehicle 1 or the periphery of the vehicle 1 of living body detection information and supplying power restriction information by a voice unit, an illumination unit, or a display unit. In the case of the voice, a horn or an electronic sound at the time of opening and closing a door may be exemplified. In the case of the illumination, lighting-up of a headlight, a room lamp, a tail lamp, or the like, or a hazard flickering may be exemplified. In the case of the display, a display or the like is performed by a liquid crystal display disposed in front of a handle or at a part of an instrument display panel disposed at the central portion of a dashboard. The informing section 13 is a unit that eliminates a state in which the power supply may not be started even though α minutes have passed and starts the charging early so as to secure a charging time. In this manner, when the informing using the sound generating unit, the illumination unit, or the display unit provided to the vehicle 1 is performed, it is possible to perform effective and early urging of the passenger of the vehicle 1 or a person at the periphery of the vehicle 1 to keep away a living body affected by an electromagnetic field.

When it is determined that the living body is not detected in step 2, it may be determined that a problem related to a living body that becomes an obstacle for the startup of the power supply, a problem such as a mal-operation of a communication device, or the like does not occur, and a preparation for a subsequent power supply operation is performed. In step 5, a power supply preparation on the vehicle 1 side is performed, and in step 6, a power supply preparation on the power supply device side is performed.

In the power supply preparation on the vehicle 1 side, a switch for a power supply control on the vehicle 1 side is turned on, and a system main relay is connected to the power storage device 30 side. Furthermore, for the power supply to various ECUs, the voltage-lowering converter 32 is operated, and the termination SOC that is a condition of terminating the charging is calculated and set by using a predetermined map. In the power supply preparation on the power supply device side, a switch for a power supply control on the power supply device side is turned on, and the system main relay is connected to a secondary side of the power supply device.

The power supply preparations on the vehicle 1 side and the power supply device side are made, the power supply is started in step 7, and a power supply instruction power is read in step 8, and the power supply is controlled according to this power (step 9). After the power supply control, the power supply continues until in regard to an amount of power storage of the power storage device 30, the condition of the charging termination SOC is established. When it is determined that the charging termination SOC condition is established in step 10, the flowchart is terminated. In step 10, when it is determined that the condition of the charging termination SOC is not yet established, in step 11, the same determination on the living body detection as step 2 is performed. In step 11, when it is determined that the living body is not detected, the process returns to step 9, and the power supply control continues.

The determination on the living body detection in step 11 is a determination on the living body detection, which is performed during power supply from the ground-side power supply section 111, that is, during the charging operation. This determination on the living body detection serves a trigger to perform a process of limiting the power supply for fear of an effect from the electromagnetic field when the living body is detected during the charging operation. In addition, in the determination on the living body detection, whether or not the living body is present may be determined by first to fourth living body detection flows described later.

When it is determined that the living body is detected in step 11, restriction on the power supply instruction power is performed in step 12. In regard to the restriction on the power supply instruction power, a power restriction value is, for example, an output of half of a normal value. Due to this process, it is also possible to perform a power supply in which an adverse effect on the living body is suppressed while performing a control in a manner such that it approaches the charging termination without stopping the power supply.

Next, in step 13, it is determined whether or not β minutes, that are set, have passed after performing the restriction on the supplying power. As is the case with the previous α minutes, the set time of β minutes is determined according to a difference between a current SOC of the power storage device 30 and a termination SOC that is a condition of terminating the charging. The smaller the difference between the SOCs, the longer the set time of 13 minutes becomes. In addition, the larger the difference between the SOCs, the shorter the set time of β minutes becomes. That is, in regard to the set time of β minutes, a default value is set to a predetermined time, for example, 15 minutes, but the set time is updated for each charging operation.

In addition, in step 13, when it is determined that β minutes have not passed, the process returns to step 9, and the power supply control continues. In addition, in step 13, when it is determined that β minutes have passed, the vehicle control ECU 9 controls an informing section 13 so as to inform a passenger of the vehicle 1 or the periphery of the vehicle 1 of a situation in which the power supply is restricted. After the informing by the informing section 13, the process returns to step 9, and the power supply control continues.

Next, the determination process on living body detection, which is performed in step 2 and step 11, will be described with reference to FIG. 5, FIG. 8, FIG. 10, and FIG. 11.

(Flow Related to First Living Body Detection)

Figure 5:
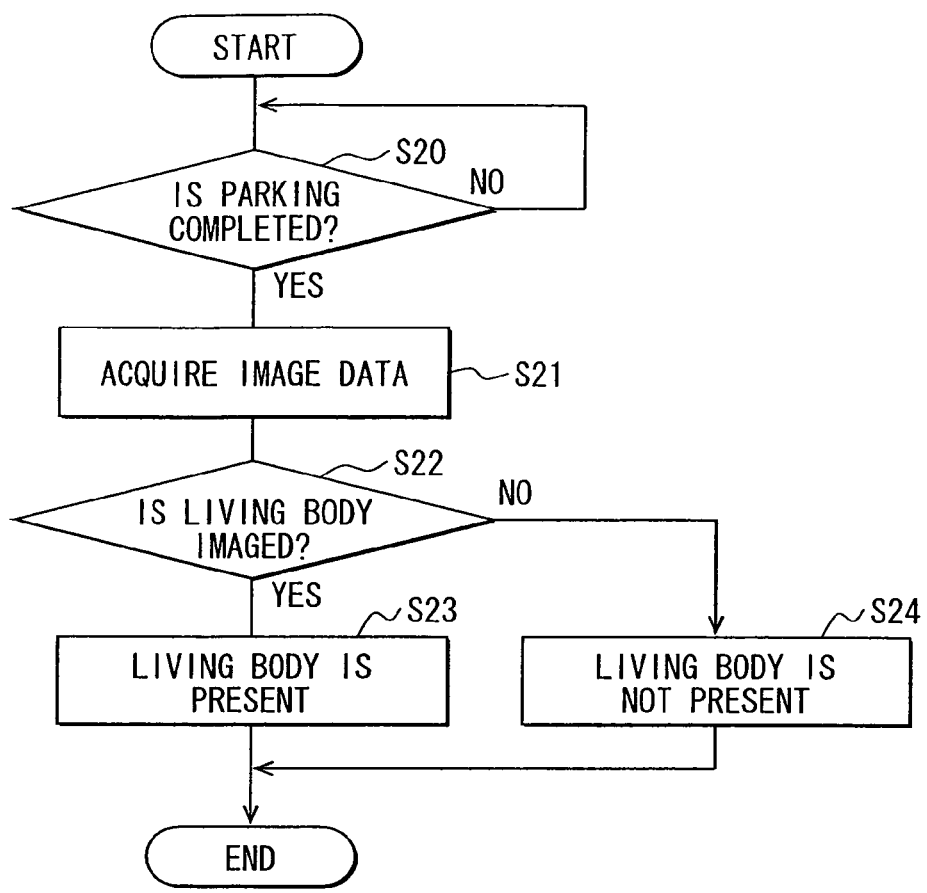
FIG. 5 is a flowchart illustrating a first living body detection control that is performed by a non-contact power supply control device at the time the living body detection.

First, a first living body detection flow will be described with reference to FIG. 5. It is determined whether or not a living body is present at the periphery of the vehicle 1 through the execution of this first living body detection flow, and subsequent appropriate processes corresponding to the determination result may be executed. As shown in FIG. 5, in step 20, it is determined whether or not there is a parking-completed state. In this step 20, it is determined that for example, the vehicle 1 is stopped, and with respect to the ground-side power supply section 111, the vehicle-side power receiving section 11 of the vehicle 1 is within a predetermined range in which power supply may be performed. This determination continues until there is a parking-completed state.

When it is determined that there is a parking-completed state in step 20, next, in step 21, the image processing ECU 6 acquires an image at the periphery of the vehicle, which is photographed by the camera 61 mounted on the vehicle 1, as an electric signal. In addition, in step 22, the image processing ECU 6 analyzes the image data acquired as the electric signal and performs an image processing, and it is determined whether or not a living body is present in an imaging range included in the image data by using the image processing result.

In a case where the determination in step 22 represents "living body is not present", a flag of "no living body" is set in step 24, and the process proceeds to step 5 or step 8, and this flow is terminated. In a case where the determination in step 22 represents "living body is present", a flag of "presence of living body" is set in step 23 and the process proceeds to step 3 or step 12, and this flow is terminated.

Figure 6:
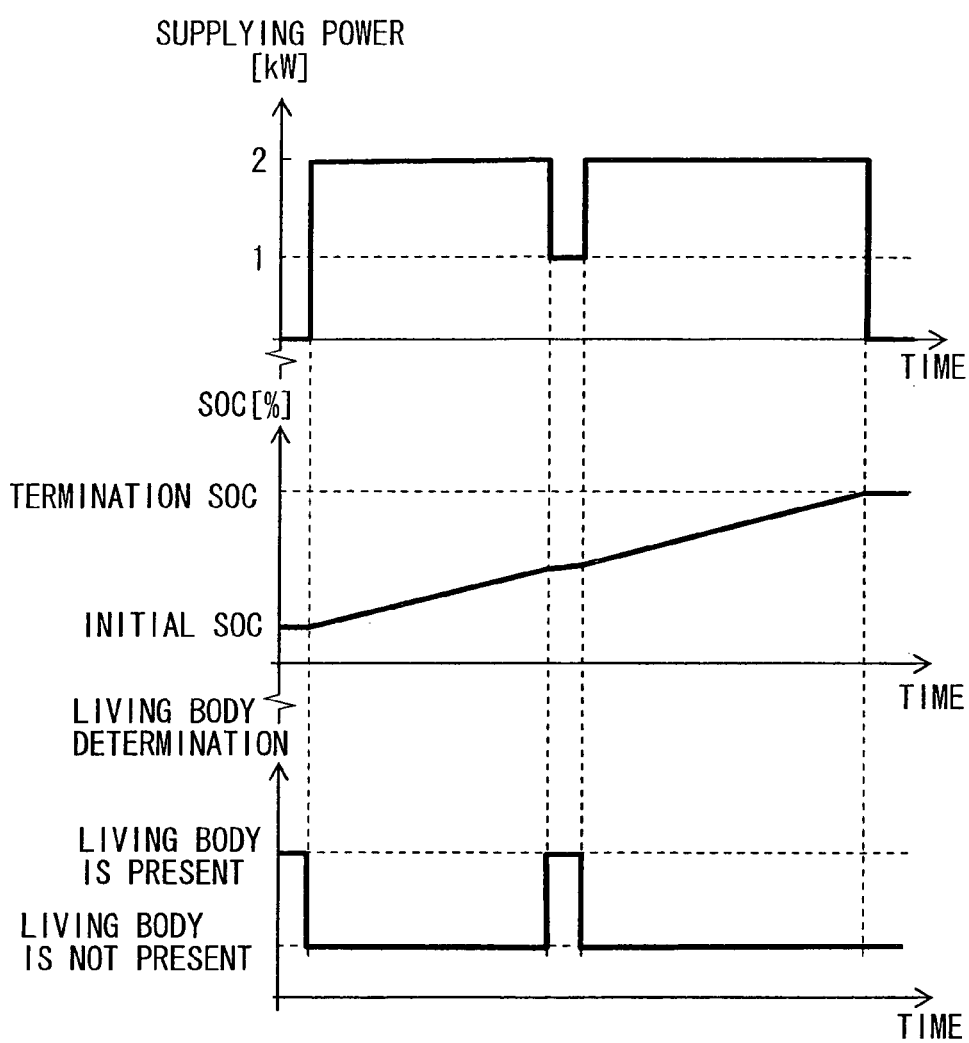
FIG. 6 is a time chart illustrating a variation in supplying power for a vehicle and a variation in SOC of a power storage device in response to a living body determination result in the charging operation.

A relationship between the living body detection, the supplying power, and the SOC of the power storage device 30 in the charging operation described with reference to FIG. 4 will be described with reference to FIG. 6. FIG. 6 shows a time chart illustrating a variation in the supplying power to the vehicle 1 and a variation in the SOC in correspondence with the result of the living body determination in the charging operation.

As shown in FIG. 6, at the time of startup of the power supply, while the living body is detected from the living body determination, the supplying power is 0 [kW], and the power supply is not performed. When the living body is not detected, the supplying power increases to 2 [kW], such that the current SOC smoothly increases in succession toward the termination SOC. However, during the power supply, when the living body is again detected, the supplying power is again restricted to 1 [kW], such that the SOC in the meantime returns to a minutely increasing state. In addition, when the living body is not detected, the supply power increases to 2 [kW], such that a current SOC in the meantime smoothly increases in succession toward the termination SOC, and when reaching the termination SOC, the power supply is stopped and the charging operation is terminated. The supplying power may be restricted to 0.5 [kW] that is lower than 1 [kW], or a predetermined value within a range that is less than 0.5 [kW] and is equal to or less than 0 [kW].

(Flow Related to Second Living Body Detection)

Figure 8:
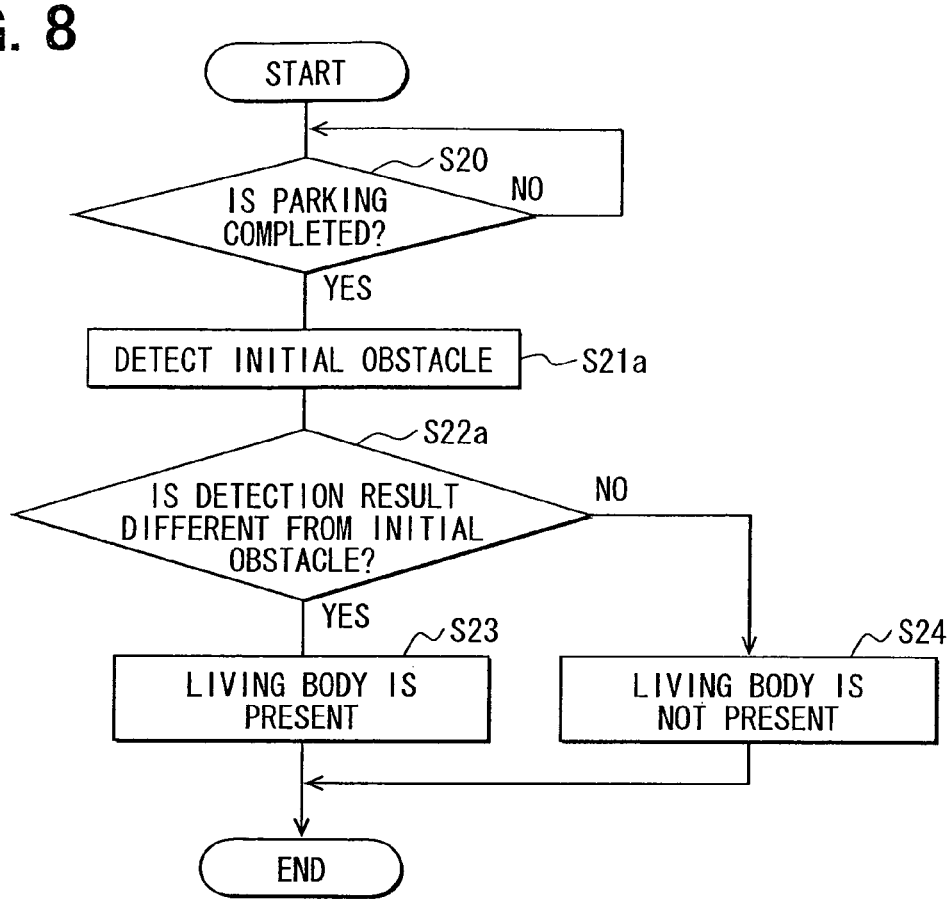
FIG. 8 is a flowchart illustrating a second living body detection control that is performed by the non-contact power supply control device at the time of the living body detection.

Next, a second living body detection flow will be described with reference to FIG. 8. It is determined whether or not a living body is present at the periphery of the vehicle 1 through the execution of this second living body detection flow, and subsequent appropriate processes corresponding to the determination result may be executed. As shown in FIG. 8, in step 20, it is determined whether or not there is a parking-completed state. In this step 20, it is determined that for example, with respect to the ground-side power supply section 111, the vehicle-side power receiving section 11 of the vehicle 1 is within a predetermined range in which power supply may be performed in a state in which the vehicle 1 is stopped. This determination continues until there is a parking-completed state.

When it is determined that there is a parking-completed state in step 20, next, in step 21a, first, the corner sensor ECU 7 detects an obstacle of an initial state at the periphery of the vehicle by the sensors 71 to 74 that are corner sensors mounted on the vehicle 1. This is a process of detecting whether or not a wall, a fence, a neighboring vehicle, or the like in the initial state is present at the periphery of the vehicle.

In addition, in step 22a, the corner sensor ECU 7 detects an obstacle at the periphery of the vehicle by the sensors 71 to 74. In addition, in step 22a, the detection result at this time and the detection result of the initial state in preceding step 21a are compared with each other, and it is determined that detection of another obstacle is confirmed. In a case where the determination in step 22a represents that a new obstacle is not detected, in step 24, a flag of "no living body" is set, and the process proceeds to step 5 or step 8, and this flow is terminated. In a case where the determination in step 22a represents that a new obstacle is detected, in step 23, a flag of "presence of living body" is set and the process proceeds to step 3 or step 12, and this flow is terminated.

(Flow Related to Third Living Body Detection)

Figure 10:
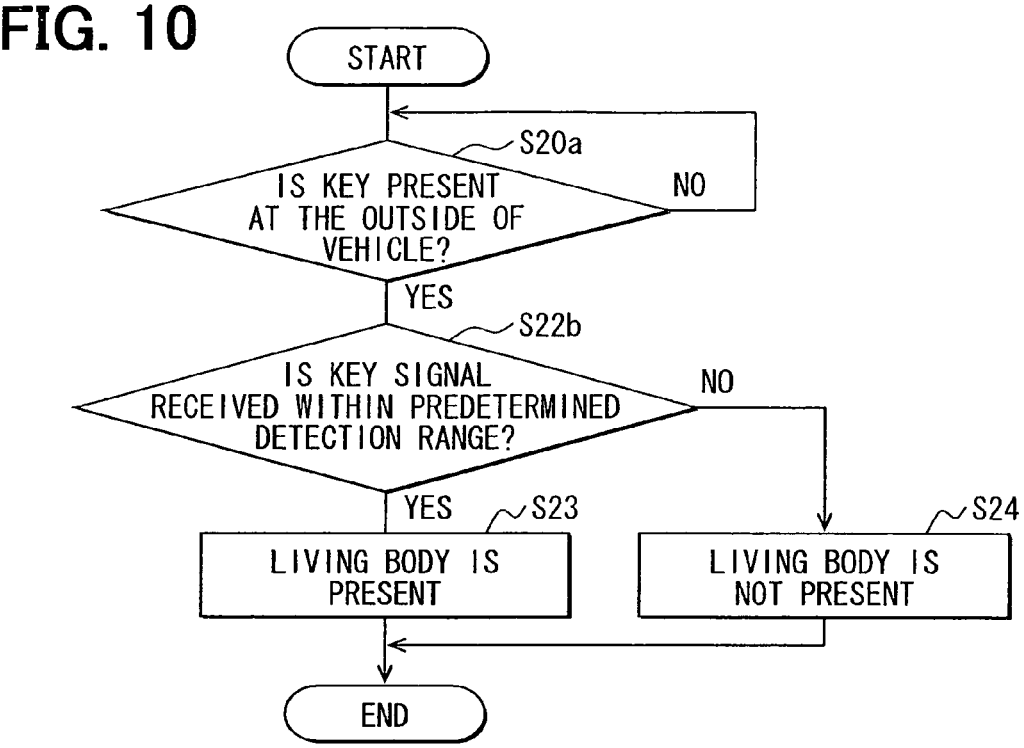
FIG. 10 is a flowchart illustrating a third living body detection control that is performed by the non-contact power supply control device at the time of the living body detection.

Next, a third living body detection flow will be described with reference to FIG. 10. It is determined whether or not a living body is present at the periphery of the vehicle 1 through the execution of this third living body detection flow, and subsequent appropriate processes corresponding to the determination result may be executed. As shown in FIG. 10, in step 20*a* and step 22*b*, the smart ECU 8 determines whether or not a smart key corresponding to an inherent management number is present at the outside of the vehicle 1. In step 20*a*, it is possible to determine whether or not a person carrying the smart key enters a predetermined key detection range D3. This determination is repeated until the inherent management number of the smart key is received.

When it is determined that the key is present within the key detection range D3 in step 20*a*, next, in step 22*b*, it is determined whether or not the inherent management number of the key, which is detected, matches an inherent management number that is registered in the vehicle 1. When it is determined by the smart ECU 8 that the inherent management number of the key, which is detected in step 22*b*, does not match the inherent management number of the vehicle 1, in step 24, a flag of "no living body" is set, and the process proceeds to step 5 or step 8, and this flow is terminated. In step 22*b*, when the smart ECU 8 receives an electric signal that matches the inherent management number of the vehicle 1, it is considered key matching has been made, and therefore it is determined that a person carrying the inherent smart key of the vehicle 1 is present at the periphery of the vehicle 1. Therefore, a flag of "presence of living body" is set in step 23 and the process proceeds to step 3 or step 12, and this flow is terminated.

(Flow Related to Fourth Living Body Detection)

Figure 11:
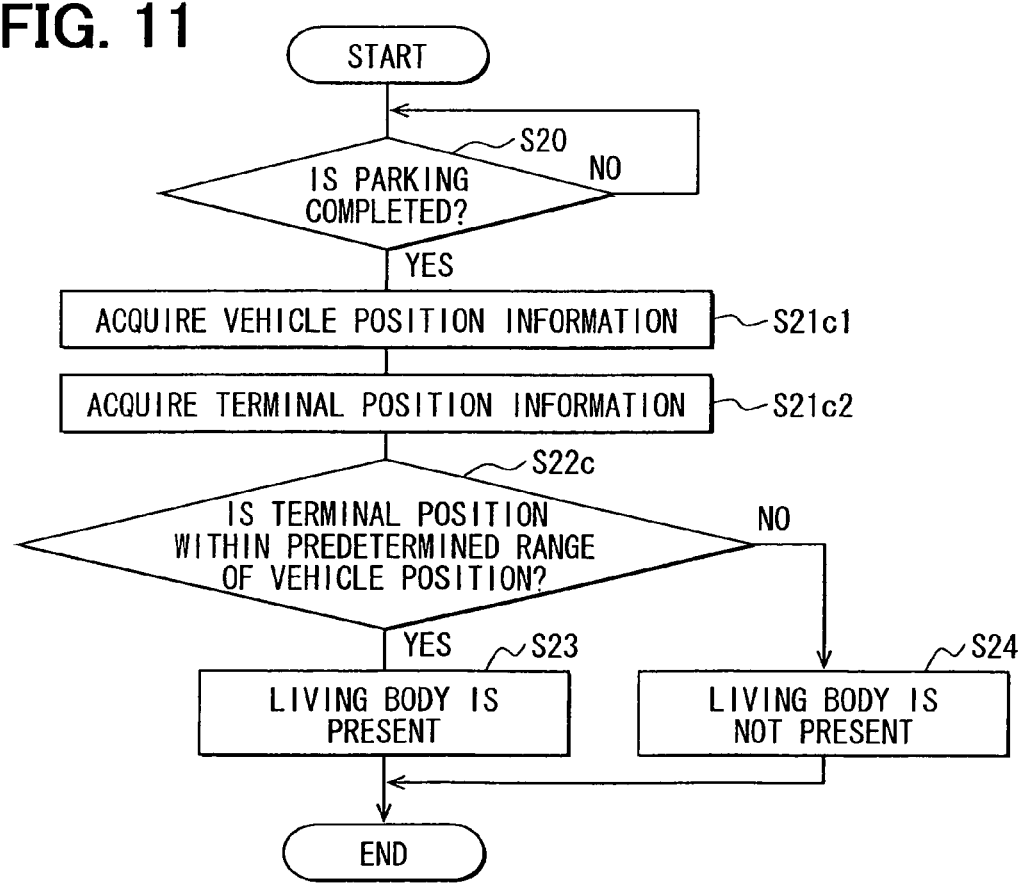
FIG. 11 is a flowchart illustrating a fourth living body detection control that is performed by the non-contact power supply control device at the time of the living body detection.

Next, a fourth living body detection flow will be described with reference to FIG. 11. It is determined whether or not a living body is present at the periphery of the vehicle 1 through the execution of this fourth living body detection flow, and subsequent appropriate processes corresponding to the determination result may be executed. As shown in FIG. 11, in step 20, it is determined whether or not there is a parking-completed state. In this step 20, it is determined that for example, with respect to the ground-side power supply section 111, the vehicle-side power receiving section 11 of the vehicle 1 is within a predetermined range in which power supply may be performed in a state in which the vehicle 1 is stopped. This determination continues until there is a parking-completed state.

When it is determined that there is a parking-completed state in step 20, the vehicle control ECU 9 acquires position information of the vehicle 1 in step 21*c*1. Furthermore, in a case where the portable device 120 is present at the periphery of the vehicle as described above, in step 21*c*2, the vehicle control ECU 9 acquires accurate position information thereof. In addition, the vehicle control ECU 9 determines whether or not a position of the portable device 120 outside the vehicle, which may be acquired in step 22*c*, is within a range that is set in advance with respect to the vehicle 1.

In step 22*c*, when the vehicle control ECU 9 determines that the position of the portable device 120 is not within the set range with respect to the vehicle 1, the vehicle control ECU 9 determines that a living body carrying the portable device 120 may not be susceptible to an adverse effect due to an electromagnetic field. Therefore, a flag of "no living body" is set in step 24, and the process proceeds to step 5 or step 8, and this flow is terminated. In step 22*c*, when the vehicle control ECU 9 determines that the position of the portable device 120 is within the set range, there is a concern in that the living body carrying the portable device 120 may be susceptible to an adverse effect due to the electromagnetic field, such that a flag of "presence of living body" is set in step 23 and the process proceeds to step 3 or step 12, and this flow is terminated.

An operational effect of the non-contact power supply control device of this embodiment will be described. The non-contact power supply control device controls a power supply for supplying power in a non-contact manner from the ground-side power supplying section 111 provided outside the vehicle 1 to the vehicle-side power receiving section 11 provided to the vehicle 1. During the power supply operation to the vehicle-side power receiving section 11, when detecting the presence of the living body at the periphery of the ground-side power supplying section 111 (step 11), the non-contact power supply control device restricts the supplying power that is supplied to the vehicle-side power receiving section 11 compared to a power supply operation when it is determined that the presence of the living body is not detected (step 12).

In this manner, in a case where the living body is detected during the power supply operation, the power supply operation is performed in a manner such that the supplying power is restricted to a degree at which the adverse effect on the living body due to the electromagnetic field does not occur, and the power supply continues. As a result, driving power may be charged to the vehicle 1 while suppressing the adverse effect on the living body without stopping the power supply. Therefore, when the non-contact power supply to the vehicle 1 is performed, the driving power may be charged to the vehicle 1 while suppressing the adverse effect on the living body. As a result, a reduction in an effect with respect to the human body, an animal, or the like due to the electromagnetic field, and prevention of the lengthening of a charging time to the vehicle 1 may be realized.

In a case where a vehicle is stopped at a position at which the power supply from the ground-side power supply section to the vehicle-side power receiving section may be performed, and a power supply request is made from the vehicle side, for example, when the power supply is started after detecting locking of the vehicle's door, there is a possibility in that a person may be present near the vehicle, and there is a concern in that the person may be susceptible to an effect due to the electromagnetic field. In the non-contact power supply control device of this embodiment, the living body is detected by at least one of the first living body detecting unit to the fourth living body detecting unit, such that it is possible to detect a person who is present at the periphery of the vehicle and is not yet distant sufficiently from the vehicle. Therefore, in this case, it is possible to remove a concern related to the effect from the electromagnetic field.

In addition, during the power supply operation, in a case where the power supply operation is stopped after detecting the unlocking of the vehicle's door, or the like, there is a possibility in that a person may be present near the vehicle before detecting the unlocking, such that in this case, there is a concern in that the person may be susceptible to the effect from the electromagnetic field. In the non-contact power supply control device of this embodiment, the living body is detected by at least one of the first living body detecting unit to the fourth living body detecting unit. Therefore, it is possible to detect a person who approaches the vehicle before unlocking the door. As a result, in this case, it is possible to remove a concern related to the effect from the electromagnetic field.

When the presence of the living body is detected again at the periphery of the ground-side power supplying section 111 during the power supply operation in which the supplying power is restricted, the non-contact power supply control device continues to restrict the supplying power (step 11 and step 12). In this manner, once, the restriction of the supplying power is performed, and the state in which the effect on the living body due to the electromagnetic field is suppressed continues while the living body is detected in succession. Due to this control, in a case where there is a possibility in that the living body may be susceptible to the effect of the electromagnetic field during the power supply operation, the power supply accompanied with the power restriction may be performed in succession. Therefore, the power supply operation that is excellent in stability may be performed in succession.

In a case where a request for the power supply operation to perform the power supply operation is made, and it is determined that the presence of the living body is detected at the periphery of the ground-side power supply section 111 before performing the power supply operation, the non-contact power supply control device does not start the power supply operation (step 2 and step 3). According to this configuration, when the living body is detected during not performing the power supply, for example, during stopping the power supply, even when the request for the power supply operation is made, the power supply operation is not started. In this manner, the power supply stopped state is also maintained against the request for the power supply operation, such that it is possible to prevent in advance the possibility in that the living body is susceptible to the effect from the electromagnetic field at the same time as the startup of the power supply.

When a time restricting the supplying power is longer than a time that is set, the non-contact power supply control device informs the outside of this situation (step 4 and step 14). According to this configuration, in a case where the power restricting time is longer, a person is informed of this situation, such that a state in which a living body is near may be quickly ended. In this manner, the power supply operation may be performed with normal power after the quick ending of the state, such that a time necessary for the charging to the power storage device 30 of the vehicle 1, or the like may be shortened. Therefore, early completion of the charging may be realized.

The non-contact power supply control device determines the above-described set time (for example, α minutes and β minutes) that becomes a trigger at the time of the informing to the outside on the basis of a difference between a current SOC and a termination SOC of the power storage device 30 (step 3 and step 13). According to this configuration, it is possible to set a time, which is taken until the informing to the outside is started in response to a magnitude of a difference between the current SOC and the termination SOC to be short. Therefore, a longer time of a power supply operation in which the power supply restriction is not performed may be secured. For example, in a case where the difference between the current SOC and the termination SOC is large, α minutes or β minutes is set to be short, and the informing is performed early so as to terminate the power supply operation in which the power supply is restricted early, and thereby a longer time of the power supply operation without the power supply restriction is secured. Therefore, it is possible to provide a control in which the effect on the living body due to the electromagnetic field is suppressed, and the termination of the charging to the vehicle is realized early.

In addition, a non-contact power supply system according to this embodiment includes the above-described non-contact power supply control device and the above-described living body detecting unit that detects the presence of the living body at the periphery of the ground-side power supplying section 111. According to this configuration, it is possible to provide a non-contact power supply system that performs a power supply operation in which the supplying power is restricted in a case where during the power supply operation, the living body such as a human body is detected at the periphery of the ground-side power supplying section 111 at which the magnetic field is generated, compared-to a case in which the living body is not detected.

Other Embodiments

Hereinbefore, description has been made with respect to the embodiment, but it is not limited to the embodiment and various modifications may be made without departing from the scope of the invention.

In the above-described embodiment, there is a process of restricting the supplying power in a case where the living body detecting unit detects the living body at the periphery of the vehicle. At this time, after the power supply operation accompanied with the power restriction is performed, a user may be informed of the detection of the living body and the user may switch the power supply into a plugging-in power supply via a cable. In addition, in a case where the power supply operation accompanied with the power restriction is prolonged, and therefore it exceeds a time that is set, the user or the like may be informed of this situation so as to switch the power supply into the plugging-in power supply.

In the above-described embodiment, description has been made with respect to a configuration in which the vehicle control ECU 9 on the vehicle 1 side makes up the non-contact power supply control device as an integral ECU together with various ECUs, but it is not limited to this configuration. For example, the vehicle control ECU 9 may make up the non-contact power supply control device as an integral ECU together with an ECU that is provided to the ground-side power supply facility and is related to the living body detection, and an ECU related to the power supply control. In addition, an ECU provided to a ground-side power supply facility may make up the non-contact power supply control device as an integral ECU together with the ECU that is provided to the ground-side power supply facility and is related to the living body detection, and the ECU related to the power supply control. In addition, the ECU provided to the ground-side power supply facility may make up the non-contact power supply control device as an integral ECU together with an ECU that is provided on the vehicle 1 side and is related to the living body detection, and the ECU related to the power supply control.

In the above-described embodiment, the facility-side power supply device has a configuration in which power is transmitted from the system power supply of the house 100, but it is not limited to this configuration. For example, the power supply device may be provided to a charging station that is provided at a parking facility such as a coin parking, a commercial facility, a public facility, or the like.

In the above-described embodiment, description has been made with respect to an example in which the power supply control device for a vehicle is applied to the parallel-series hybrid car, but an applicable vehicle is not limited to this kind of vehicle. For example, the above-described power control device for a vehicle is applicable to an electric vehicle, and may be applicable to vehicles as long as these vehicles have a configuration that is capable of taking-in power from the outside and storing power in a secondary battery, and that converts the power into a driving power to travel.

In the above-described embodiment, when the plug 113 provided at the front end of a cord extending from a vehicle side is connected to the socket 101 provided to a terminal of a wire from the power distribution board 102 of the house, a state in which power may be supplied to the control circuit 10 is reached. This plug 113 is not limited to a type that is connected to the house side, and the plug 113 may have a type in which a plug provided at the front end of a cord extending from the house side is connected to a vehicle-side charging inlet lid.

Second Embodiment

Figure 12:
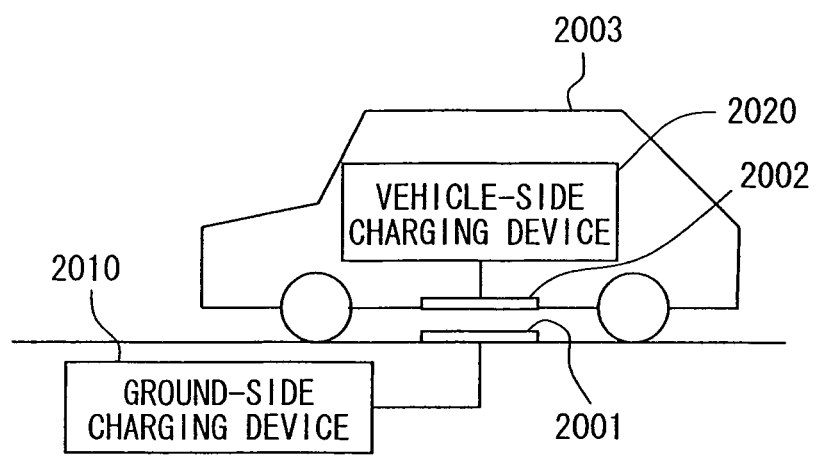
FIG. 12 is a schematic diagram of a non-contact power charge system according to the first embodiment.
Figure 13:
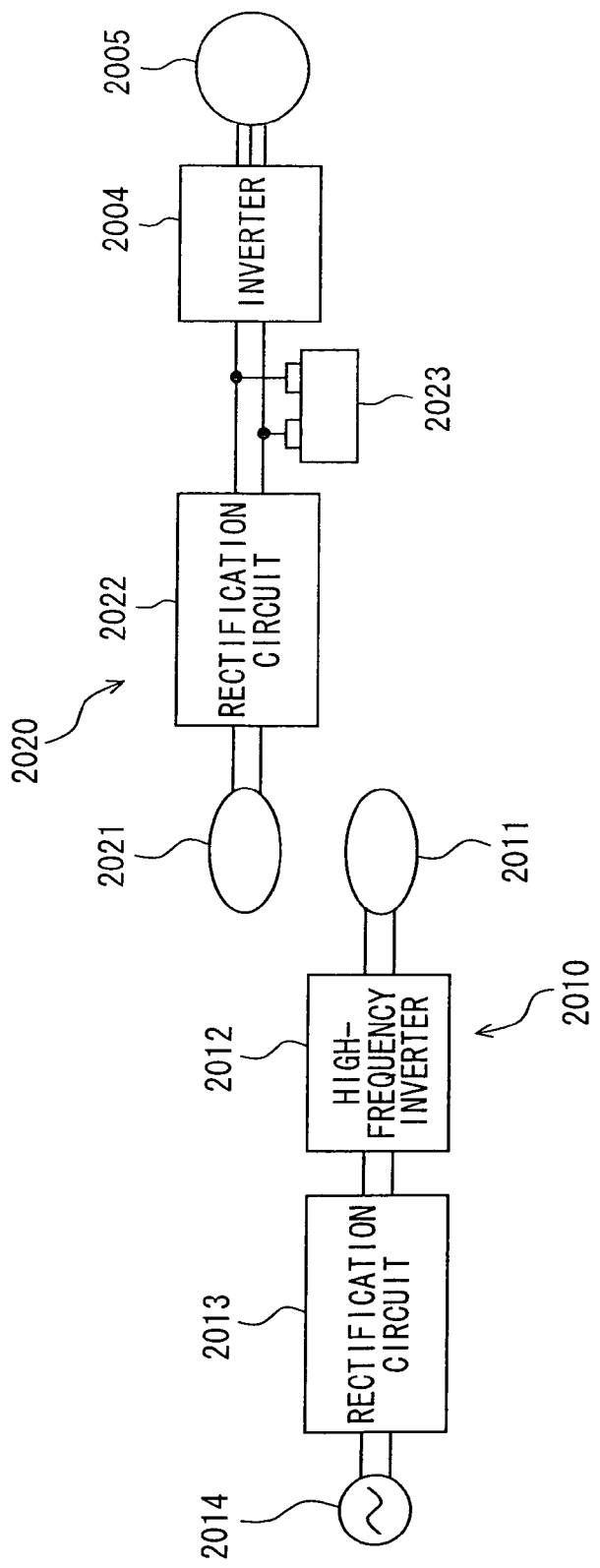
FIG. 13 is a block diagram illustrating a schematic configuration of the non-contact power charge system.
Figure 14:
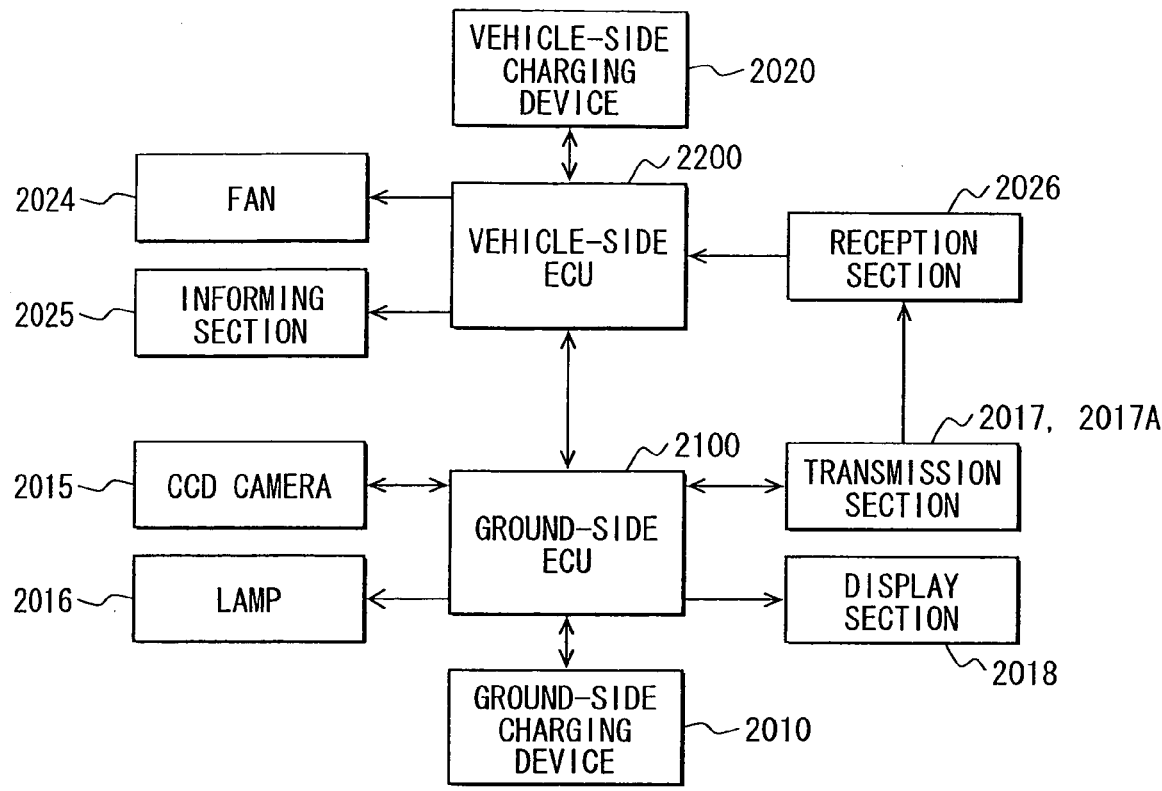
FIG. 14 is a block diagram illustrating a configuration related to a removal unit and a detection unit in the non-contact power charge system.

A second embodiment will be described with reference to FIG. 12 to FIG. 22. A non-contact power charge system described in the second embodiment includes a removal unit that removes an object to be removed, which includes a human body and an animal between a ground-side power transmitting section and a vehicle-side power receiving section at the time of performing the non-contact charging, and further includes a detection unit that detects the object to be removed. FIG. 12 shows a schematic diagram of a non-contact power charge system according to the second embodiment. FIG. 13 shows a block diagram illustrating a schematic configuration of the non-contact power charge system. FIG. 14 shows a block diagram illustrating a configuration related to the removal unit and the detection unit in the non-contact power charge system.

As shown in FIG. 12 and FIG. 13, the non-contact power charge system mainly includes a ground-side charging device 2010, a vehicle-side charging device 2020 that is mounted on a vehicle 2003, a ground-side pad 2001, and a vehicle-side pad 2002. The ground-side charging device 2010 is a ground-side charging facility that is provided outside of the vehicle. The ground-side pad 2001 covers a power transmitting coil 2011 (ground-side power transmitting section) that transmits power in a non-contact manner and is exposed on the ground. The vehicle-side pad 2002 covers a power receiving coil 2021 (vehicle-side power receiving section) that receives power in a non-contact manner and is exposed outside the vehicle. The non-contact power charge system is a non-contact power transmitting and receiving system that performs power transmission and reception in a state that is magnetically coupled between a secondary battery 2023 as a power storage device and an external power supply 2014 provided outside the vehicle, for example, by electromagnetic induction or magnetic resonance.

The vehicle-side pad 2002, the vehicle-side charging device 2020, and the like are mounted on the vehicle 2003. For example, when a current flows to the power-receiving coil 2021 by the electromagnetic coupling, the secondary battery 2023 mounted on the vehicle 2003 may be charged. The vehicle-side charging device 2020 includes, for example, the power-receiving coil 2021, a rectification circuit 2022, the secondary battery 2023, and the like, and operates when power supplied from the external power supply 2014 is charged in the vehicle 2003.

The ground-side charging device 2010 is provided, for example, at a house, an apartment house, a parking facility such as a coin parking, a commercial facility, a public facility, or the like. The ground-side charging device 2010 is a charger in which the power transmitting coil 2011 is connected to the external power supply 2014 that is located outside the vehicle 2003 via a rectification circuit 2013, a high-frequency inverter 2012, and a capacitor (not shown). The ground-side charging device 2010 operates at the time of supplying power to the power-receiving coil 2021 of the vehicle 2003. The power transmitting coil 2011 is provided or buried in a parking space demarcated in a parking facility and generates an electromagnetic field by a predetermined electrical conduction. The power transmitting coil 2011 detects an entry of a vehicle into the parking space. In addition, the power transmitting coil 2011 performs a power transmission and reception in a non-contact manner with the power-receiving coil 2021 provided on the vehicle side.

As shown in FIG. 13, loads such as the secondary battery 2023, an inverter 2004, and a motor generator 2005 are mounted on the vehicle 2003. The loads such as the motor generator 2005 operate based on power of the secondary battery 2023. The operation of the motor generator 2005 is controlled by a vehicle-side ECU 2200 mounted on the vehicle 2003. As the loads that are driven by the power of the secondary battery 2023, in addition to the motor generator 2005, an air conditioning unit, an electrically-driven power steering unit, or the like may be applied.

The rectification circuit 2022 includes a diode and a capacitor. In the rectification circuit 2022, high-frequency power supplied from the power-receiving coil 2021 is rectified by the diode, is made to be smooth by the capacitor, and is supplied to a charging circuit (not shown). The charging circuit charges the secondary battery 2023 by a DC voltage.

The secondary battery 2023 is a high-voltage battery, and is set in a manner such that a terminal voltage becomes a high voltage. The secondary battery 2023 is a battery configured to be chargeable and dischargeable, and for example, a nickel-hydrogen battery, a lithium ion battery, or the like may be used.

The inverter 2004 is a power converting section that converts power form and adjusts an electric energy between the secondary battery 2023 and the motor generator 2005. That is, the inverter 2004 converts the DC power of the secondary battery 2023 to AC power (DC/AC conversion), and adjusts the electric energy necessary for the motor generator 2005. In addition, when the motor generator 2005 is driven to rotate by driving power from driving wheels of a vehicle at the time of deceleration and thereby AC regenerated power is obtained, the inverter 2004 converts the AC regenerated power to DC power (AC/DC conversion) and supplies the converted power to the secondary battery 2023 to charge the power. In this manner, the inverter 2004 may perform a bidirectional power conversion.

As shown in FIG. 14, the vehicle-side ECU 2200 communicates with a ground-side ECU 2100 that controls an operation of the ground-side charging device 2010 and ascertains an operation of respective sections on the ground-side ECU 2100 side. Furthermore, the vehicle-side ECU 2200 controls an operation of the vehicle-side charging device 2020, and controls respective sections that execute a function of the removal unit and the detection unit. The vehicle-side ECU 2200 uses a low-voltage battery in which a terminal voltage is low as a direct power supply. This low-voltage battery uses the secondary battery 2023 as a power supply source. Specifically, a voltage of the secondary battery 2023 is lowered by a DC/DC converter and this lowered output voltage is applied to the low-voltage battery.

The motor generator 2005 is a three-phase AC rotary electrical machinery that has both functions of an electric motor and a generator. One end of a rotational shaft of the motor generator 2005 is directly connected to an output shaft of an internal combustion engine. The other end of the rotational shaft of the motor generator 2005 is mechanically connected to driving wheel via a transmission device. When electricity, which is subjected to a power conversion and a power adjustment by the inverter 2004, is supplied to the motor generator 2005, the number of rotations and driving torque of the motor generator 2005 are controlled, and the motor generator 2005 functions as an electric motor that supplies driving power necessary for the driving wheels. In addition, when being driven to rotate by driving power from the driving wheels at the time of deceleration, the motor generator 2005 functions as a generator that generates AC regenerated power.

Figure 15:
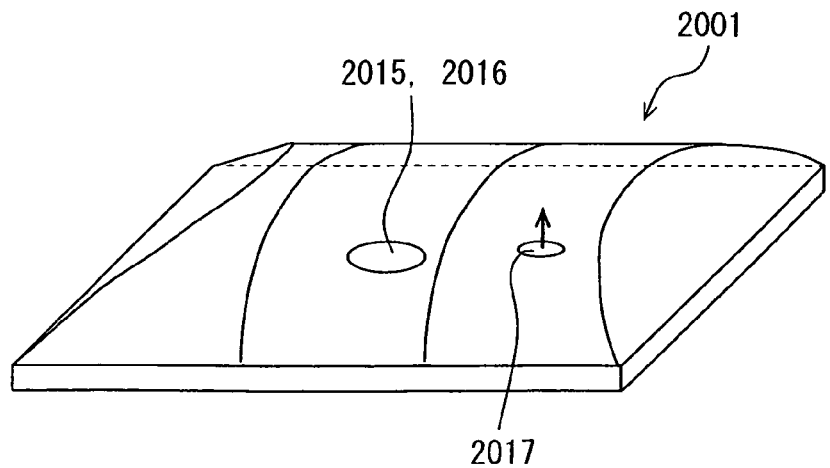
FIG. 15 is an external appearance view illustrating an external appearance of a ground-side pad in the non-contact power charge system.

FIG. 15 shows an external appearance view illustrating an external appearance of a ground-side pad in the non-contact power charge system. The non-contact power charge system includes the ground-side pad 2001 and various removal units. The ground-side pad 2001 covers the power transmitting coil 2011 and is exposed on the ground at the time of performing the non-contact charging or at a stand-by stage of the charging. The various removal units remove an object to be removed, which includes a human body and an animal, from the periphery of the ground-side pad 2001.

(First Removal Unit)

One of the removal units may be made up by making an external surface of the ground-side pad 2001 have a curved surface or an inclined surface and have a swollen shape that is swollen upward. As an example of this removal unit, in FIG. 15, a configuration in which the external surface of the ground-side pad 2001 is formed in a dome shape that is swollen upward. The external surface of the ground-side pad 2001 that is formed in the swollen shape may be formed, for example, in a semi-cylindrical shape, a hemispherical shape, a conical shape, a pyramidal shape, or the like. In these shapes, when an animal climbs on the external surface of the ground-side pad 2001, for example, a dog, a cat, or a small-sized animal climbs on the external surface, it is very unstable and uncomfortable for the animals to stay, and it is easy for the animals to fall from the external surface. Therefore, it is possible to remove these animals far away from the ground-side pad 2001 and the periphery thereof.

(Second Removal Unit)

In addition, the removal unit may be made up by forming a plurality of concave and convex portions on the external surface of the ground-side pad 2001. According to the plurality of concave and convex portions, when the above-described dog, cat, or small-sized animal climbs on the ground-side pad 2001, there is no stability and therefore it is uncomfortable for the animal to stay, and the animal may go far away from the ground-side pad 2001. Therefore, it is possible to remove these animals far away from the ground-side pad 2001 and the periphery thereof. That is, the removal unit exhibits a function as an animal repellent.

(Third Removal Unit)

One of the removal units may be made up by including a lamp 2016 as an illumination unit that emits light toward the object to be removed. As shown in FIG. 15, the lamp 2016 is provided on the bottom side of the ground-side pad 2001, and when the lamp 2016 is lighted-on or flickered, the light is transmitted through the ground-side pad 2001 and illuminates the outside. An operation of the lamp 2016 is controlled by the ground-side ECU 2100.

Figure 16:
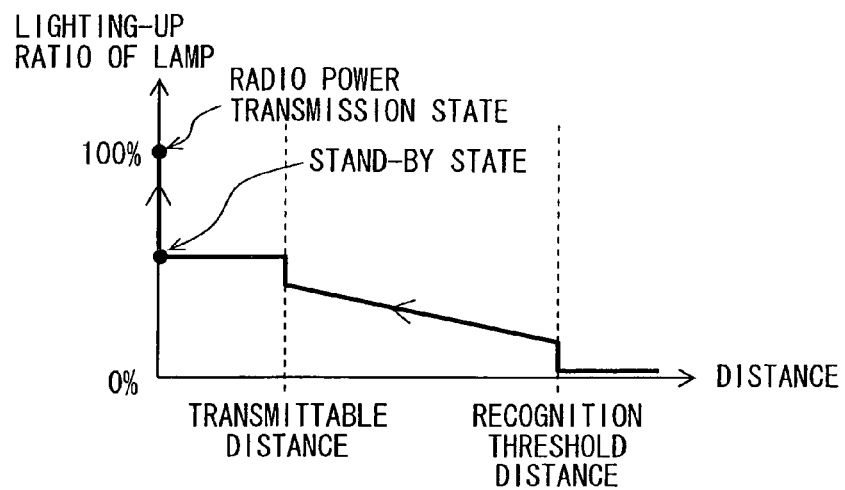
FIG. 16 is a chart diagram illustrating a relationship between a light-on state of a lamp as an illumination unit and a distance between a vehicle and a ground-side charging device in the non-contact power charge system.

Next, a lighting-up control of the lamp 2016 will be described with reference to FIG. 16. FIG. 16 shows a chart diagram illustrating a relationship between a light-on state of the lamp 2016 and a distance between the vehicle 2003 and the ground-side charging device 2010 in the non-contact power charge system.

As shown in FIG. 16, when the distance between the vehicle 2003 and the ground-side charging device 2010, that is, the distance between the vehicle-side pad 2002 and the ground-side pad 2001 is longer than a recognition threshold distance that is a distance at which the ground-side charging device 2010 may be recognized, a lighting-up ratio (luminance) with respect to lighting-up of 100% of the lamp 2016 is several %. In this case, the lamp 2016 repeats a short light-on time and a long light-off time every several seconds. In addition, in this case, it may be in a completely light-off state. When the distance becomes shorter than the recognition threshold distance, the lamp 2016 increases the lighting-up ratio. Furthermore, the further the distance is close to a transmittable distance at which power may be transmitted from the power transmitting coil 2011 to the power-receiving coil 2021, the further the lighting-up ratio increases gradually, and thereby the luminance becomes high. When the vehicle 2003 is closer to the ground-side pad 2001 in relation to a transmittable distance and enters a range in which the power transmission may be performed with a high efficiency, a charging stand-by state is reached. The lighting-up ratio of the lamp 2016 during the charging stand-by state is controlled in a constant manner. In addition, when complete preparations for the charging have been made, and a charging startup state is reached, the lighting-up ratio of the lamp 2016 is controlled to be switched to 100%, and becomes a maximum luminance. In this manner, a person or an animal is informed of the startup of the charging.

FIG. 16 illustrates a situation in which a stand-by state is maintained at the time of the closest approach. In addition, as described above, when the vehicle 2003 enters a high-efficiency region (a case in which the vehicle 2003 is distant by about several tens of cm as compared to the closest approach), the stand-by state may be set. In addition, the above-described luminance transition may be substituted with a transition from a flickering state to a light-on state, or a variation in a flickering interval.

According to this removal unit, light-emission by the lamp 2016 is performed at the time of charging or at a charging stand-by stage. In this manner, with respect to a person, his/her attention is called to a charging state or a charging stand-by state so as to recognize this, and a sense of discomfort or a sense of aversion due to light is given with respect an animal or the like. Therefore, it is possible to expect that the person or animal is urged to be distant from the ground-side pad 2001 and the periphery thereof. In addition, the light-on state or flickering of the above-described lamp 2016 may execute a function of informing a passenger of the vehicle 2003 of a preparation stage of the non-contact charging, a stand-by state, a charging startup state, or a charging state.

In addition, when the distance between the vehicle 2003 and the ground-side charging device 2010 is longer than the recognition threshold distance, the lamp 2016 may be lit up with a green color. The person may be informed of the presence of the ground-side pad 2001 by performing the lighting-up with the green color. Therefore, an effect of preventing a step being stumbled over, or the like is obtained, and therefore this is very useful when surroundings are dark such as at night. Then, when the distance is shorter than the recognition threshold distance, a control may be performed in a manner such that the lighting color is changed to a red color and luminance is gradually raised.

(Fourth Removal Unit)

One of the removal units may be made up by including an ultrasonic wave transmitter as an ultrasonic wave transmitting unit that transmits ultrasonic waves toward the object to be removed. For example, as shown in FIG. 15, the ultrasonic wave transmitter includes a transmission section 2017 that is provided to the ground-side pad 2001 on the bottom side thereof. An operation of this transmission section 2017 is controlled by the ground-side ECU 2100. The transmission section 2017 transmits ultrasonic waves upward with a frequency which animals such as a dog, a cat, and a mouse hate. This removal unit transmits ultrasonic waves at the time of charging or charging stand-by stage. According to this removal unit, an object to be removed, which is present on the ground-side pad 2001, such as a small-sized insect and a dead body may be blown off, or a sense of discomfort or a sense of aversion due to the ultrasonic waves may be given to an animal or the like. Therefore, it is possible to expect that the object to be removed is urged to be distant from the ground-side pad 2001 and the periphery thereof.

(Fifth Removal Unit)

Figure 17:
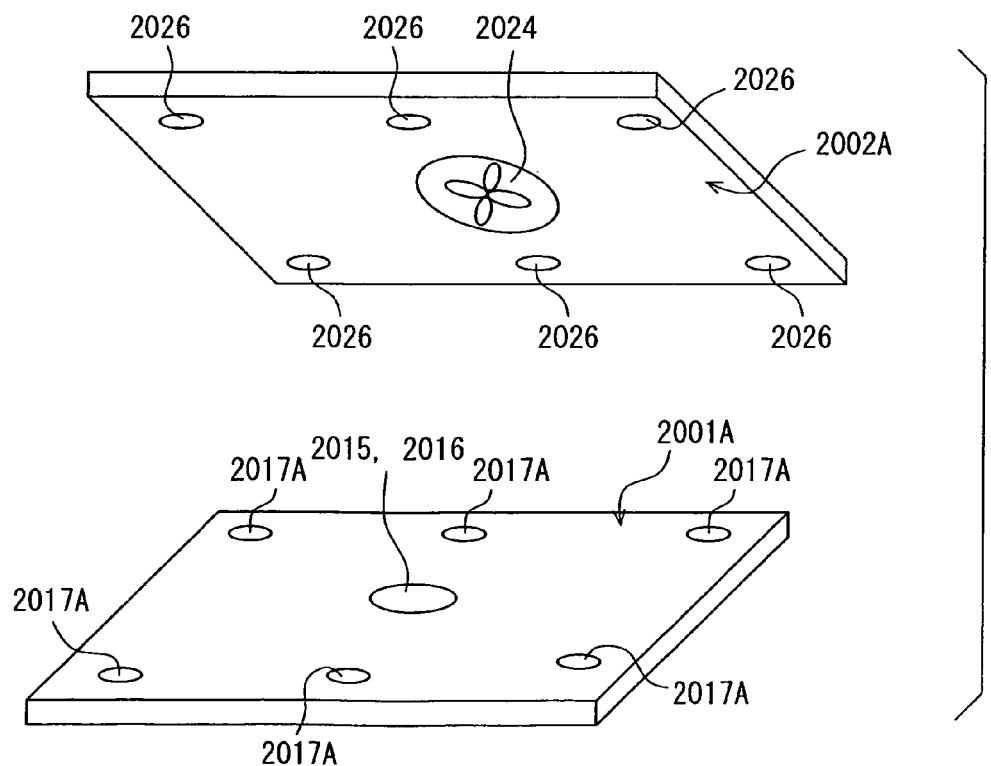
FIG. 17 is an external appearance view illustrating a vehicle-side pad and a ground-side pad of another form in the non-contact power charge system.

One of the removal units may be made up by including a fan 2024 as a blowing unit that blows air toward the ground-side pad 2001A. FIG. 17 shows an external appearance view illustrating an external appearance of a vehicle-side pad 2002A and a ground-side pad 2001A of another form in the non-contact power charge system.

As shown in FIG. 17, the fan 2024 is provided to the vehicle-side pad 2002A at a position at which the power-receiving coil 2021 is not disposed and is capable of blowing air downward. An operation of the fan 2024 is controlled by the vehicle-side ECU 2200. The fan 2024 is controlled to blow air toward the ground-side pad 2001A at the time of performing the non-contact charging, during performing the charging, or a charging stand-by stage. In addition, an air volume of the blowing performed by the fan 2024 may be controlled in a manner such that the air volume may be changed depending on a kind of the object to be removed, a size of the object, a weight of the object, or the like.

According to this removal unit, air is blown toward the ground-side pad 2001A at the time of charging or at the charging stand-by stage. Due to this removal unit, a small-sized object to be removed, which is present on the ground-side pad 2001A, such as an insect, a small-sized animal, and a dead body thereof may be blown off, or a sense of discomfort or a sensor of aversion due to wind may be given to an animal or the like. Therefore, the removal unit contributes to the urging of the object to be removed to be distant from the ground-side pad 2001A and the periphery thereof.

The non-contact power charge system includes various detection units that detect the object to be removed on the ground-side pad 2001A and at the periphery thereof at the time of performing the non-contact charging or the charging stand-by stage.

(First Detection Unit)

One of the detection units is a unit that detects whether or not the object to be removed is present based on an image obtained by imaging the ground-side pad 2001 or 2001A and the periphery thereof. A CCD camera 2015 is provided to the ground-side pad 2001 or 2001A, and images an image on the ground-side pad 2001 or 2001A, and at the periphery thereof.

The image that is imaged by the CCD camera 2015 is transmitted to a CCD that is an imaging device converting light and shade of light to strength and weakness of a current. The CCD converts the image to an electric signal and inputs the electric signal to the ground-side ECU 2100. The ground-side ECU 2100 performs an image analysis by analyzing the input electric signal, and determines whether or not the object to be removed is present. In a case where the object to be removed is detected, the ground-side ECU 2100 informs this situation, or performs charging stoppage. Furthermore, the ground-side ECU 2100 displays at least one of detection information of the object to be removed and the charging stoppage information on a display section 2018, and outputs this information to the vehicle-side ECU 2200. The vehicle-side ECU 2200 allows an informing section 2025, which is provided to the vehicle 2003, to inform a passenger such as a driver of the above-described information.

The display section 2018 is a display screen provided on the charging facility side and is made up by, for example, a liquid crystal display. The informing section 2025 is a unit that informs a passenger of the vehicle 2003 of the detection information of the object to be removed and the charging stoppage information by voice or display. The informing section 2025 is made up by, for example, a liquid crystal display disposed in front of a handle or at a part of an instrument display panel disposed at the central portion of a dashboard.

In addition, the CCD camera 2015 may be made up by a lamp-mounted camera that is integrally formed with the lamp 2016. In addition, the CCD camera 2015 may be provided on the vehicle-side pad 2002 or 2002A and may image an image on the ground-side pad 2001A. In this case, the CCD converts the image into an electric signal and inputs the signal to the vehicle-side ECU 2200.

According to this detection unit, the vehicle-side ECU 2200 stops the non-contact charging in a case where the presence of the object to be removed is detected at the time of performing the non-contact charging or at the charging stand-by stage. In addition, in this case, the vehicle-side ECU 2200 displays at least one of the detection information of the object to be removed and the charging stoppage information on the display section 2018. In addition, in this case, the vehicle-side ECU 2200 informs a passenger of the information by the informing section 2025 on the vehicle 2003 side. According to this configuration, it is possible to prevent a person who is not aware of the non-contact charging or an animal not having a capability of determining the non-contact charging from being present on the ground-side pad 2001 or 2001A or at the periphery thereof and being affected by an electromagnetic field in advance.

In addition, it is possible to reliably detect the object to be removed, which has a discriminative size, through the image analysis by detecting whether or not the object to be removed is present from the imaged image. In addition, the passenger may recognize that a human body or an animal is present on the ground-side pad 2001 or 2001A or at the periphery thereof, and therefore it is possible to take measures of danger avoidance, charging stoppage, and the like.

(Second Detection Unit)

One of the detection units may includes a transmission section that transmits a predetermined light beam or sonic waves toward the object to be removed, and a reception section that receives reflected waves or transmitted waves thereof. As shown in FIG. 17, the transmission section 2017A is a plurality of transmitters that are provided at a peripheral edge of the ground-side pad 2001A with a predetermined distance. For example, the transmission section 2017A is an ultrasonic sensor that detects whether or not the object to be removed is present. The reception section 2026 is a receiver that receives reflected waves or transmitted waves, which are reflected by the object to be removed or transmitted therethrough, of the ultrasonic waves transmitted from the transmission section 2017A. For example, a plurality of the reception sections 2026 are provided at a peripheral edge of the vehicle-side pad 2002A with a predetermined distance. An operation of the transmission section 2017A is controlled by the ground-side ECU 2100. The reflected waves or transmitted waves that are received by the reception section 2026 are input to the vehicle-side ECU 2200 as an electric signal. In this manner, the vehicle-side ECU 2200 detects whether or not the object to be removed is present.

When the object to be removed is detected, the vehicle-side ECU 2200 or the ground-side ECU 2100 stops the charging. Furthermore, the vehicle-side ECU 2200 or the ground-side ECU 2100 informs the informing section 2025 of at least one of the detection information of the object to be removed and the charging stoppage information, or displays at least one of the detection information of the object to be removed and the charging stoppage information on the display section 2018.

In addition, in a case where the transmission section 2017A is a unit that transmits light, a photoelectric sensor may be used. In addition, the detection unit may be, for example, the transmission section 2017 provided to the ground-side pad 2001 as shown in FIG. 15. In this case, the ultrasonic waves transmitted from the transmission section 2017 are reflected by the object to be removed that is present on the ground-side pad 2001 or at the periphery thereof, and these reflected waves are received by the transmission section 2017 and the detection is performed. In addition, this transmission section 2017 may be provided to the vehicle-side pad 2002.

According to this detection unit, in a case where the presence of the object to be removed is detected by the detection using light or a sonic waves at the time of performing the non-contact charging or at the charging stand-by stage, the non-contact charging is stopped. According to this configuration, it is possible to prevent a person who is not aware of the non-contact charging or an animal not having capability of determining the non-contact charging from being present on the ground-side pad 2001 or 2001A or at the periphery thereof and being affected by an electromagnetic field in advance.

In addition, at least one of the detection information of the object to be removed and the charging stoppage information is informed, by the informing section 2025 on the vehicle 2003 side, such that the passenger may recognize that a human body or animal is present on the ground-side pad 2001 or 2001A or at the periphery thereof, and therefore it is possible to take measures of danger avoidance, charging stoppage, and the like. In addition, a user outside the vehicle may be informed of information about presence of a foreign body from the reception section 2017, the reception section 2017A, or the informing section 2025 over the Internet or a cellular phone.

Next, an operation related to the charging in the non-contact power charge system will be described with reference to each flowchart in FIG. 18 to FIG. 22.

(First Removal Control)

Figure 18:
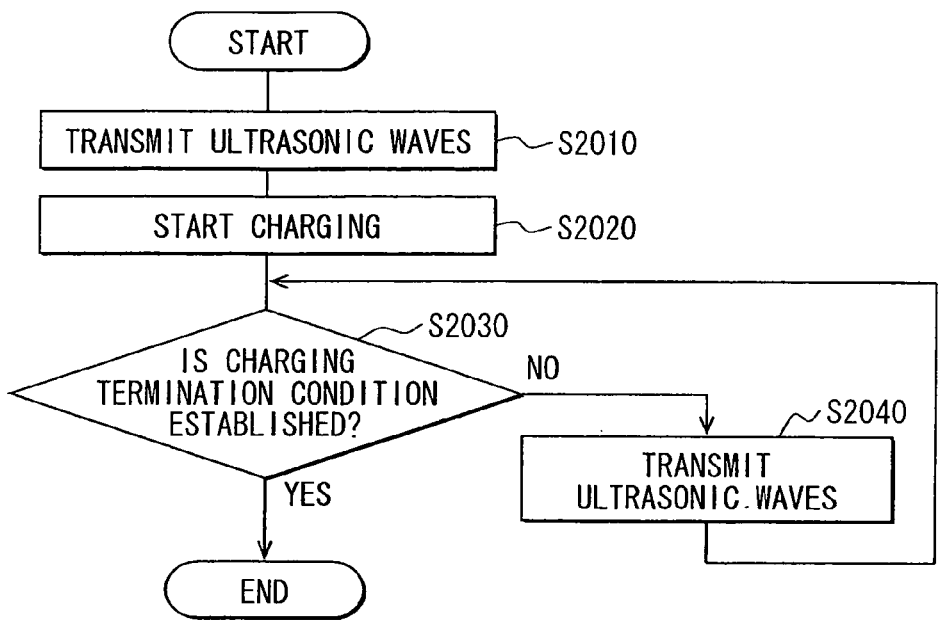
FIG. 18 is a flowchart illustrating a first removal control that is performed to remove an object to be removed in the non-contact power charge system.

FIG. 18 shows a flowchart illustrating a first removal control that is performed to remove an object to be removed in the non-contact power charge system. The flowchart shown in FIG. 18 is started when the power receiving coil 2021 of the vehicle 2003 approaches the ground-side power transmitting coil 2011 to a distance at which the charging may be performed, and other charging execution conditions are satisfied, and thereby the vehicle enters the charging stand-by stage. First, in step 2010, the ground-side ECU 2100 performs a control to allow the ultrasonic waves that are one of the removal units to be transmitted from the transmitting section 2017. Due to the transmission of the ultrasonic waves, an object to be removed, which is located on the ground-side pad 2001 and at the periphery thereof, is affected by the ultrasonic waves, such that the object to be removed is in the habit of being far away from the ground-side pad 2001 so as to escape from the ultrasonic waves of a frequency at which the object to be removed feels a sense of aversion. Due to the operation of the ultrasonic waves, it is possible to remove the animal or the like.

After removing the object to be removed from the ground-side pad 2001 and the periphery thereof through the process in step 2010, the ground-side ECU 2100 and the vehicle-side ECU 2200 start the charging operation in step 2020. This charging is performed until the SOC (state of charge) of the secondary battery 2023 of the vehicle 2003 reaches a predetermined SOC, for example, a full-charged SOC or an SOC that is set by a user. When reaching this SOC, it is regarded that the charging termination condition is established. The charging operation is terminated when it is determined that the charging termination condition is satisfied in step 2030, and this flowchart is terminated. The establishment of the charging termination condition means that an amount of power storage of the secondary battery 2023 reaches a fully-charged SOC electric energy, or the set SOC.

In step 2030, when it is determined that the charging termination condition is not established yet, the transmission of the ultrasonic waves that is the same process as preceding step 2010 is performed again in step 2040, and the removal process of the object to be removed is performed again, and then it returns to the determination in step 2030. That is, in this control, the removal process by the transmission of the ultrasonic waves is repeated until the charging termination condition is established after the charging startup, even during the charging state. According to this configuration, in this control, the removal process may be performed in both the stand-by state before the charging and the charging state. In addition, as another control aspect, the removal process may be performed in any one of the stand-by state before the charging and the charging state without performing several processes in step 2010 or step 2040.

(Second Removal Control)

Figure 19:
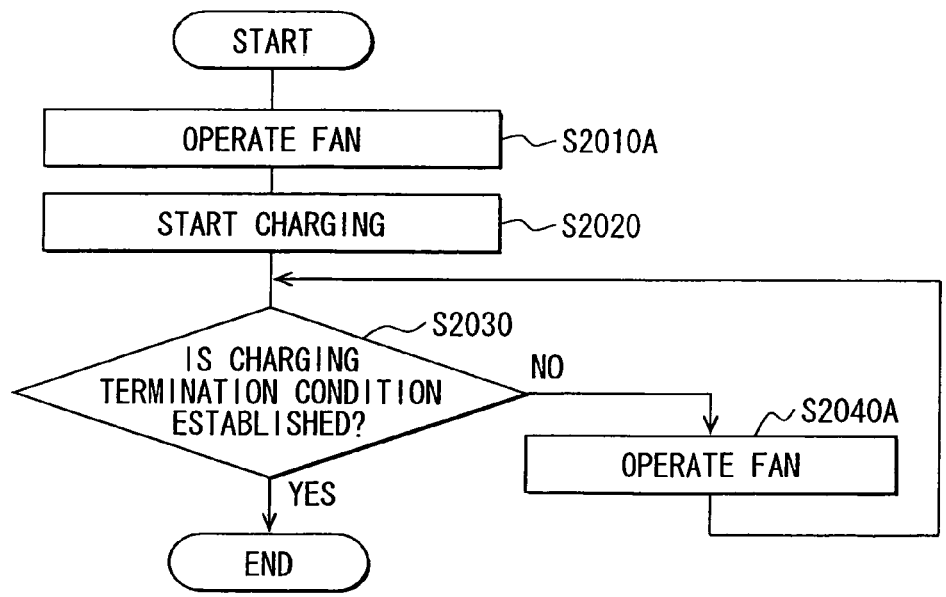
FIG. 19 is a flowchart illustrating a second removal control that is performed to remove the object to be removed in the non-contact power charge system.

FIG. 19 shows is a flowchart illustrating a second removal control that is performed to remove the object to be removed in the non-contact power charge system. The flowchart shown in FIG. 19 is started when the power receiving coil 2021 of the vehicle 2003 approaches the ground-side power transmitting coil 2011 to a distance at which the charging may be performed, and other charging execution conditions are satisfied, and thereby the vehicle enters the charging stand-by stage. First, in step 2010A, the vehicle-side ECU 2200 controls the fan 2024 so as to perform the blowing by the fan 2024 that is one of the removal units. Due to this blowing, the object to be removed, which is present on the ground-side pad 2001A and at the periphery thereof is exposed to wind. Therefore, the object to be removed feels a sense of discomfort or a sense of aversion due to wind and moves far away from the ground-side pad 2001A so as to escape from the wind pressure. Due to this blowing operation, it is possible to perform the removal of the animal or the like.

After the object to be removed is removed from the ground-side pad 2001 and the periphery thereof by the process in step 2010A, the ground-side ECU 2100 and the vehicle-side ECU 2200 start the charging operation in step 2020. This charging is performed until the SOC of the secondary battery 2023 of the vehicle 2003 reaches a predetermined SOC. The charging operation is terminated when it is determined that the charging termination condition is satisfied in step 2030, and this flowchart is terminated.

In step 2030, when it is determined that the charging termination condition is not established yet, in step 2040A, the blowing process by the fan 2024, which is the same process as in step 2010A, is performed again, and thereby the removal process of the object to be removed is performed again, and then the determination in step 2030 is returned to. That is, in this control, the removal process by the blowing using the fan 2024 is repeated until the charging termination condition is established after the charging startup, even during the charging state. According to this configuration, in this removal control, the removal process may be performed in both the stand-by state before the charging and the charging state. In addition, as another control aspect, the removal process may be performed in any one of the stand-by state before the charging and the charging state without performing several processes in step 2010A or step 2040A.

In addition, in regard to the operation in step 2040 or step 2040A, an intermittent operation in which the corresponding function may be maintained (turning-on and turning-off are repeated for every several seconds) may be performed, instead of maintaining the operation in the turned-on state for whole period in succession.

(First Detection Control)

Figure 20:
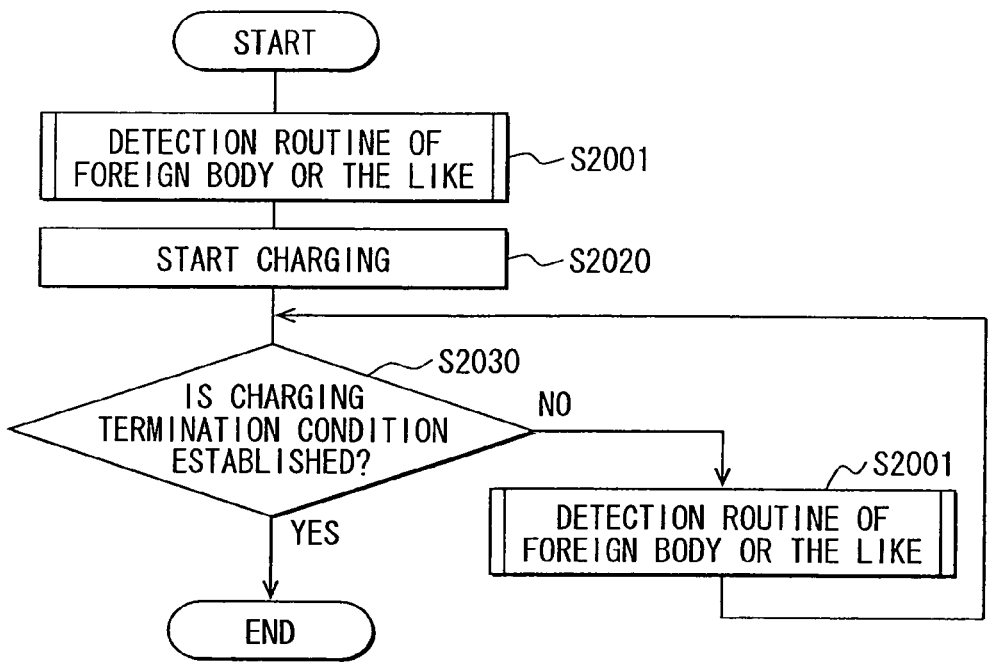
FIG. 20 is a flowchart illustrating a first detection control that is performed to detect the object to be removed in the non-contact power charge system.

FIG. 20 shows a flowchart illustrating a first detection control that is performed to detect the object to be removed in the non-contact power charge system. The flowchart shown in FIG. 20 is started when the power receiving coil 2021 of the vehicle 2003 approaches the ground-side power transmitting coil 2011 to a distance at which the charging may be performed, and other charging execution conditions are satisfied, and thereby the vehicle enters the charging stand-by stage. First, in step 2001, the ground-side ECU 2100 or the vehicle-side ECU 2200 execute a sub-routine that performs the detection of the object to be removed such as a foreign body, which is a characteristic of the present detection control. Due to the execution of this sub-routine, it is determined whether or not the foreign body or the like is present on the ground-side pad 2001 or 2001A and at the periphery thereof, and a suitable process corresponding to the determination result may be executed.

Next, this sub-routine will be described with reference to FIG. 21 (a first detection routine) and FIG. 22 (a second detection routine).

(First Detection Routine)

Figure 21:
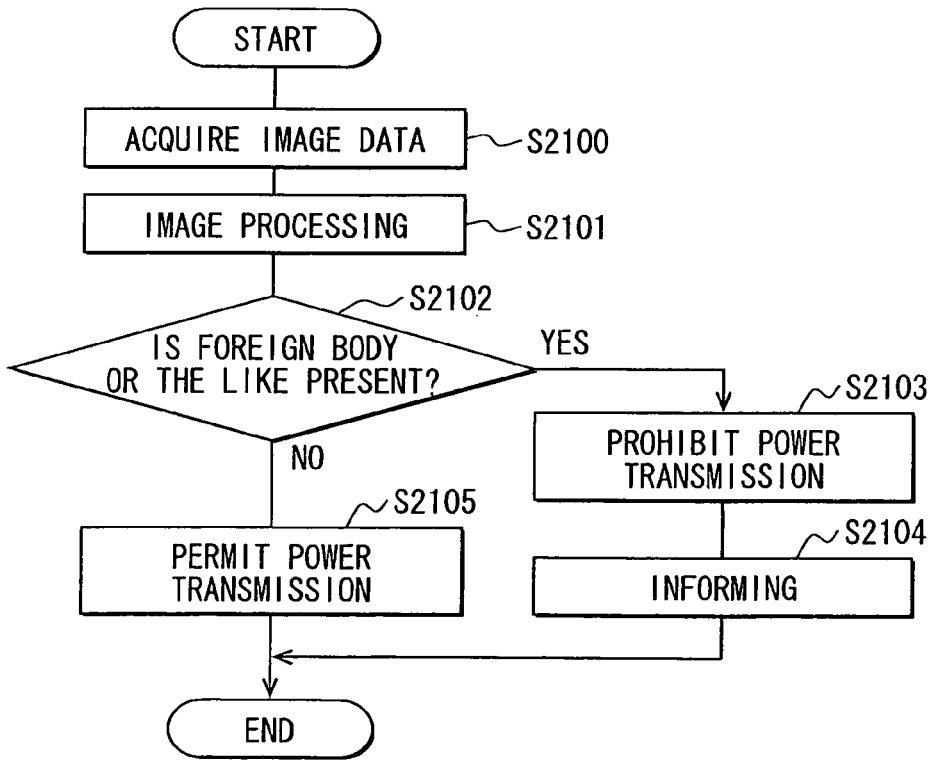
FIG. 21 is a flowchart illustrating a first detection routine.

FIG. 21 shows a flowchart illustrating the first detection routine that is executed in step 2001 in FIG. 20. In the first detection routine, the detection of the foreign body or the like is performed by the first detection unit. As shown in FIG. 21, first, in step 2100, image data obtained by imaging the ground-side pad 2001 or 2001A using the CCD camera 2015, and the periphery thereof is acquired. The image data is input to the ground-side ECU 2100 as an electric signal by the CCD that is an imaging device. In step 2101, the ground-side ECU 2100 analyzes the image data acquired as an electric signal and executes an image processing.

In addition, in step 2102, the ground-side ECU 2100 determines whether or not the object to be removed such as a foreign body is present within an imaging range that is included in the image data by using the image processing result. In a case where the determination in step 2102 represents "foreign body or the like is not present", in step 2105, the ground-side ECU 2100 transmits a power transmission permission signal, which corresponds to charging startup permission, to the ground-side power transmitting coil 2011 and then this sub-routine is terminated.

In a case where the determination in step 2102 represents "foreign body or the like is present", in step 2103, the ground-side ECU 2100 transmits a power transmission prohibition signal, which corresponds to charging startup non-permission, to the power transmitting coil 2011. Furthermore, in step 2104, the ground-side ECU 2100 performs a control in a manner such that the informing section 2025 informs at least one item of information from detection information of the object to be removed and charging stoppage information as described above via the vehicle-side ECU 2200, and then this sub-routine is terminated. In addition, the ground-side ECU 2100 may perform a control in a manner such that the display section 2018 displays the corresponding information in this step.

(Second Detection Routine)

Figure 22:
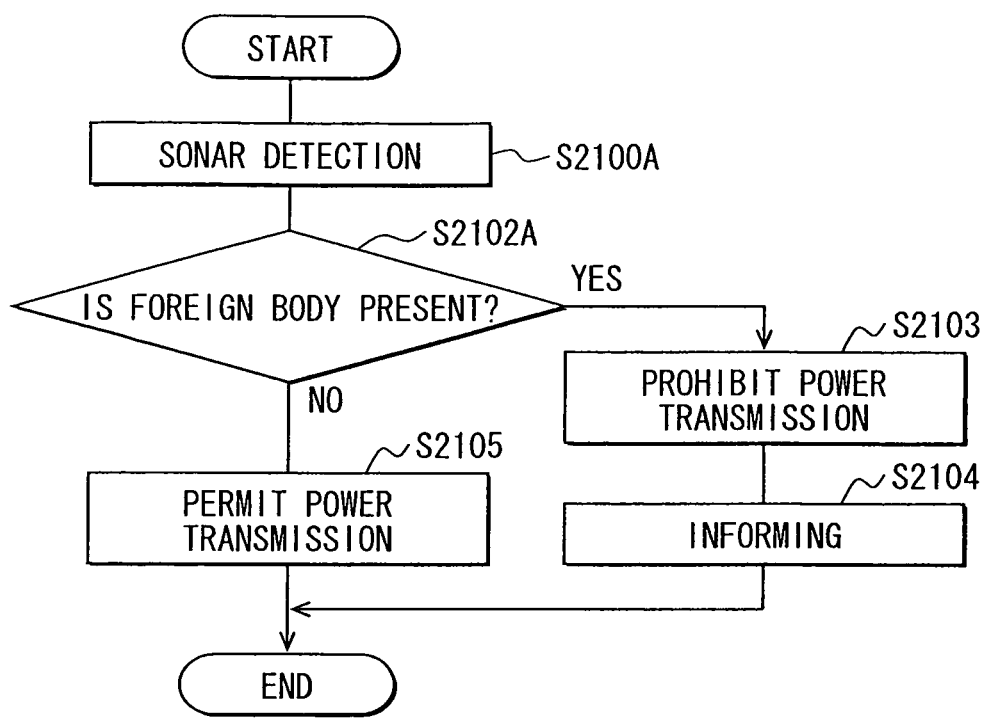
FIG. 22 is a flowchart illustrating a second detection routine.

FIG. 22 shows a flowchart illustrating the second detection routine that is executed in step 2001 of FIG. 20. In this second detection routine, the detection of the foreign body or the like is performed by the second detection unit. As shown in FIG. 22, first, in step 2100A, a sonar detection using ultrasonic waves is performed by using the transmission section 2017A, or the transmission section 2017 and the reception section 2026 as described above. A signal by reflected waves or transmitted waves that is detected on a receiver side is input to the ground-side ECU 2100 or the vehicle-side ECU 2200.

In step 2102A, the ground-side ECU 2100 or the vehicle-side ECU 2200 calculates the input signal or the like, and determines whether or not the object to be removed such as the foreign body is present within a detectable range by the sonar detection. In a case where the determination in step 2102A represents "foreign body or the like is not present", in step 2105, the ground-side ECU 2100 transmits a power transmission permission signal, which corresponds to charging startup permission, to the power transmitting coil 2011 and then this sub-routine is terminated.

In a case where the determination in step 2102A represents "foreign body or the like is present", in step 2103, the ground-side ECU 2100 transmits a power transmission prohibition signal, which corresponds to charging startup non-permission, to the power transmitting coil 2011. Furthermore, in step 2104, the ground-side ECU 2100 performs a control in a manner such that the informing section 2025 informs at least one information between detection information of the object to be removed and charging stoppage information as described above via the vehicle-side ECU 2200, and then this sub-routine is terminated. In addition, the ground-side ECU 2100 may perform a control in a manner such that the display section 2018 displays the corresponding information in this step.

In this manner, in a case where the presence of the object to be removed is detected, the process of informing the presence of the object to be removed is performed by the informing section 2025 or the display section 2018, such that a user may take measures of danger avoidance, charging stoppage, or the like until it reaches a subsequent charging startup. In addition, in a sub-routine, a process of automatically stopping the charging may be performed, together with the performing of the informing process to inform the presence of the object to be removed so as to secure a relatively high stability.

As described above, after executing the sub-routine of performing the detection of the object to be removed, as shown in FIG. 20, in step 2020, the ground-side ECU 2100 and the vehicle-side ECU 2200 start the charging operation. This charging is performed until the SOC of the secondary battery 2023 of the vehicle 2003 reaches a predetermined SOC as described above. The charging operation is terminated when it is determined that the charging termination condition is satisfied in step 2030, and this flowchart is terminated.

In step 2030, when it is determined that the charging termination condition is not established yet, the above-described sub-routine of step 2001 is executed again, and thereby the detection process of the object to be removed is performed again, and then it returns to the determination in step 2030. That is, in this control, the detection process of the object to be removed such as the foreign body is repeated until the charging termination condition is established after the charging startup, even during the charging state. According to this configuration, in this control, the detection process of the object to be removed such as the foreign body may be performed in both the stand-by state before the charging and the charging state. In addition, as another control aspect, the removal process may be performed in any one of the stand-by state before the charging and the charging state.

An operational effect of the non-contact power charge system of this embodiment be described. The non-contact power charge system includes the removal unit that removes the object to be removed, which includes a human body, an animal or the like, from the ground-side pad 2001 covering the power transmitting coil 2011 and the periphery thereof, in the case of performing the non-contact charging or at the stand-by stage before performing the charging.

According to this configuration, at the time of the non-contact charging or at the stand-by state thereof, it is possible to remove the object to be removed, which includes a human body, the animal, or the like, from the ground-side pad 2001 or 2001A, and the periphery thereof by the removal unit. Therefore, it is possible to prevent a person who is not aware of the charging startup state because of the non-contact charging or an animal not having capability of determining the power transmission from the ground-side pad 2001 or 2001A from being present at the ground-side pad 2001 or 2001A or at the periphery thereof and being affected by an electromagnetic field in advance. As a result, it is possible to avoid a state in which living beings may be affected by an adverse effect.

The removal unit is made up by making the external surface of the ground-side pad 2001 have a curved surface or an inclined surface and have a swollen shape that is swollen upward. According to this configuration, since the external surface of the ground-side pad 2001 is formed to have the swollen shape, when an animal or insect climbs on the ground-side pad 2001 that is located in the power transmission path and is exposed on the ground, the animal or insect slides down from a pad portion, or there is no stability and therefore it is uncomfortable for the animal or insect to stay, and as a result, the animal or insect may go far away from the ground-side pad 2001. In addition, in regard to a person, the ground-side pad 2001 has an external appearance that is easily visible, such that it is easy for the person to be aware of the pad 2001 and it is possible to urge the person to be cautious so as not be close to the pad 2001. Therefore, there is an effect of reducing a possibility of being susceptible to an effect from an electromagnetic field.

Furthermore, the removal unit may be made up by forming a plurality of concave and convex portions on the external surface of the ground-side pad 2001A that has the curved surface or the inclined surface and is formed in the swollen shape that is swollen upward. According to this removal unit, when the animal climbs on the plurality of concave and convex portions, it is uncomfortable for the animal to stay or the animal feels a sense of aversion, such that a dual-removal unit may be constructed. Therefore, due to the dual-removal unit, a further high effect as an animal repellent may be expected.

In addition, the non-contact power charge system includes the detection unit that detects the object to be removed, which includes a human body, and an animal, on the ground-side pad 2001 or 2001A and at the periphery thereof. When detecting the object to be removed at the time of performing the non-contact charging or at the stand-by stage before performing the charging, the detection unit stops the non-contact charging.

According to this configuration, in a case where the presence of the object to be removed is detected by the detection unit at the time of performing the non-contact charging or at the stand-by stage thereof, the non-contact charging is stopped. In this manner, it is possible to prevent a person who is not aware of the charging startup state because of the non-contact charging or an animal not having capability of determining the power transmission from the ground-side pad 2001 or 2001A from being present at the ground-side pad 2001 or 2001A or at the periphery thereof and being affected by an electromagnetic field in advance.

Other Embodiments

Hereinbefore, description has been made with respect to the embodiment, but it is not limited to the above-described embodiment and various modifications may be made without departing from the scope of the invention.

The respective various removal units and various detection units that are described in the embodiment may be executed in a state in which two or more thereof are combined. For example, one removal unit and one or a plurality of detection units may be combined, one detection unit and one or a plurality of removal units may be combined, or a plurality of detection units and a plurality of removal units may be combined.

Third Embodiment

Figure 23:
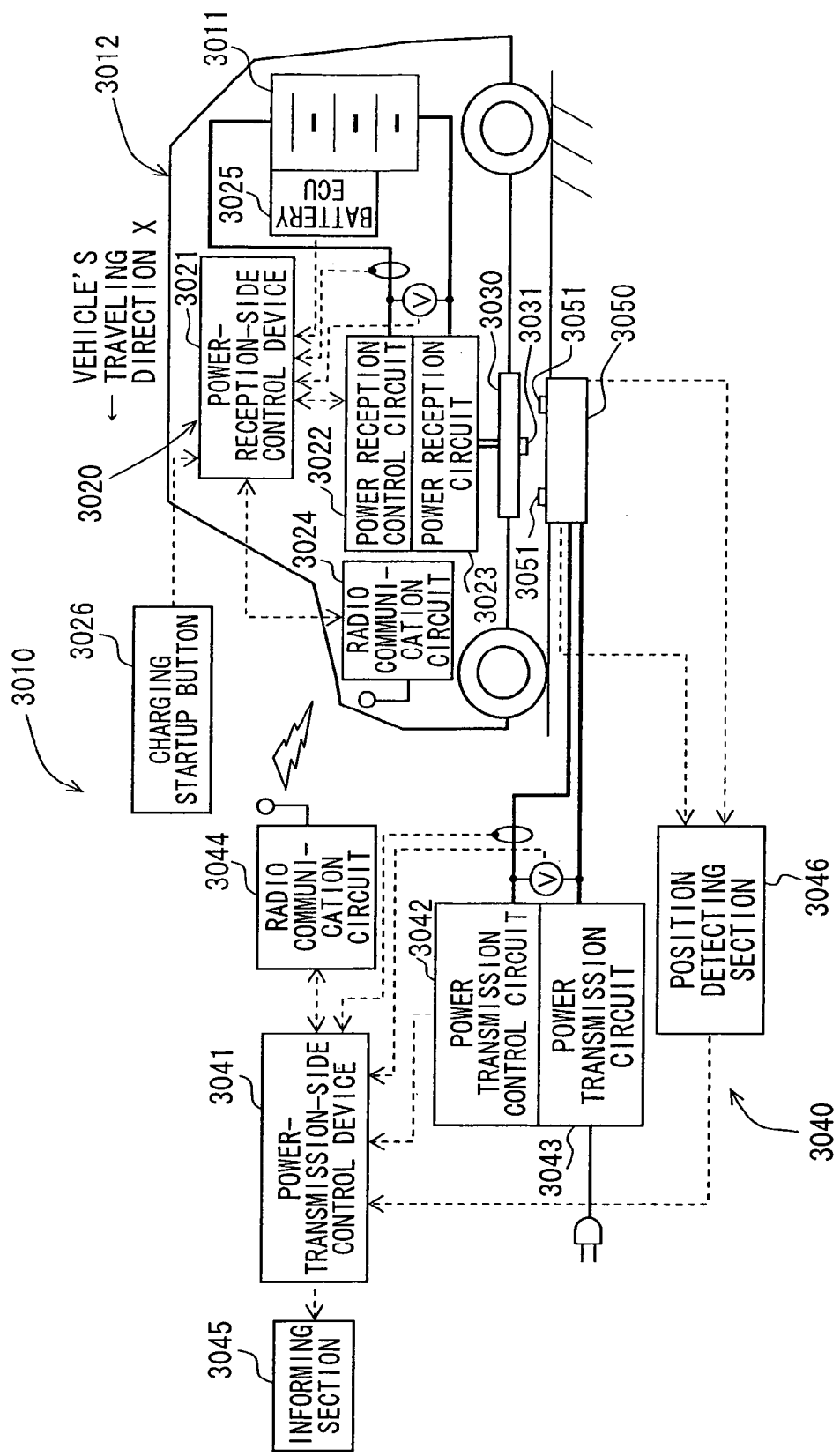
FIG. 23 is a block diagram illustrating a non-contact power supply system 10 according to a third embodiment.

A third embodiment will be described with reference to FIG. 23 to FIG. 28. FIG. 23 shows an electrical configuration of a block diagram illustrating a non-contact power supply system 3010 according to a third embodiment. The non-contact power supply system 3010 is applicable to, for example, a case in which a main battery of an electric vehicle, and a plug-in hybrid car, or the like is charged. The non-contact power supply system 3010 transmits power by an electromagnetic induction method in a non-contact manner between a main battery 3011 that is a secondary battery and an external power supply (not shown) provided outside the vehicle 3012. The electromagnetic induction method is a method in which power is transmitted by using an induced magnetic flux that is generated between a power transmitting side and a power receiving side. The non-contact power supply system 3010 includes a power receiving device 3020 and a vehicle-side pad 3030 that are mounted on the vehicle 3012, and a power transmitting device 3040 and a ground-side pad 3050 that are provided outside the vehicle 3012. In addition, the ground-side pad 3050 and the vehicle-side pad 3030 are collectively called a non-contact power supply device.

First, the power transmitting device 3040 will be described. The power transmitting device 3040 is provided, for example, at a house, an apartment house, a parking facility such as a coin parking, a commercial facility, a public facility, or the like. The power transmitting device 3040 is connected to an external power supply (not shown) and the ground-side pad 3050 that are located outside the vehicle 3012. The external power supply is, for example, a system power supply. The power transmitting device 3040 operates when power is supplied to the vehicle-side pad 3030 of the vehicle 3012. Therefore, the power transmitting device 3040 transmits power from the external power supply to the vehicle 3012. The power transmitting device 3040 includes a power-transmission-side control device 3041, a power transmission control circuit 3042, a power transmission circuit 3043, a power-transmission-side radio communication circuit 3044, an informing section 3045, and a position detecting section 3046. The power transmitting device 3040 is controlled by a power-transmission-side control device 3041.

The power-transmission-side radio communication circuit 3044 performs radio communication with the power receiving device 3020, and transmits and receives various kinds of information about the power transmitting device 3040 and various kinds of information about the power receiving device 3020 to and from the power receiving device 3020. The power-transmission-side radio communication circuit 3044 provides the received information for the power-transmission-side control device 3041. In addition, the power-transmission-side radio communication circuit 3044 transmits the information from the power-transmission-side control device 3041 to the power receiving device 3020.

The informing section 3045 is an informing unit and informs a user of a situation of the power transmitting device 3040 and the power receiving device 3020. The informing section 3045 informs the user of the information from the power-transmission-side control device 3041, for example, a charging completion time and an amount of charge.

The position detecting section 3046 is a position detecting unit and detects a relative position between the ground-side pad 3050 and the vehicle-side pad 3030. The position detecting section 3046 provides the relative position that is detected for the power-transmission-side control device 3041.

The power transmission control circuit 3042 controls the power transmission circuit 3043 to control startup and stoppage of the power transmission. The power transmission control circuit 3042 is controlled by the power-transmission-side control device 3041. Although not shown, the power transmission circuit 3043 includes a high-frequency converting circuit and a resonance circuit.

The high-frequency converting circuit converts the power supplied from the external power supply into a high-frequency power, and provides the converted power for the resonance circuit. The resonance circuit performs conversion in a manner such that phases of a voltage and a current of the power supplied from the high-frequency converting circuit match each other so as to efficiently transmit the power, and supplies the converted power to the ground-side pad 3050.

The power-transmission-side control device 3041 controls the power transmission control circuit 3042 on the basis of the information from the power-transmission-side radio communication circuit 3044, the information from the position detecting section 3046, and the voltage and current of power transmitted to the ground-side pad 3050.

Next, the ground-side pad 3050 will be described. The ground-side pad 3050 includes a power transmitting coil (a primary coil) that transmits power in a non-contact manner at the inside thereof, and is provided so as to be exposed on the ground. In regard to a contour of the ground-side pad 3050, a part thereof covering the power transmitting coil (not shown) is exposed on the ground.

The power transmitting coil is embedded in the ground-side pad 3050. The power transmitting coil is provided and buried within a parking space demarcated in a parking facility together with the ground-side pad 3050, and is configured to generate an electromagnetic field by a predetermined electrical conduction. The power transmitting coil performs power transmission and reception in a non-contact manner between a power receiving coil provided on the vehicle 3012 side. The power transmitting coil is connected to the power transmission circuit 3043 and transmits the high-frequency power, which is supplied from the power transmission circuit 3043, to the vehicle 3012 on which the power receiving coil is mounted through electromagnetic induction.

Next, the vehicle-side pad 3030 will be described. The vehicle-side pad 3030 includes a power receiving coil (a secondary coil) that receives power in a non-contact manner at the inside thereof, and is provided to the vehicle 3012 so as to be exposed outside the vehicle.

The power receiving coil (not shown) is embedded in the vehicle-side pad 3030. The power receiving coil performs a power transmission and reception in a non-contact manner with the power transmitting coil. In regard to the power receiving coil, the electromagnetic field is also generated in the power receiving coil due to an effect of the electromagnetic field generated by the power transmitting coil, a current flows to the power receiving coil and a voltage is generated. The power receiving coil is connected to a power reception circuit 3023 and provides high-frequency power, which is generated, for the power reception circuit 3023.

First, the power receiving device 3020 will be described. The power receiving device 3020 is connected to the vehicle-side pad 3030. The power receiving device 3020 operates when the main battery 3011 is charged using the external power supply. The power receiving device 3020 includes a power-reception-side control device 3021, a power reception control circuit 3022, a power reception circuit 3023, a power-reception-side radio communication circuit 3024, and a main battery 3011. The power receiving device 3020 is controlled by the power-reception-side control device 3021.

The power-reception-side radio communication circuit 3024 performs radio communication with the power transmitting device 3040, and transmits and receives various kinds of information about the power receiving device 3020 and various kinds of information about the power transmitting device 3040. The power-reception-side radio communication circuit 3024 provides the received information for the power-reception-side control device 3021. In addition, the power-reception-side radio communication circuit 3024 transmits the information from the power-reception-side control device 3021 to the power receiving device 3020.

The power reception control circuit 3022 controls the power reception circuit 3023 to control startup and stoppage of the power reception. The power reception circuit 3023 outputs power supplied from the power receiving coil embedded in the vehicle-side pad 3030 as a DC voltage, and charges the main battery 3011. The power reception circuit 3023 is controlled by the power reception control circuit 3022. Although not shown, the power reception circuit 3023 includes a resonance circuit, a rectification circuit, and a voltage-raising circuit.

The resonance circuit performs conversion in a manner such that phases of a voltage and a current of the power supplied from the power receiving coil match each other so as to efficiently transmit the power, and supply the converted power to the rectification circuit. The rectification circuit includes a diode and a capacitor. The rectification circuit rectifies high-frequency power supplied from the resonance circuit using the diode, makes the power smooth using the capacitor, and supplies the power to the voltage-raising circuit. The voltage-raising circuit raises a voltage of the power from the rectification circuit to be equal to or larger than a voltage of the main battery 3011, and supplies a current to the main battery 3011.

A battery ECU 3025 is mounted on the main battery 3011. The battery ECU 3025 monitors an amount of charge, a temperature, and the like of the main battery 3011, and supplies the information about the main battery 3011 to the power-reception-side control device 3021.

The power-reception-side control device 3021 controls the power reception control circuit 3022 on the basis of information from the power-reception-side radio communication circuit 3024, information from the battery ECU 3025, and the voltage and current of power transmitted to the main battery 3011.

The startup of the charging is performed by operating a charging startup button 3026. When a user operates the charging startup button 3026, the power-reception-side control device 3021 operates and performs communication with the power transmitting device 3040. In a case where it is determined that the startup of the charging is possible on the basis of various kinds of information, the power transmitting device 3040 starts the charging.

Figure 24:
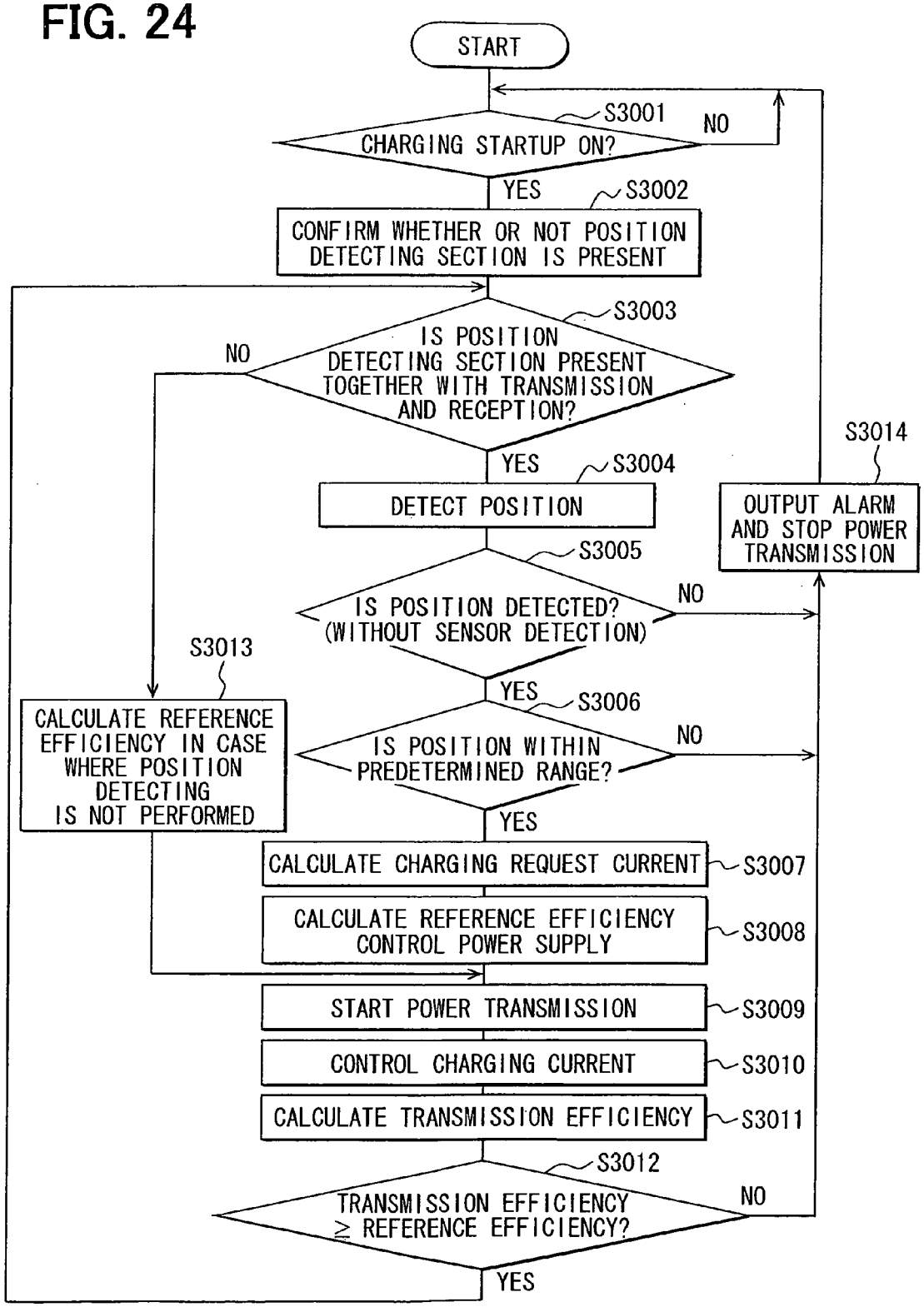
FIG. 24 is a flowchart illustrating a charging process of a power-transmission-side control device 41.

Next, a specific control of the power-transmission-side control device 3041 will be described. FIG. 24 shows a flowchart illustrating a charging process of a power-transmission-side control device 3041. The charging process is executed in a state in which the power transmitting device 3040 is powered on.

In step S3001, it is determined whether or not the charging startup button 3026 is operated and a charging startup request is made (charging startup ON). When the charging startup ON is made, it moves to step S3002, and the process in step S3001 is repeated until the charging startup ON is made.

In step S3002, it is confirmed whether or not the position detecting section 3046 is present, and step S3003 is moved to. As a case in which the position detecting section 3046 is not present, a case in which a configuration capable of detecting a position of the vehicle-side pad 3030 is not provided to the power receiving device 3020 (vehicle 3012), or a case in which the configuration does not function due to any problem may be exemplified. In a case where the position detecting section 3046 is not present, position information detected by the position detecting section 3046 may not be used. Therefore, a process may be different depending whether or not the position detecting section 3046 is present, such that the confirmation in step S3002 is performed.

In step S3003, it is determined whether or not the position detecting section 3046 is present on the basis of the result in step S3002. In a case where the position detecting section 3046 is present, it moves to step S3004, and in a case where the position detecting section 3046 is not present, it moves to step S3013.

In step S3004, the position information from the position detecting section 3046 is acquired, and it moves to step S3005. In step S3005, it is determined whether or not the position detection may be performed. In a case where the position detection may be performed, it moves to step S3006, and in a case where the position detection may not be performed (in a case where the position information may not be acquired), it moves to step S3014.

In step S3006, it is determined whether or not a relative position is within a predetermined range (within a predetermined distance). In a case where the relative position is within a predetermined range, it moves to step S3007, and in a case where the relative position is not within a predetermined range, it moves to step S3014.

In step S3007, a charging request current (hereinafter, referred to as a "request current") is calculated, and then it moves to step S3008. The request current is a current with which the charging may be performed with good efficiency, and is calculated by using a state of charge (SOC) that is detected by the battery ECU 3025.

In step S3008, reference efficiency is calculated, and then it moves to step S3009. The reference efficiency is calculated with the relative position, and is a reference value of transmission efficiency at the relative position. The reference efficiency is obtained based on a correlation between the relative position and the transmission efficiency, in which the closer the relative position is, the higher the transmission efficiency is.

In step S3013, since the position detecting section 3046 is not present, reference efficiency in a case where the position detecting section 3046 is not present is calculated, and then it moves to step S3009. When the position detecting section 3046 is not present, the relative position may not be known, such that reference efficiency under the most strict condition (a position at which the transmission efficiency is the highest) is calculated.

In step S3009, the power transmission control circuit 3042 is controlled so as to start the power transmission, and then it moves to step S3010. In step S3010, a charging current during power supply is controlled, and then it moves to step S3011. In regard to the control of the charging current, an instruction is given to the power receiving device 3020 so that the charging current becomes the request current calculated in step S3007. In this manner, the power receiving device 3020 controls the power reception control circuit 3022 so that the charging current becomes the request current.

In step S3011, current transmission efficiency is calculated and it moves to step S3012. The transmission efficiency is calculated by dividing an output (an effective value) of the power transmission circuit 3043 by an output of the power reception circuit 3023. In step S3012, it is determined whether or not the transmission efficiency is equal to or larger than the reference efficiency. In a case where the transmission efficiency is equal to or larger than the reference efficiency, it moves to step S3003, and in a case where the transmission efficiency is less than the reference efficiency, it moves to step S3014. Therefore, in a case where the transmission efficiency is equal to or larger than the reference efficiency, it is determined that a foreign body or the like is not present between the ground-side pad 3050 and the vehicle-side pad 3030, and the power transmission may be performed smoothly, and then the processes from step S3003 are repeated again.

In step S3014, since the transmission efficiency is less than the reference efficiency, and there is a possibility that the foreign body intrudes between the ground-side pad 3050 and the vehicle-side pad 3030, such that the informing section 3045 is controlled so as to output an alarm. Furthermore, the power transmission is stopped, and it returns to step S3001. This process is performed in consideration of a case in which the transmission efficiency is lost due to the foreign body, for example, an eddy current in a metallic foreign body. In addition, even when the position detecting section 3046 is present, in a case where the position detection may not be performed in step S3005, it is determined that any abnormality is present in step S3014, and the alarm is output in the same way, and then it returns to step S3001. In addition, in a case where the relative position is beyond the predetermined range in step S3006, in step S3014, it is determined that the power transmission is difficult due to a positional deviation, and the alarm is output in the same way, and then it returns to step S3001.

In this manner, the power-transmission-side control device 3041 calculates the reference value of the transmission efficiency on the base of the relative positional relationship between the ground-side pad 3050 and the vehicle-side pad 3030. When the transmission efficiency is less than a specified value, the power-transmission-side control device 3041 temporarily stops the power transmission. In this manner, even when the positional deviation between the ground-side pad 3050 and the vehicle-side pad 3030 occurs, the foreign body may be detected in real time during the power supply.

Figure 25:
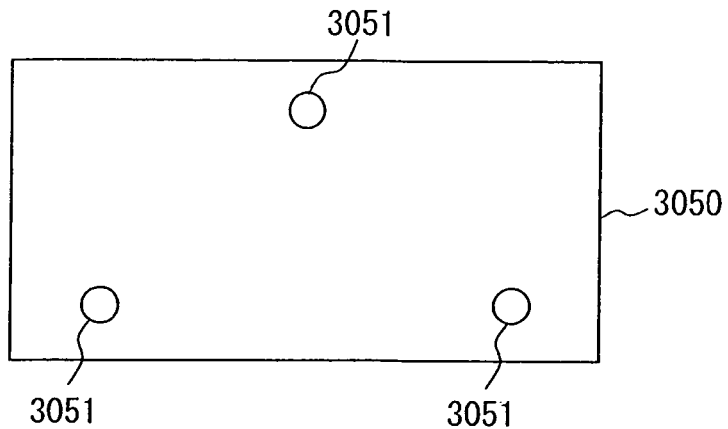
FIG. 25 is a plan view illustrating a ground-side pad.

Next, with reference to FIG. 23, a configuration of the position detecting section 3046 will be described, with respect to the ground-side pad 3050 shown in FIGS. 23 and 25 and the vehicle side pad 3030 shown in FIGS. 23 and 26. FIG. 25 shows a plan view illustrating the ground-side pad 3050.

Figure 26:
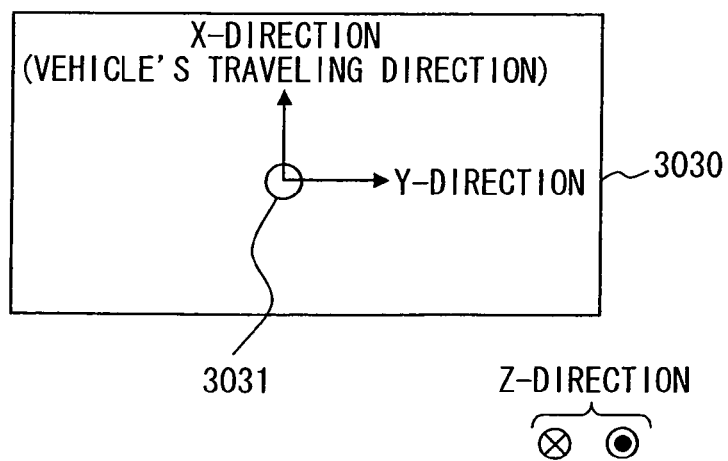
FIG. 26 is a plan view illustrating a vehicle-side pad.

FIG. 26 shows a plan view illustrating the vehicle-side pad 3030. The position detecting section 3046 detects the relative position using a time taken for ultrasonic waves transmitted from a predetermined position to be received at a predetermined position. Specifically, an ultrasonic wave oscillator 3031 is provided at the center of a surface that is located on the ground-side pad 3050 side, in surfaces of the vehicle-side pad 3030. In addition, a plurality of ultrasonic wave receivers 3051 are provided on a surface that is located on the vehicle-side pad 3030 side, in surfaces of the ground-side pad 3050. In this embodiment, three ultrasonic wave receivers 3051 are provided. The three ultrasonic wave receivers 3051 are disposed to be distant from each other. In this embodiment, the three ultrasonic wave receivers 3051 are disposed at apexes of an isosceles triangle in which the center of a surface of the ground-side pad 3050 is set as the center and a line connecting two corner vicinities at the side of a long side is set as the base.

Next, a method of detecting a position will be described. The ultrasonic waves transmitted from one ultrasonic wave oscillator 3031 of the vehicle-side pad 3030 are received by three ultrasonic wave receivers 3051, and a position of the ultrasonic wave oscillator 3031 is specified by using a difference in an arrival time of the sonic waves to respective ultrasonic wave receivers 3051, on the basis of three-point measuring principle. Therefore, the relative position may be accurately detected. As a position of the ultrasonic wave oscillator 3031, a vehicle's traveling direction X, a vehicle's width direction Y, and a vehicle's height direction Z are detected. In addition, a displacement is calculated by setting a state in which the vehicle-side pad 3030 and the ground-side pad 3050 are opposite to each other and the centers thereof are completely overlap each other in the vehicle's height direction Z as an origin.

Figure 27:
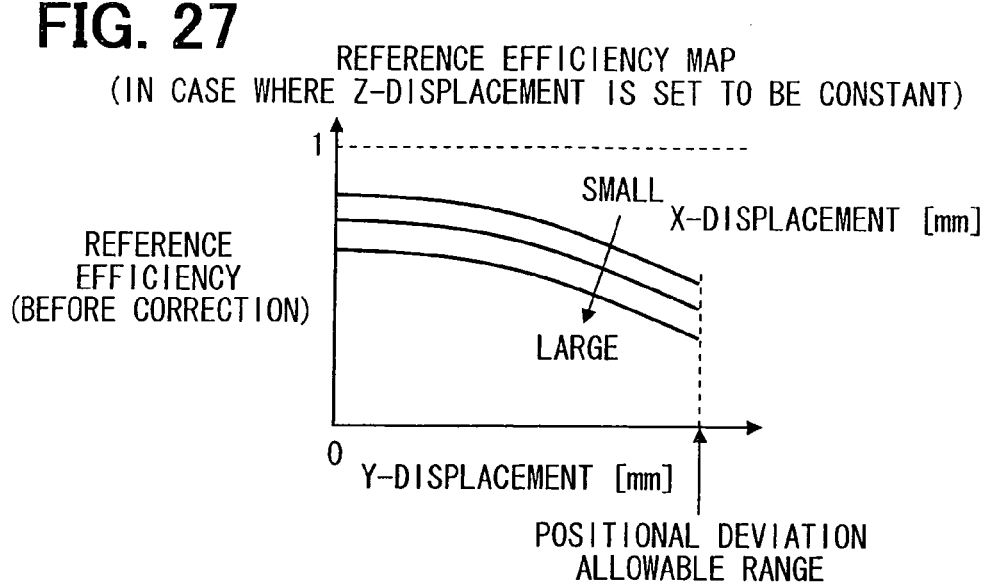
FIG. 27 is a graph illustrating a reference efficiency map.
Figure 28:
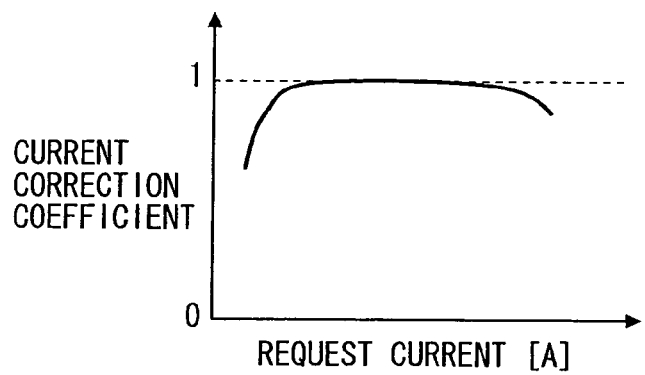
FIG. 28 is a graph illustrating a current correction coefficient map.

Next, a method of calculating the reference efficiency will be described. FIG. 27 shows a graph illustrating a reference efficiency map. FIG. 28 shows a graph illustrating a current correction coefficient map. These maps are measured in advance, and are stored in a memory of the power-transmission-side control device 3041 or the power-reception-side control device 3021. The reference efficiency is calculated by the following Equation (1).

$$\text{Reference Efficiency} = \text{Reference Efficiency(before correction)} \times \text{Current Correction Coefficient} \quad (1)$$

Here, the reference efficiency before correction may be obtained by using a map shown in FIG. 27 from the above-described X-, Y-, and Z-displacements (positional deviations). The map shown in FIG. 27 illustrates a relationship between the Y-displacement and the reference efficiency (before correction) when it is assumed that Z-displacement is constant. As the Y-displacement becomes large, the reference efficiency becomes small, and as the X-displacement becomes large, the reference efficiency becomes small. The power-transmission-side control device 3041 determines the reference efficiency (before correction) from the reference efficiency map.

In this manner, an efficiency variation due to the positional deviation between the vehicle-side pad 3030 and the ground-side pad 3050 may be considered. Even when the positional deviation between the pads 3030 and 3050 occurs, the foreign body may be detected in a relatively accurate manner, and thereby the power transmission may be stopped.

In addition, the current correction coefficient may be obtained by using a current correction coefficient map shown in FIG. 28. The current correction coefficient may be smaller than 1 in a case where the request current is small and in a case where the request current is large. This is affected by a loss characteristic of a wire or the like. The request current is calculated by the above-described charging process, and the power-transmission-side control device 3041 determines the current correction coefficient from the current correction coefficient map.

In this manner, an effect of a loss of the power transmission circuit 3043 and the power reception circuit 3023, and a resistance loss of the wire with respect to a current variation may be considered. Therefore, the foreign body may be detected in a relatively accurate manner, and thereby the power transmission may be stopped.

An effect of the above-described non-contact power supply system 3010 of this embodiment will be described. The power-transmission-side control device 3041 functions as an efficiency detecting unit and detects a transmission efficiency of the power transmission. In addition, the power-transmission-side control device 3041 functions as a reference value calculating unit and obtains a reference value. In addition, the power-transmission-side control device 3041 functions as a control unit. In addition, the power transmission control circuit 3042 functions as a power transmitting section. In a case where the transmission efficiency detected by the power-transmission-side control device 3041 is less than the reference value that may be obtained by the power-transmission-side control device 3041 during power transmission, the power transmission control circuit 3042 is controlled so that the power-transmission-side control device 3041 stops the power transmission. The transmission efficiency is different depending on the relative position. For example, the transmission efficiency becomes the highest at a position (reference position) at which the vehicle-side pad 3030 and the ground-side pad 3050 are closest to each other. In addition, as the vehicle-side pad 3030 and the ground-side pad 3050 are distant from each other, the transmission efficiency becomes lowered. Therefore, in a case where actual transmission efficiency is less than the reference value of the transmission efficiency at the relative position, it may be determined that this is due to any cause, for example, invasion of the foreign body. Therefore, as described above, in a case where the actual transmission efficiency is less than the reference value, the power-transmission-side control device 3041 stops the power transmission, and thereby a power supply state may be controlled depending on whether or not the foreign body is present.

In addition, in this embodiment, the power-transmission-side control device 3041 also functions as an electric energy calculating unit that calculates an electric energy necessary for the power transmission from the ground-side pad 3050 that is a power transmitting section to the vehicle-side pad 3030 that is a power receiving section. A resistance loss of a wire, or the like is different depending on the necessary electric energy, such that this configuration is to consider this effect (refer to FIG. 28). The power-transmission-side control device 3041 calculates the reference value of the transmission efficiency at a relative position by using the relative position and the calculated electric energy. Therefore, the control of the power transmission stoppage by the power-transmission-side control device 3041 may be performed in a relatively reliable manner in consideration of the effect of the necessary electric energy.

Furthermore, in this embodiment, the power-transmission-side control device 3041 also functions as a determination unit that determines whether or not the position detecting section 3046 that is a position detecting unit is used. The control of the power-transmission-side control device 3041 may be changed depending on whether or not the position detecting section 3046 is used. For example, in a case where the position detecting section 3046 is not mounted or in a case where the position detecting section 3046 may not be used due to any problem, the power-transmission-side control device 3041 may perform a control by using the most strict reference value.

In addition, in this embodiment, in a case where it is determined that the position detecting section 3046 may not be used, the control is performed so as to stop the power transmission (refer to step S3005). Therefore, in a case where the position detecting section 3046 may not be used, for example, in a case where the position may not be detected, the power transmission is stopped. Therefore, only in a case where the power transmission may be reliably performed, the power transmission may be performed.

Furthermore, in this embodiment, in a case where it is determined that the position detecting section 3046 may not be used, and the power transmission is possible, the control is performed so as to transmit power by using the highest reference value (refer to step S3013). The highest reference value is a reference value at a position at which the transmission efficiency becomes the highest. When this strict condition is used, even when the position detecting section 3046 is not usable, the power transmission may be reliably stopped when the foreign body is present.

In addition, in this embodiment, the informing section 3045 has a function as a determination informing unit that informs the determination result of the power-transmission-side control device 3041. In this manner, a user may recognize whether or not the foreign body is present, or the like by recognizing the determination result (refer to step S3014).

Furthermore, in this embodiment, the informing section 3045 has a function as a power transmission informing unit that informs the power transmission stoppage in a case where the power transmission is stopped. In this manner, the user may recognize that the power transmission is stopped due to any cause (refer to step S3014).

Fourth Embodiment

Figure 29:
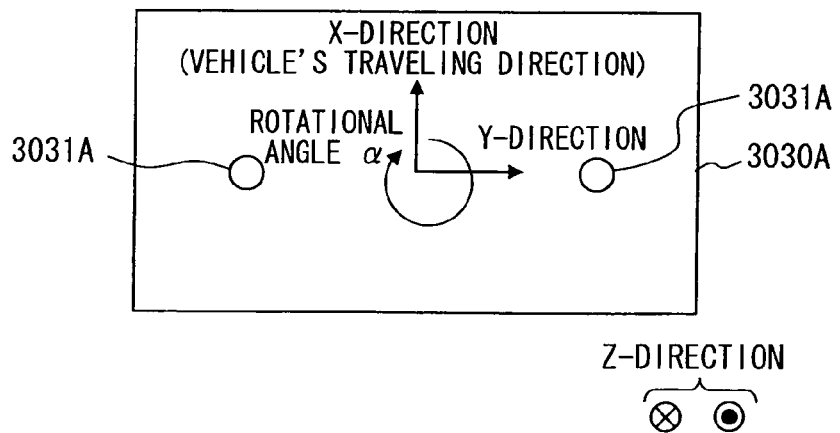
FIG. 29 is a plan view illustrating a vehicle-side pad.

Next, a fourth embodiment will be described with reference to FIG. 29 to FIG. 31. FIG. 29 shows a plan view illustrating the vehicle-side pad 3030A. In this embodiment, among the configurations of the position detecting section 3046, two ultrasonic wave oscillators 3031A are provided to a vehicle-side pad 3030A. The two ultrasonic wave oscillators 3031A are provided on a surface, which is located on the ground-side pad 3050 side in surfaces of the vehicle-side pad 3030A, in parallel with each other in the vehicle's width direction Y and with being spaced from each other.

Next, a method of detecting a position will be described. Ultrasonic waves that are transmitted alternately from the two ultrasonic wave oscillators 3031A of the vehicle-side pad 3030A are received by the three ultrasonic wave receivers 3051. Positions of the two ultrasonic wave oscillators 3031A are specified by using a difference in an arrival time of the sonic waves to respective ultrasonic wave receivers 3051, on the basis of three-point measuring principle. In this manner, a rotational angle $\alpha$ of the pad around the vehicle's height direction Z may be also detected. In this manner, the position detecting section 3046 of this embodiment further includes a rotational angle detecting section that detects the rotational angle.

Next, a method of calculating the reference efficiency will be described. FIG. 30 shows a graph illustrating the reference efficiency map in a case where the rotational angle $\alpha$ is 0°. FIG. 31 shows a graph illustrating the reference efficiency map in a case where the rotational angle $\alpha$ is 5°.

Figure 30:
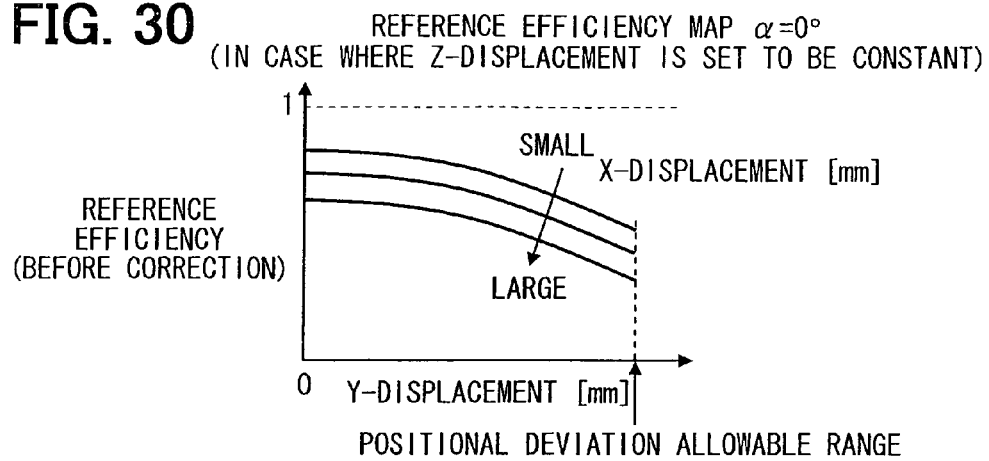
FIG. 30 is a graph illustrating the reference efficiency map in a case where a rotational angle $\alpha$ is 0°.
Figure 31:
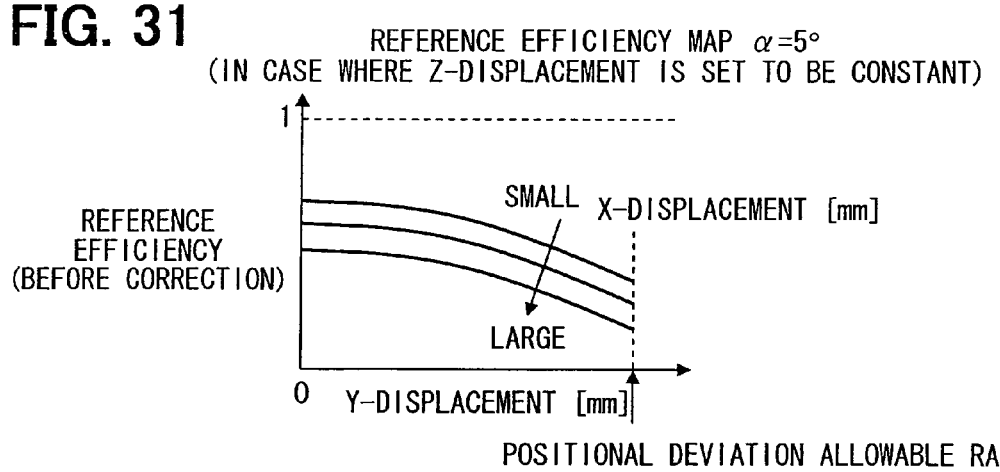
FIG. 31 is a graph illustrating the reference efficiency map in a case where the rotational angle $\alpha$ is 5°.

The reference efficiency before correction may be obtained by using maps shown in FIG. 30 and FIG. 31 from the above-described X-, Y-, and Z-displacements (positional deviations) and the rotational angle $\alpha$. The map shown in FIG. 30 illustrates a relationship between the Y-displacement and the reference efficiency (before correction) when it is assumed that the rotational angle $\alpha$ is 5° and the Z-displacement is set to be constant. The map shown in FIG. 31 illustrates a relationship between the Y-displacement and the reference efficiency (before correction) when it is assumed that the rotational angle $\alpha$ is 5° and the Z-displacement is set to be constant. When the rotational angle $\alpha$ is different, the reference efficiency (before correction) becomes different. Therefore, even when the vehicle 3012 is crookedly stopped with respect to a parking position, the reference efficiency may be accurately corrected. Therefore, the foreign body may be detected in a relatively accurate manner.

Fifth Embodiment

Figure 32:
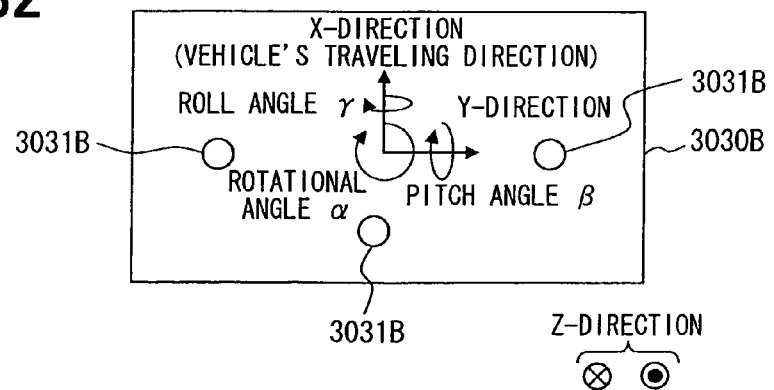
FIG. 32 is a plan view illustrating a vehicle-side pad.

Next, a fifth embodiment will be described with reference to FIG. 32 to FIG. 34. FIG. 32 shows a plan view illustrating a vehicle-side pad 30306. In this embodiment, among the configurations of the position detecting section 3046, three ultrasonic wave oscillators 3031B are provided to a vehicle-side pad 3030B. The two ultrasonic wave oscillators 3031B are provided on a surface, which is located on the ground-side pad 3050 side in surfaces of the vehicle-side pad 3030B, in parallel with each other in the vehicle's width direction Y and with being spaced from each other. In addition, a third ultrasonic wave oscillator 3031B is provided at a position that is deviated from the center of the surface of the vehicle-side pad 3030B in a vehicle's receding direction.

Next, a method of detecting a position will be described. Ultrasonic waves that are transmitted alternately from the three ultrasonic wave oscillators 3031B of the vehicle-side pad 3030B are received by the three ultrasonic wave receivers 3051. Positions of the three ultrasonic wave oscillators 3031B are specified by using a difference in an arrival time of the sonic waves to respective ultrasonic wave receivers 3051, on the basis of three-point measuring principle. In this manner, a three-dimensional rotational direction of the pad may be detected. Specifically, a pitch angle $\beta$ around the vehicle's width direction Y, and a roll angle $\gamma$ around the vehicle's travelling direction X may be further detected. Therefore, the position detecting section 3046 further includes a tilt angle detecting section that detects tilt angles (the pitch angle $\beta$ and roll angle $\gamma$).

Next, a method of calculating the reference efficiency will be described. FIG. 33 shows a graph illustrating the reference efficiency map in a case where an angle $\alpha=\beta3=\gamma$ is 0°. FIG. 34 shows a graph illustrating the reference efficiency map in a case where the rotational angle $\alpha$ is 10°, the pitch angle $\beta$ is 2°, and the roll angle $\gamma$ is 0°.

Figure 33:
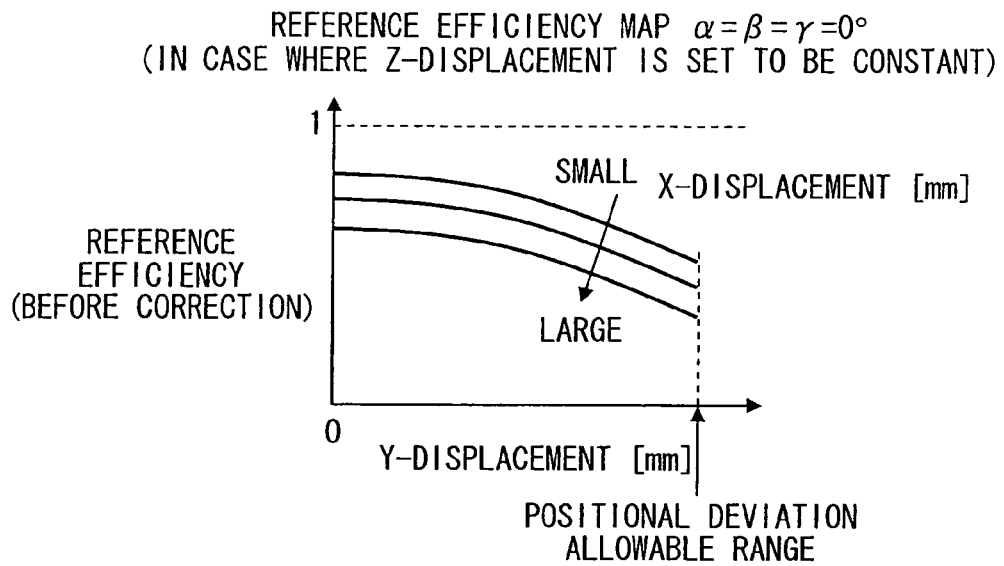
FIG. 33 is a graph illustrating the reference efficiency map in a case where an angle $\alpha=\beta=\gamma$ is 0°.
Figure 34:
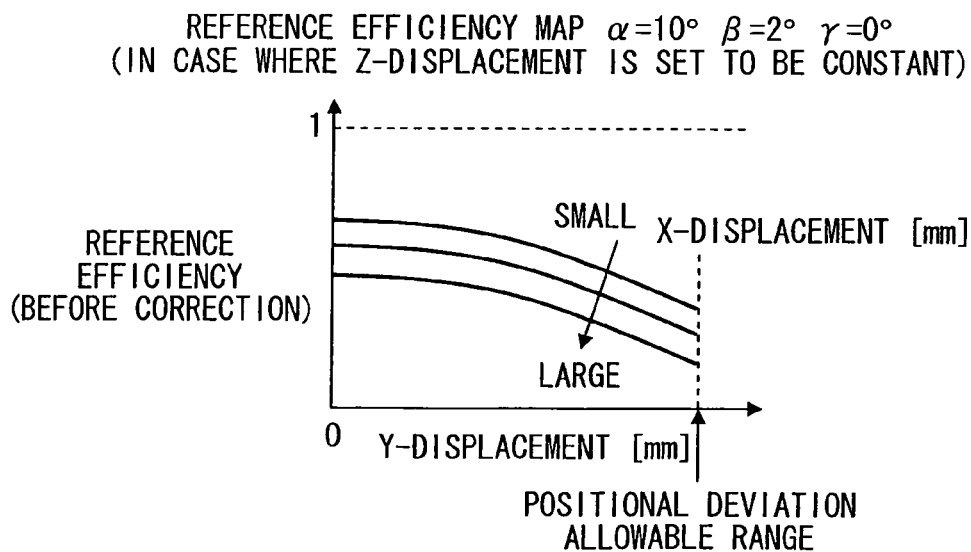
FIG. 34 is a graph illustrating the reference efficiency map of another example.

The reference efficiency map before correction may be obtained by using maps shown in FIG. 33 and FIG. 34 from the above-described X-, Y-, and Z-displacements (positional deviations) and the angles $\alpha$, $\beta$, and $\gamma$. The map shown in FIG. 33 illustrates a relationship between the Y-displacement and the reference efficiency (before correction) when it is assumed that angles $\alpha=\beta=\gamma=0°$, and the Z-displacement is constant. The map shown in FIG. 34 illustrates a relationship between the Y-displacement and the reference efficiency (before correction) when it is assumed that the rotational angle $\alpha$ is 10°, the pitch angle $\beta$ is 2°, and the roll angle $\gamma=0°$, and the Z-displacement is constant. When the angles $\alpha$, $\beta$, and $\gamma$ are different from each other, the reference efficiency (before correction) becomes different. Therefore, even when the vehicle 3012 is crookedly stopped with respect to a parking position, and even when the vehicle 3012 is tilted with respect to the ground due to loading of the luggage or the like, the reference efficiency may be accurately corrected. Therefore, the foreign body may be detected in a relatively accurate manner.

Sixth Embodiment

Figure 35:
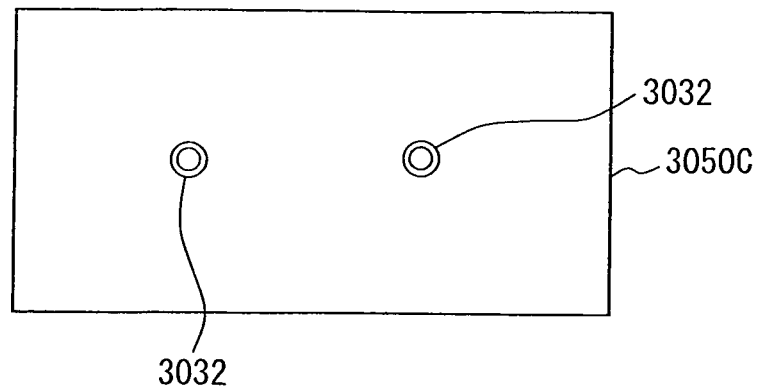
FIG. 35 is a plan view illustrating a ground-side pad.
Figure 36:
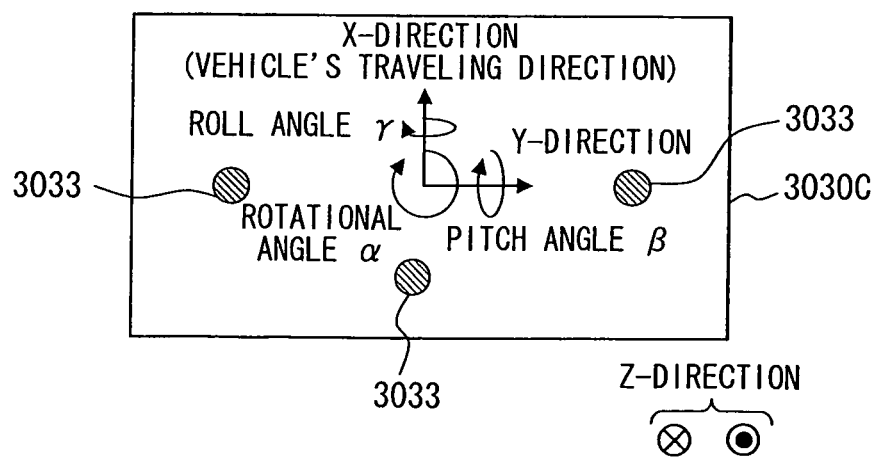
FIG. 36 is a plan view illustrating a vehicle-side pad.

Next, a sixth embodiment will be described with reference to FIG. 35 and FIG. 36. FIG. 35 shows a plan view illustrating a ground-side pad 3050C. FIG. 36 shows a plan view illustrating a vehicle-side pad 3030C. In this embodiment, the position detecting section 3046 uses cameras 3032 without using the ultrasonic wave oscillator 3031B.

Two cameras 3032 (imaging units) are provided on a surface, which is located on the vehicle-side pad 3030C side in surfaces of the ground-side pad 3050C, in parallel with each other in the vehicle's width direction Y and with being spaced from each other.

Three markers 3033 are provided on a surface, which is located on the ground-side pad 3050C side in surfaces of the vehicle-side pad 3030C. Two markers 3033 are provided in parallel with each other in the vehicle's width direction Y and with being spaced from each other. In addition, a third marker 3033 is provided at a position that is deviated from the center of the surface of the vehicle-side pad 3030C in the vehicle's receding direction.

Next, a position detecting method of the position detecting section 3046 will be described. The three markers 3033 are imaged by using two cameras 3032, and the three markers 3033 are specified through image recognition from the imaged image data. Furthermore, a three-dimensional position of each of the markers 3033 is calculated by parallax of the two cameras 3032. In this manner, when the positions of the three markers 3033 may be specified, as is the case with the above-described fifth embodiment, a three-dimensional rotational direction of the vehicle-side pad 3030C may be detected.

The high-priced cameras 3032 are disposed to the ground-side pad 3050C, such that in a case where the power-transmitting side and the power-receiving side are in one-to-many relationship, even when the power-receiving side increases, it is not necessary to increase the cameras 3032. As a result, the cost may be reduced.

(Other Embodiments)

Hereinbefore, description has been made with respect to the embodiment, but it is not limited to the embodiment and various modifications may be made without departing from the scope of the invention.

In the above-described third embodiment, the control unit is the power-transmission-side control device 3041. However, the control unit is not limited to the power-transmission-side control device 3041, and several control units in the non-contact power supply system 3010 may perform the charging process shown in FIG. 24. For example, the charging process may be performed by power-reception-side control device 3021. In addition, the power-transmission-side control device 3041 and the power-reception-side control device 3021 perform the control while performing communication with each other, such that the charging process may be performed with the two control devices in cooperation with each other while respective control roles are assigned.

In the above-described third embodiment, the position detecting section 3046 uses ultrasonic waves. However, the position detecting section 3046 is not limited to the configuration using ultrasonic waves, and may use light and radio waves to detect a position with the same receiver and oscillator. For example, a receiver that also functions as an infrared oscillator, and an infrared reflective marker (reflective section) as a mark (target) applied to a predetermined position may be used. In this case, the position may be detected in the same manner as described above by using a time taken for infrared rays that are emitted to the reflective marker, and reflected waves that are reflected to reach the receiver.

In the above-described third embodiment, the non-contact power supply device is used at the time of performing the charging with respect to the vehicle.

However, without being limited to the vehicle, the non-contact power supply device may be used for another moving body such as a vessel and airplane. Without being limited to a use for the charging, the supplied power may be sequentially provided for power-consuming devices as loads.

In the above-described embodiment, the function of controlling the power supply may be executed by the ground-side control unit 110 instead of the vehicle-side control unit 10. In addition, the function of controlling the power supply may be executed by the vehicle-side control unit 10 and the ground-side control unit 110 in cooperation with each other. In this case, the ground-side control unit 110 may partially or wholly have a detection function or determination function.

In the above-described embodiment, the living body detecting unit is a unit having a living body detection function, and may have a living body detection function and a function related to the living body detection.

In the above-described embodiment, the ground-side pad may cover the ground-side power transmitting section and may be exposed on the ground. In addition, the ground-side pad may be buried in the ground.

As described above, the non-contact power supply control device controls power supply to transmit power in a non-contact manner from a ground-side power supply section (111) provided outside a vehicle (1) traveling using stored power to a vehicle-side power receiving section (11) provided to the vehicle (1). The non-contact power supply control device may restrict power supplied to the vehicle-side power receiving section (11) in a case where presence of a living body is detected at the periphery of the ground-side power supply section (111) during a power supply operation to the vehicle-side power receiving section (11), compared to a power supply operation when the presence of the living body is not detected.

According to this configuration, in a case where the living body such as a human body is detected during a power supply operation at the periphery of the ground-side power supply section at which an electromagnetic field occurs, a power supply operation in which the supplying power is restricted compared to a case in which the detection does not occur is performed. Therefore, the supplying power is restricted to a degree at which an adverse effect on the living body due to the electromagnetic field does not occur. As a result, driving power may be charged to the vehicle while suppressing the effect on the living body without stopping the power supply. Therefore, when the non-contact power supply to the vehicle is performed, a reduction in an effect with respect to a human body, an animal, or the like due to the electromagnetic field, and prevention of the lengthening of a charging time to the vehicle may be realized.

The non-contact power charge system may continue the restriction on the supplying power when the presence of the living body is detected again at the periphery of the ground-side power supply section during the power supply operation accompanied with the power restriction. According to this configuration, once, the restriction of the supplying power is performed, and the state in which the effect on the living body due to the electromagnetic field is suppressed continues while the living body is detected in succession. Due to this control, in a case where there is a possibility in that the living body may be susceptible to the effect of the electromagnetic field during the power supply operation, the power supply accompanied with the power restriction may be performed in succession. Therefore, the power supply operation that is excellent in stability may be provided in succession.

When a time of the restriction on the supplying power is longer than a set time, this situation may be informed to the outside. According to this configuration, in a case where the power restricting time is longer, a person is informed of this situation, such that a state in which a living body is near may be quickly removed. In this manner, the power supply operation may be performed with normal power after the removing of the state. Therefore, a time necessary for the charging to the power storage device of the vehicle, or the like may be shortened.

The unit that informs to the outside may be a sound generating unit (13) provided to the vehicle, or an illumination unit (13) provided to the vehicle. According to this configuration, when the informing using the sound generating unit, or the illumination unit provided to the vehicle is performed, it is possible to perform effective and early urging of the passenger of the vehicle or a person at the periphery of the vehicle to keep away a living body affected by an electrometric field.

The set time may be determined based on a difference between an amount of power storage that is stored in the vehicle, and an amount of power storage that is necessary at the time of terminating the charging of the vehicle.

According to this configuration, the set time until the informing to the outside is performed is determined based on a difference between a current amount of power storage that is stored in the vehicle, and an amount of power storage that is necessary at the time of terminating the charging of the vehicle. The set time is determined in this manner, such that it is possible to set a time, which is taken until the informing to the outside is started in response to a magnitude of a difference in the amount of power storage to be short. Therefore, a time of a power supply operation in which the power supply restriction is not performed may be secured much. Therefore, it is possible to perform a control in which the effect on the living body due to the electromagnetic field is suppressed, and the termination of the charging to the vehicle is realized early.

In a case where a request for a power supply operation to perform the power supply operation is made, and it is determined that the presence of the living body is detected at the periphery of the ground-side power supply section before performing the power supply operation, the power supply operation may not be started. According to this configuration, when the living body is detected during not performing the power supply, for example, during stopping the power supply, even when the request for the power supply operation is made, the power supply operation is not started. The power supply stopped state is also maintained against the request for the power supply operation, such that it is possible to reduce the effect from the electromagnetic field.

The non-contact power supply system may further include the non-contact power supply control device (9), and a unit (6, 8, or 7) that has a living body detection function of detecting a presence of the living body at the periphery of the ground-side power supply section.

According to this configuration, it is possible to provide a non-contact power supply system that performs a power supply operation in which the supplying power is restricted in a case where during the power supply operation, the living body such as a human body is detected at the periphery of the ground-side power supplying section at which the magnetic field is generated, compared to a case in which the living body is not detected. Therefore, when the non-contact power supply to the vehicle is performed, the driving power may be charged to the vehicle while suppressing an adverse effect on the living body, such that an effect with respect to the human body, an animal, or the like due to the electromagnetic field may be reduced. Furthermore, the lengthening of a charging time to the vehicle may be prevented.

The unit having the living body detection function may include a camera (61) that is mounted on a vehicle and photographs the periphery of the vehicle. According to this configuration, a direct and effective living body detection by the imaging may be realized through the living body detection using the in-vehicle camera provided to the vehicle, such that, a non-contact power supply system in which an increase in the number of components is reduced may be provided with respect to the vehicle in which the camera is mounted.

The unit having the living body detection function may include sensors (71 to 74) that are mounted on the vehicle and that detect an obstacle that is present at the periphery of the vehicle. According to this configuration, the living body detection corresponding to the detection range of each of the sensors may be realized through the living body detection using the sensors provided to the vehicle. Therefore, a non-contact power supply system in which an increase in the number of components is reduced may be provided to the vehicle in which the sensor is mounted.

The unit having the living body detection function may be a receiver (81) that performs radio communication with a portable transmitter (112) having an inherent management number capable of opening and closing a vehicle's door. In this case, the receiver (81) may be configured to receive the inherent management number in a case where the portable transmitter (112) is present within a detection range, which is set in advance, from the vehicle's door.

According to this configuration, before a person carrying a smart entry key comes into contact with a door or the like and performs unlocking or locking operation of the door, it may be detected that the person is present at the periphery of the vehicle and it may be detected that the person is close to the vehicle. Therefore, a power supply operation accompanied with power restriction may be performed in a state in which the living body is distant from the vehicle to some extent. In addition, a living body detection corresponding to a receiver-side detection range is possible through a living body detection using, for example, a portable transmitter such as a smart entry key provided to the vehicle. Therefore, a non-contact power supply system in which an increase in the number of components may be reduced may be provided with respect to the vehicle in which a door opening and closing instruction unit using such a portable transmitter is adopted.

The unit having the living body detection function may include a vehicle position detecting unit (9) that detects a position of the vehicle, and a portable device (120) that detects a position with respect to the vehicle when being located at the outside of the vehicle. According to this configuration, it is detected that a person carrying the portable device is present at the periphery of the vehicle through the living body detection using the position detection function provided to the portable device such as the cellular phone and the position detection function of detecting the position of the vehicle, and thereby it may be detected that a person approaches the vehicle. Therefore, a power supply operation accompanied with power restriction may be performed in a state in which the living body is distant from the vehicle to some extent.

As described above, the non-contact power charge system performs a power transmission in a non-contact manner between a vehicle-side power receiving section (2021) provided to a vehicle and a ground-side power transmitting section (2011) provided to a ground-side charging facility (2010) at the outside of the vehicle, and charges power from the ground-side charging facility (2010) to a power storage device (2023) of the vehicle. The non-contact power charge system may further include a removal unit that removes an object to be removed, which includes a human body and an animal, from a ground-side pad (2001 or 2001A) and the periphery thereof at the time of performing the non-contact charging or at a stand-by stage before performing the charging.

According to this configuration, at the time of the non-contact charging or at the stand-by state thereof, it is possible to remove the object to be removed, which includes a human body, an animal, or the like, from the ground-side pad, and the periphery thereof by the removal unit. Therefore, it is possible to prevent a person who is not aware of the charging startup state because of the non-contact charging or an animal not having capability of determining the power transmission from the ground-side pad from being present at the ground-side pad or at the periphery thereof and being affected by an electromagnetic field in advance. As a result, it is possible to provide a non-contact power charge system that is capable of reducing an effect from an electromagnetic field on the object to be removed such as a human body and an animal at the time of performing a non-contact charging for a vehicle.

The removal unit may be made up by making the external surface of the ground-side pad (2001) have a curved surface or an inclined surface and have a swollen shape that is swollen upward. According to this configuration, since the external surface of the ground-side pad is formed to have the swollen shape, when an animal or insect climbs on the pad portion that is located in the power transmission path and is exposed on the ground, the animal or insect slides down from a pad portion, or there is no stability and therefore it is uncomfortable for the animal or insect to stay, and as a result, the animal or insect may go far away from the ground-side pad. In addition, in regard to a person, the ground-side pad has an external appearance that is easily visible, such that it is easy for the person to be aware of the pad and it is possible to urge the person to be cautious so as not be close to the pad.

The removal unit may be configured by forming a plurality of concave and convex portions on the external surface of the ground-side pad (2001 or 2001A). According to this configuration, the plurality of concave and convex portions are formed on the external surface of the ground-side pad, such that even when an animal or the like climbs on the pad portion that is located in the power transmission path and is exposed on the ground, there is no stability and therefore it is uncomfortable for the animal to stay, and the animal may go far away from the ground-side pad. As a result, the concave and convex portions exhibit a function as an animal repellent.

The removal unit may include an illumination unit (2016) that emits light toward the object to be removed. According to this configuration, light-emission by the illumination unit is performed at the time of charging or at a charging stand-by stage, such that with respect to a person, his/her attention may be called to a charging state or a charging stand-by state so as to recognize this. Therefore, a sense of discomfort or a sense of aversion due to light is given with respect an animal or the like, and there is an effect of urging the animal or the like to be distant from the ground-side pad and the periphery thereof.

The removal unit may include a blowing unit (2024) that blows air toward the ground-side pad (2001A). According to this configuration, air is blown toward the ground-side pad at the time of charging or at the charging stand-by stage. Therefore, a small-sized object to be removed, which is present on the ground-side pad, may be blown off, or a sense of discomfort or a sensor of aversion due to wind may be given to an animal or the like, and therefore, the removal unit attributes to the urging of the object to be removed to be distant from the ground-side pad and the periphery thereof.

The removal unit may include an ultrasonic wave transmitting unit (2017) that transmits ultrasonic waves toward the object to be removed. According to this configuration, ultrasonic waves are transmitted at the time of charging or a charging stand-by state. Therefore, a small-sized object to be removed, which is present on the ground-side pad, may be blown off, or a sense of discomfort or a sensor of aversion due to wind may be given to an animal or the like, and therefore, the removal unit attributes to the urging of the object to be removed to be distant from the ground-side pad and the periphery thereof.

The non-contact power charge system may further include a detection unit (ground side ECU 2100) that detects whether or not the object to be removed is present based on an image obtained by imaging the ground-side pad (2001 or 2001A) and the periphery thereof. In this case, the detection unit (ground side ECU 2100) may stop the non-contact charging in a case where the object to be removed is detected at the time of performing the non-contact charging or at a stand-by stage before performing the charging.

According to this configuration, in a case where the presence of the object to be removed is detected at the time of performing the non-contact charging or at a stand-by stage thereof, the non-contact charging may be stopped. Therefore, it is possible to prevent a person who is not aware of the non-contact charging or an animal not having a capability of determining the non-contact charging from being present on the ground-side pad or at the periphery thereof and being affected by an electromagnetic field in advance.

The non-contact power charge system may further include a detection unit including a transmission section (2017A) that transmits a predetermined light beam or sonic waves toward the object to be removed, and a reception section (2026) that receives reflected waves or transmitted waves thereof. In this case, the detection unit (ground side ECU 2100) may stop the non-contact charging in a case where the object to be removed is detected at the time of performing the non-contact charging or at a stand-by stage before performing the charging.

According to this configuration, in a case where the presence of the object to be removed is detected by the detection using light or a sonic waves at the time of performing the non-contact charging or at the charging stand-by stage, the non-contact charging may be stopped. Therefore, it is possible to prevent a person who is not aware of the non-contact charging or an animal not having a capability of determining the non-contact charging from being present on the ground-side pad or at the periphery thereof and being affected by an electromagnetic field in advance.

As described above, the non-contact power charge system performs a power transmission in a non-contact manner between a vehicle-side power receiving section (2021) provided to a vehicle and a ground-side power transmitting section (2011) provided to a ground-side charging facility (2010) at the outside of the vehicle, and charges power from the ground-side charging facility (2010) to a power storage device (2023) of the vehicle. The non-contact power charge system may include a detection unit (ground side 2100) that detects an object to be removed, which includes a human body and an animal, on a ground-side pad (2001 or 2001A) and at the periphery thereof. In this case, in a case where the object to be removed is detected by the detection unit (ground side ECU 2100) at the time of performing the non-contact charging or at a stand-by stage before performing the charging, the non-contact charging may be stopped.

According to this configuration, in a case where the detection unit detects the presence of the object to be removed at the time of performing the non-contact charging or at a stand-by stage before performing the charging, the non-contact charging is stopped. Therefore, it is possible to prevent a person who is not aware of the charging startup state because of the non-contact charging or an animal not having capability of determining the power transmission from the ground-side pad from being present at the ground-side pad or at the periphery thereof and being affected by an electromagnetic field in advance. Therefore, it is possible to provide a non-contact power charge system that is capable of reducing an effect from an electromagnetic field on the object to be removed such as a human body and an animal at the time of performing a non-contact charging for a vehicle.

The detection unit (2100) may detect whether or not the object to be removed is present based on an image obtained by imaging the ground-side pad (2001 or 2001A) and the periphery of thereof. According to this configuration, it is possible to reliably detect the object to be removed, which has a discriminative size, through the image analysis by detecting whether or not the object to be removed is present from the imaged image.

The detection unit (ground side ECU 2100) may detect whether or not the object to be removed is present based on an image obtained by imaging the ground-side pad (2001 or 2001A) and the periphery of thereof. According to this configuration, it is possible to reliably detect the object to be removed, which has a discriminative size, through the image analysis by detecting whether or not the object to be removed is present from the imaged image.

As described above, the non-contact power supply device (3010), the non-contact power supply device (3010) performs a power transmission in a non-contact manner from a power transmitting section (3050) to a power receiving section (3030). The non-contact power supply device (3010) may include an efficiency detecting unit (power-transmission-side control device 3041) that detects a transmission efficiency of power transmitted from the power transmitting section to the power receiving section, a position detecting unit (3046) that detects a relative position between the power transmitting section and the power receiving section, a reference value calculating unit (power-transmission-side control device 3041) that calculates a reference value of the transmission efficiency at the relative position using the relative position detected by the position detecting unit, and a control unit (power-transmission-side control device 3041) that controls the power transmission from the power transmitting section to the power receiving section. In this case, the control unit may control the power transmitting section so as to stop the power transmission in a case where the transmission efficiency detected by the efficiency detecting unit during the power transmission is less than the reference value that is obtained by the reference value calculating unit.

According to this configuration, the power transmitting section is controlled by the control unit so as to stop the power transmission in a case where the transmission efficiency detected by the efficiency detecting unit is less than the reference value that is obtained by the reference value calculating unit. The transmission efficiency is different depending on the relative position. For example, the transmission efficiency becomes the highest at a position (reference position) at which the power transmitting section and the power receiving section are closest to each other. In addition, both of these are distant from each other, the transmission efficiency decreases. Therefore, in a case where actual transmission efficiency is less than the reference value of the transmission efficiency at the relative position, it may be determined that this is due to any cause, for example, invasion of the foreign body. As a result, as described above, the control unit may control a power supply state depending on whether or not the foreign body is present by stopping the power transmission when the detected transmission efficiency is less than the reference value.

The non-contact power supply device (3010) may further include an electric energy calculating unit (power-transmission-side control device 3041) that calculates electric energy necessary for the power transmission from the power transmitting section to the power receiving section. In this case, the reference value calculating unit calculates the reference value of the transmission efficiency at the relative position using the relative position and the calculated electric energy.

According to this configuration, the electric energy calculating unit that calculates electric energy necessary for the power transmission from the power transmitting section to the power receiving section is further included. A resistance loss of a wire, or the like is different depending on the necessary electric energy, such that this configuration is to consider this effect. The reference value calculating unit calculates the reference value of the transmission efficiency at the relative position by using the relative position and the calculated electric energy. Therefore, the control of the power transmission stoppage by the control unit may be performed in a relatively reliable manner in consideration of the effect of the necessary electric energy.

The non-contact power supply device (3010) may further include a determination unit (power-transmission-side control device 3041) that determines whether or not the position detecting unit is usable.

According to this configuration, the determination unit that determines whether or not the position detecting unit is usable is further included. Therefore, the control unit may change the control depending on whether or the position detecting unit is usable. For example, in a case where the position detecting unit is not mounted or in a case where the position detecting unit may not be used due to any problem, the control unit may perform a control by using the most strict reference value.

The control unit may control the power transmitting section so as to stop the power transmission in a case where the determination unit determines that the position detecting unit is not usable.

According to this configuration, in a case where it is determined that the position detecting unit is not usable by the determination unit, the power transmitting section is controlled by the control unit so as to stop the power transmission. Therefore, in a case where the position detecting unit is not usable, for example, in a case the position may not be detected, the power transmission is stopped. Therefore, only in a case where the power transmission may be reliably performed, the power transmission may be performed.

The control unit controls the power transmission using the highest reference value in a case where the determination unit determines that the position detecting unit is not usable and the power transmission is possible.

According to this configuration, in a case where the determination unit determines that the position detecting unit is not usable and the power transmission is possible, a control is performed to transmit power using the highest reference value. The highest reference value is a reference value at a position at which the transmission efficiency is the highest. When this strict condition is used, even when the position detecting unit is not usable, the power transmission may be reliably stopped when the foreign body is present.

The non-contact power supply device (3010) may further include a determination informing unit (3045) that informs a determination result of the determination unit.

According to this configuration, the determination informing unit that informs a determination result of the determination unit is further included. Therefore, a user may recognize whether or not the foreign body is present, or the like by recognizing the determination result.

The non-contact power supply device (3010) may further include a power transmission informing unit (3045) that informs power transmission stoppage in a case where the power transmission is stopped.

According to this configuration, the power transmission informing unit that informs power transmission stoppage in a case where the power transmission is stopped is further included. Therefore, the user may recognize that the power transmission is stopped due to any cause.

The relative position may include a rotational angle of the power receiving section with respect to the power transmitting section. In this case, the position detecting unit may further detect the rotational angle.

According to this configuration, the position detecting unit further detects the rotational angle. The transmission efficiency may vary depending on a magnitude of the rotational angle. The reference value may be calculated in a relatively accurate manner by using this rotational angle.

The relative position may include a tilt angle of the power receiving section with respect to the power transmitting section. In this case, the position detecting unit may further detect the tilt angle.

According to this configuration, the position detecting unit further detects the tilt angle. The transmission efficiency may vary depending on a magnitude of the tilt angle. The reference value may be calculated in a relatively accurate manner by using this tilt angle.

The position detecting unit may detect the relative position using a time taken for ultrasonic waves transmitted from a predetermined position to be received at a predetermined position.

According to this configuration, the position detecting unit detects the relative position using a time taken for ultrasonic waves transmitted from a predetermined position to be received at a predetermined position. Therefore, the relative position may be accurately detected.

The position detecting unit may image a mark (3033) provided at a predetermined position and may detect the relative position using the position of the imaged mark.

According to this configuration, the position detecting unit images a mark provided at a predetermined position and detects the relative position using the position of the mark. Therefore, the relative position may be accurately detected.

The position detecting unit may emit infrared rays to a reflection section provided at a predetermined position and may detect reflected waves from the reflection section to detect the relative position.

According to this configuration, the position detecting unit emits infrared rays to a reflection section provided at a predetermined position and detects reflected waves from the reflection section to detect the relative position. Therefore, the relative position may be accurately detected.

A reference numeral in parentheses indicates a correlation with a specific unit described in the embodiments, and it is not intended to limit a technical scope.

The present disclosure has been described based on very suitable embodiments, but it should be understood that the present disclosure is not limited to the embodiments and constructions. The present disclosure includes various modifications and variations within an equivalent range. Furthermore, very suitable various combinations or aspects, or other combinations or aspects, which further include only one element with respect to the above-described combinations or aspects, which further include one element or more, or which less include one element, may be included within the scope or sprit of the present disclosure.

What is claimed is:

1. A non-contact power supply device that performs a power transmission in a non-contact manner from a power transmitting section to a power receiving section, the device comprising:
    an efficiency detecting unit that detects a transmission efficiency of power transmitted from the power transmitting section to the power receiving section;
    a position detecting unit that detects a relative position between the power transmitting section and the power receiving section;
    a reference value calculating unit that calculates a reference value of the transmission efficiency at the relative position using the relative position detected by the position detecting unit;
    a control unit that controls the power transmission from the power transmitting section to the power receiving section,
    the control unit controlling the power transmitting section so as to stop the power transmission when the transmission efficiency detected by the efficiency detecting unit during the power transmission is less than the reference value that is obtained by the reference value calculating unit; and
    an electric energy calculating unit that calculates electric energy necessary for the power transmission from the power transmitting section to the power receiving section,
    the reference value calculating unit calculating the reference value of the transmission efficiency at the relative position using the relative position and the calculated electric energy.

2. The non-contact power supply device according to claim 1, further comprising:
    a determination unit that determines whether or not the position detecting unit is usable.

3. The non-contact power supply device according to claim 2, wherein the control unit controls the power transmitting section so as to stop the power transmission when the determination unit determines that the position detecting unit is not usable.

4. The non-contact power supply device according to claim 2, wherein the control unit controls the power transmission using the highest reference value when the determination unit determines that the position detecting unit is not usable and the power transmission is possible.

5. The non-contact power supply device according to claim 2, further comprising:
    a determination informing unit that informs a determination result of the determination unit.

6. The non-contact power supply device according to claim 1, further comprising:
a power transmission informing unit that informs power transmission stoppage when the power transmission is stopped.

7. The non-contact power supply device according to claim 1, wherein the relative position includes a rotational angle of the power receiving section with respect to the power transmitting section, and the position detecting unit further detects the rotational angle.

8. The non-contact power supply device according to claim 1, wherein the relative position includes a tilt angle of the power receiving section with respect to the power transmitting section, and the position detecting unit further detects the tilt angle.

9. The non-contact power supply device according to claim 1, wherein the position detecting unit detects the relative position using a time taken for ultrasonic waves transmitted from a predetermined position to be received at a predetermined position.

10. The non-contact power supply device according to claim 1, wherein the position detecting unit images a mark provided at a predetermined position and detects the relative position using the position of the imaged mark.

11. The non-contact power supply device according to claim 1, wherein the position detecting unit emits infrared rays to a reflection section provided at a predetermined position and detects reflected waves from the reflection section to detect the relative position.

* * * * *